(12) United States Patent
Demiroski et al.

(10) Patent No.: US 7,590,643 B2
(45) Date of Patent: Sep. 15, 2009

(54) SYSTEMS AND METHODS FOR EXTENSIONS AND INHERITANCE FOR UNITS OF INFORMATION MANAGEABLE BY A HARDWARE/SOFTWARE INTERFACE SYSTEM

(75) Inventors: Bekim Demiroski, Redmond, WA (US); Robert T. Whitney, Seattle, WA (US); J. Patrick Thompson, Seattle, WA (US); Anil K. Nori, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 10/693,574

(22) Filed: Oct. 24, 2003

(65) Prior Publication Data

US 2005/0050073 A1 Mar. 3, 2005

Related U.S. Application Data

(63) Continuation-in-part of application No. 10/646,580, filed on Aug. 21, 2003, now Pat. No. 7,428,546.

(51) Int. Cl.
*G06F 17/30* (2006.01)
(52) U.S. Cl. ............... 707/101; 707/102; 707/103 R
(58) Field of Classification Search ........... 707/101, 707/102, 103 R, 200, 203; 717/11, 116, 717/165; 709/203, 225, 229
See application file for complete search history.

(56) References Cited

U.S. PATENT DOCUMENTS

| 5,758,153 | A |   | 5/1998  | Atsatt |
|-----------|---|---|---------|--------|
| 5,806,074 | A |   | 9/1998  | Souder et al. ............... 707/21 |
| 5,899,996 | A |   | 5/1999  | Dysart et al. |
| 5,900,870 | A |   | 5/1999  | Malone et al. ............. 345/333 |
| 5,915,253 | A |   | 6/1999  | Christiansen |
| 5,937,402 | A | * | 8/1999  | Pandit ......................... 707/4 |
| 6,047,291 | A |   | 4/2000  | Anderson et al. .......... 707/103 |
| 6,049,805 | A |   | 4/2000  | Drucker et al. |
| 6,085,192 | A |   | 7/2000  | Mendez et al. ............. 707/10 |
| 6,108,004 | A |   | 8/2000  | Medl ......................... 345/346 |
| 6,112,024 | A |   | 8/2000  | Almond et al. ............ 395/703 |
| 6,151,606 | A |   | 11/2000 | Mendez .................... 707/201 |

(Continued)

FOREIGN PATENT DOCUMENTS

WO    WO 02/075539 A2    9/2002

OTHER PUBLICATIONS

Sarawagi et al., "Integrating association rule mining with relational database system: Alternatives and Implications", pp. 343-345.*

(Continued)

*Primary Examiner*—Jean M Corrielus
(74) *Attorney, Agent, or Firm*—Woodcock Washburn LLP

(57) ABSTRACT

By modeling real-world application objects with complex structures, behaviors, and operations described by a schema which is enforced by the hardware/software interface system, various embodiments of the present invention provide rich sub-typing functionality by extending Items (and Item types) using "Extensions" which provide additional data structures (Properties, Relationships, etc.) to already existing Items type structures. Extensions are strongly typed instances that cannot exist independently and must be attached to an Item or a Nested Element. Extensions are also intended to address "multi-typing" issues by enabling the overlap of type instances (e.g., a Document may be a "legal document" as well a "secure document").

16 Claims, 35 Drawing Sheets

U.S. PATENT DOCUMENTS

| | | | |
|---|---|---|---|
| 6,199,195 B1 | 3/2001 | Goodwin et al. | 717/1 |
| 6,240,414 B1 | 5/2001 | Beizer et al. | 707/8 |
| 6,301,575 B1 * | 10/2001 | Chadha et al. | 707/2 |
| 6,317,754 B1 | 11/2001 | Peng | 707/203 |
| 6,324,533 B1 * | 11/2001 | Agrawal et al. | 707/3 |
| 6,338,056 B1 | 1/2002 | Dessloch et al. | 707/2 |
| 6,370,541 B1 | 4/2002 | Chou et al. | 707/103 |
| 6,385,767 B1 * | 5/2002 | Ziebell | 717/170 |
| 6,446,077 B2 | 9/2002 | Straube et al. | |
| 6,466,964 B1 * | 10/2002 | Leung et al. | 709/202 |
| 6,519,597 B1 | 2/2003 | Cheng et al. | 707/10 |
| 6,556,983 B1 | 4/2003 | Altschuler et al. | 706/55 |
| 6,578,046 B2 | 6/2003 | Chang et al. | 707/103 |
| 6,671,757 B1 | 12/2003 | Multer et al. | 710/100 |
| 6,694,336 B1 | 2/2004 | Multer et al. | 707/201 |
| 6,697,818 B2 | 2/2004 | Li et al. | 707/103 |
| 6,701,314 B1 * | 3/2004 | Conover et al. | 707/7 |
| 6,704,743 B1 * | 3/2004 | Martin | 707/103 R |
| 6,708,221 B1 | 3/2004 | Mendez et al. | 709/248 |
| 6,738,789 B2 | 5/2004 | Multer et al. | 707/201 |
| 6,757,696 B2 | 6/2004 | Multer et al. | 707/201 |
| 6,763,350 B2 | 7/2004 | Agrawal et al. | 707/3 |
| 6,772,178 B2 | 8/2004 | Mandal et al. | 707/204 |
| 6,795,857 B1 * | 9/2004 | Leung et al. | 709/224 |
| 6,976,027 B2 * | 12/2005 | Cutlip | 707/101 |
| 7,177,843 B2 * | 2/2007 | Nguyen et al. | 705/51 |
| 7,197,502 B2 | 3/2007 | Feinsmith | |
| 7,349,913 B2 * | 3/2008 | Clark et al. | 707/101 |
| 7,401,104 B2 * | 7/2008 | Shah et al. | 707/204 |
| 7,428,546 B2 * | 9/2008 | Nori et al. | 707/101 |
| 7,483,915 B2 * | 1/2009 | Thompson et al. | 707/103 R |
| 7,483,923 B2 * | 1/2009 | Novik | 707/201 |
| 2002/0032684 A1 | 3/2002 | Kobayashi | |
| 2002/0046208 A1 | 4/2002 | Andersson et al. | |
| 2002/0091702 A1 | 7/2002 | Mullins | 707/100 |
| 2002/0152422 A1 | 10/2002 | Sharma et al. | 714/13 |
| 2002/0198891 A1 | 12/2002 | Li et al. | 707/102 |
| 2003/0110189 A1* | 6/2003 | Agrawal et al. | 707/203 |
| 2003/0149708 A1 | 8/2003 | Tsao | |
| 2004/0024795 A1 | 2/2004 | Hind et al. | 707/204 |
| 2004/0267834 A1 | 12/2004 | Sasaki | 707/201 |
| 2005/0065977 A1 * | 3/2005 | Benson et al. | 707/104.1 |

OTHER PUBLICATIONS

Susan Lawson, Object relational programming with DB2, pp. 1-29.*
Steve McClure, Object databasevs. Object relational databases.*
Andrews, T. et al., "Combining Language and Database Advances in an Object-Oriented Development Environment", *OOPSLA Proceedings*, Oct. 4-8, 1987, 430-440.
Beard, et al., "Multilevel and Graphical Views of Metadata", *Research and Technology Advances in Digital Libraries*, 1998, 256-265.
Beitner, N.D. et al., "Multimedia Support and Authoring in Microcosm: An Extended Model", *Department of Electronics and Computer Science*, University of Southampton, 12 pages.
Berg, C., How Do I Create Persistent Java Objects? *Dr. Dobb's Journal*, 1997, 22(4), 98-101.
Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.
Biliris, A., "The Performance of Three Database Storage Structures for Managing Large Objects", *ACM SIGMOD*, 1992, 276-285.
Booch, G. Benjamin/Cummings Publishing Co, "Object-Oriented Analysis and Design with Applications", 1994, 155, 156, 179-183.
Bracchi et al., "Binary Logical Associations in Data Modelling", *Modelling in Data Base Management Systems G.M. Nijssen, (ed)*; North Holland Publishing Company: 1976, 125-147.
Buneman, P. et al., Inheritance and Persistence in Database Programming Languages, *ACM*, 1986, 4-15.
Chien, A.A., "Concurrent Aggregates (CA)—Design and Experience with a Concurrent Object—Oriented Language Based on Aggregates", *J. Parallel and Distributed Computing*, 1995, 25(2), 174-196.
Chryssostomidis, Chryssosiomos, et al. "Geometric Modeling Issues in Computer Aided Design of Marine Structures", *MTS Journal*, 22(2) pp. 15-33.
"Computervision Launches Design Automation Development Platform for Windows", *PR Newswire, Financial News*, Jan. 10, 1995.
D'Andrea, A. et al., "Unisql's Next Generation Object-Relational Database Management System", *ACM SIGMOD Record*, Sep. 1996, 25(2), 70-76.
Darby, C., Object Serialization in Java 1.1. Making Objects Persistent, *WEB Techniques*, 1997, 2(9), 55, 58-59.
"Developer's Guide to Apple Data Detectors—For Version 1.0.2", © Apple Computer, Inc., 1997, 1-34.
Dietrich, Walter C., Jr., et al., "TGMS: An Object-Oriented System for Programming Geometry", *Software-Practice and Experience*, Oct. 1989, 19(10), 979-1013.
Dobashi, Y. et al, "Skylight for Interior Lighting Design", *Computer Graphics Forum*, 1994, 13(3), C85-C96.
Dorsch, Jeff, "Accel Sign with IBM to Buy Altium PCB Unit-Accel Technologies Acquires the Assets to Altium's P-CAD Business Unit", *EDA Licensing, Electronic New*, Jan. 16, 1995, 4 pages.
Fegaras, Leonidas, "Optimizing Object Queries Using an Effective Calculus", *ACM Transactions on Database Systems*, Dec. 2000, 25(4), 457-516.
Findler, R.B. et al., Contract Soundness for Object-Oriented Languages ACM Conference on Object-Oriented Programming Systems, Languages, and Applications, *OOPSLA*, 2001, 15 pages.
Foley et al., Computer Graphics: Principles and Practices, Second Edition, Addison-Wesley Publishing Company, 1990, Ch. 5 and 9, pp. 201-283.
Friis, A.-Christensen, et al."Geographic Data Modeling: Requirements and Research Issues in Geograhic Data Modeling," Nov. 2001, *Proceedings of the 9th ACM International Symposium on Advances in Geographic Information Systems*, 2-8.
Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.
Garret, J.H., Jr. et al, "An Object Oriented Environment for Representing Building Design and Construction Data", *Advanced Construction Technology Center*, Jun. 1989, Document No. 89-37-04, 1-34.
Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.
Goscinski, A. "Distributed Operating Systems The Logical Design", *Addision-Wesley*, 1991, 306-313.
Harrison, C.J. et al., " Structure Editors: User-Defined Type Values and Type Inference", *IEEE*, 2000, 241-247.
Haverlock, K., "Object Serialization, Java, and C++", Dr. Dobb's Journal, 1998, 23(8), 32, 34, 36-37.
Hay, David C, "Data Model Patterns: Convention of Thought", (Dorset House Publishing, New York, NY 1996, 47-67, 235-259.
Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.
Hsiao, H.I. et al., "DLFM: A Transactional Resource Manager", *SIGMOD, Proceedings of the 2000 ACM SIGMOD International Conference on Management of Data*, 2000, 518-528.
Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Databse Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, "A Performance Evaluation of Storing XML Data in Relational Database Management Systems", *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002, 14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Databse System", *ACM SIGMOD International Conference on Management of Data*, Jun. 1992, 21(2),403-412.

Ottogalli, F.G. et al., "Visualisation of Distributed Applications for Performance Debbuging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Ramsey, N. et al., "An Algebraic Approach to File Synchronization", *Software Engineering Notes, Association for Computing Machinery*, Sep. 2001, 26(5), 175-185, XP002295139.

Gray, J. et al., "The Dangers of replication and a Solution", *SIGMOD*, 1996, 25(2), 173-182, XP-002146555.

Helal, S. et al., "A Three-tier Architecture for Ubiquitous Data Access", *Computer Systems and Applications ACS/IEEE*, Jun. 2001, 177-180, XP010551207.

Kistler, J.J. et al., "Disconnected Operation in the Coda File System", *ACM Transactions on Computer Systems*, Feb. 1992, 10(1), 3-25, XP000323223.

Kistler, J.J. et al., "Increasing File System Availability through Second-Class Replication", *IEEE*, 1990, 65-69, XP010021244.

"SyncML Sync Protocol", 2000, Version 1.0, 60 pages, http://www.syncml.org/docs/syncml_protocol_v10_20001207.pdf.

Seshadri, P. et al., "SQLServer for Windows Ce-a Database Engine for Mobile and Embedded Platforms", *Data Engineering, Proceedings of the 16th International Conference, IEEE Computer Society*, Mar. 2000, 642-644, XP 010378761.

Berenson, H. "A Critique of ANSI SQL Isolation Levels", *SIGMOD Record*, 1995, 24(2), 10 pages.

Greenwald, R. et al., "Oracle Essentials: Oracle 8 & Oracle 8i", *MultiUser Concurrency*, 1999, Ch. 7, 7 pages, XP-002312028.

Plattner, C. et al., "Ganymed: Scalable Replication for Transactional Web Applications", *IFIP International federation for Information Processing*, 2004, 155-174, XP-002370197.

Shapiro, M. et al., "Managing Databases with Binary Large Objects", *IEEE*, 1999, 185-193, XP-000922048.

D'Andrea, A. et al., "Unisql's Next-Generation Object-Relational Database Management System", *ACM SIGMOD Record*, Sep. 1996, 25(2), 70-76.

Smolik, T., "An Object-Oriented File System-An Example of Using the Class Hierarchy Framework Concept" Operating Systems Review, ACM, 1995, 29(2), 33-53.

* cited by examiner

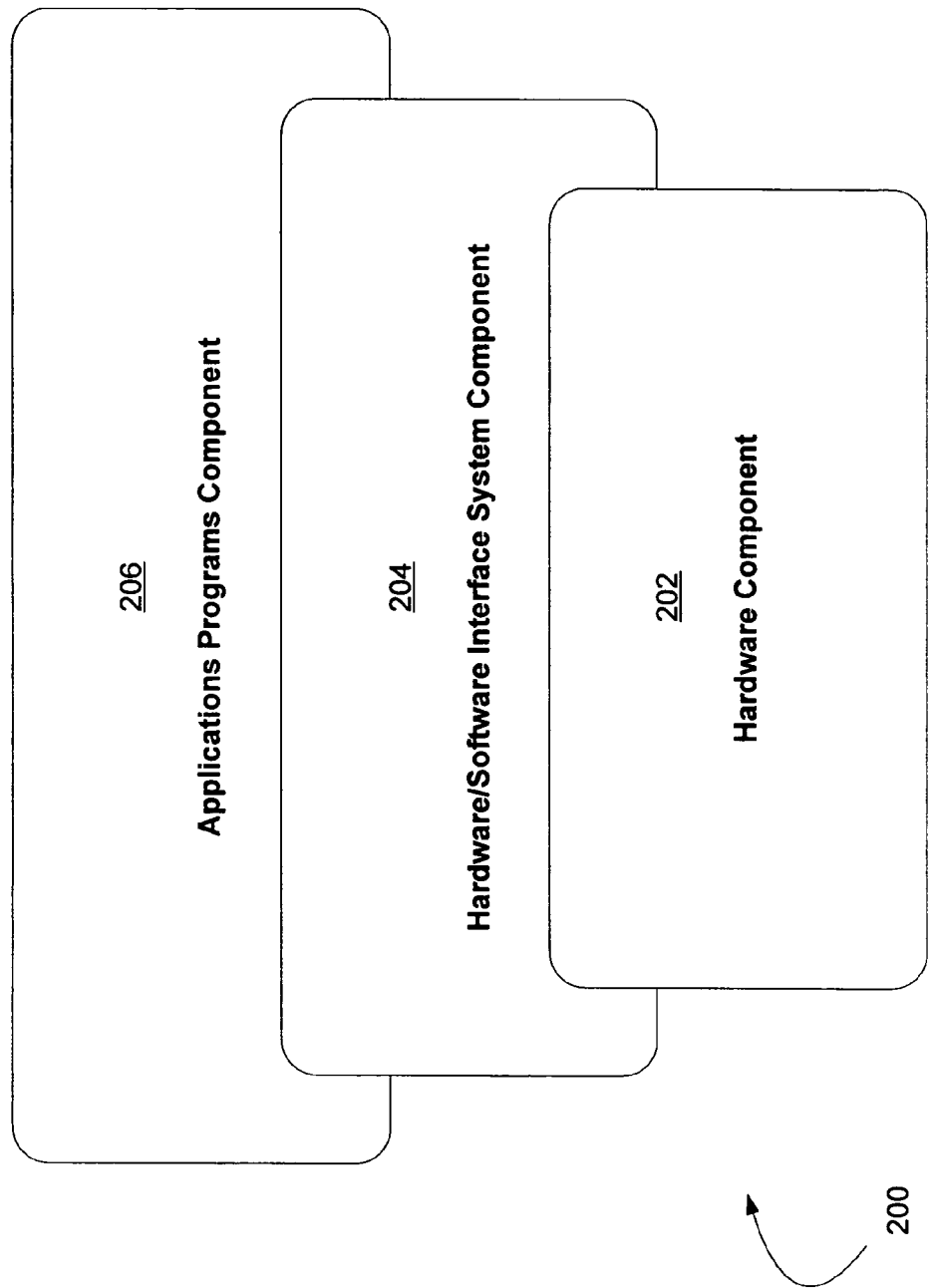

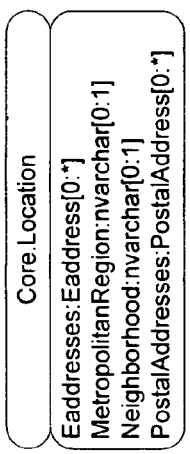
FIG. 5A
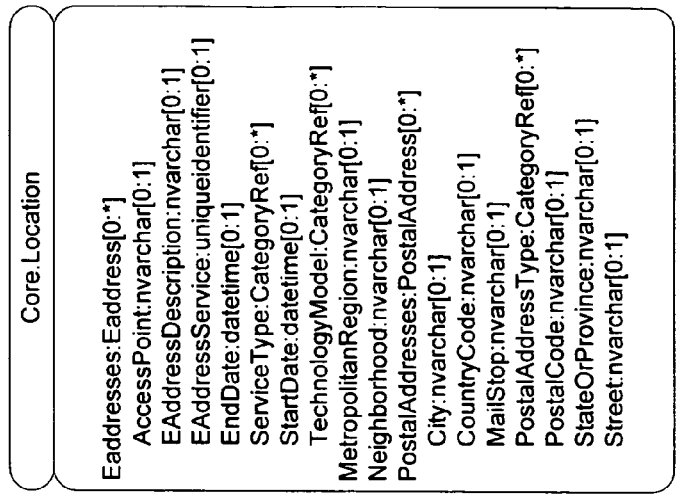
FIG. 5C
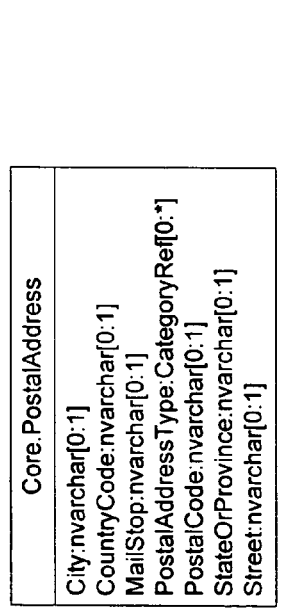
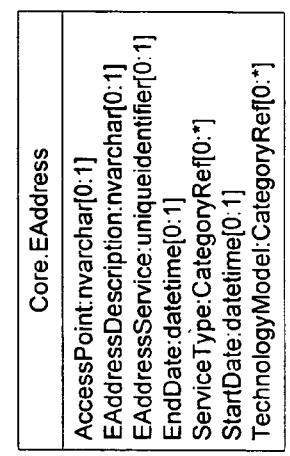
FIG. 5B

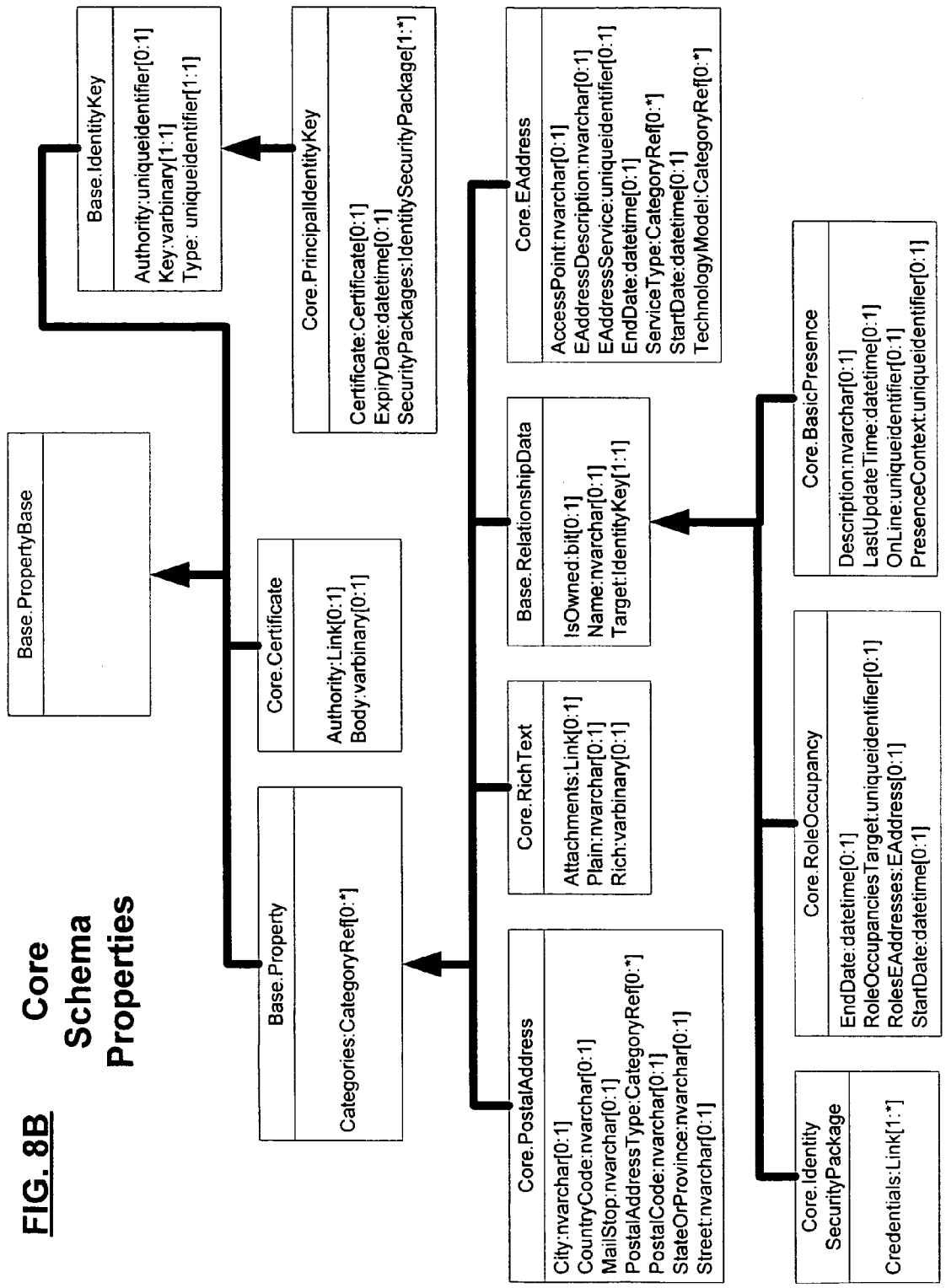
FIG. 8B  Core Schema Properties

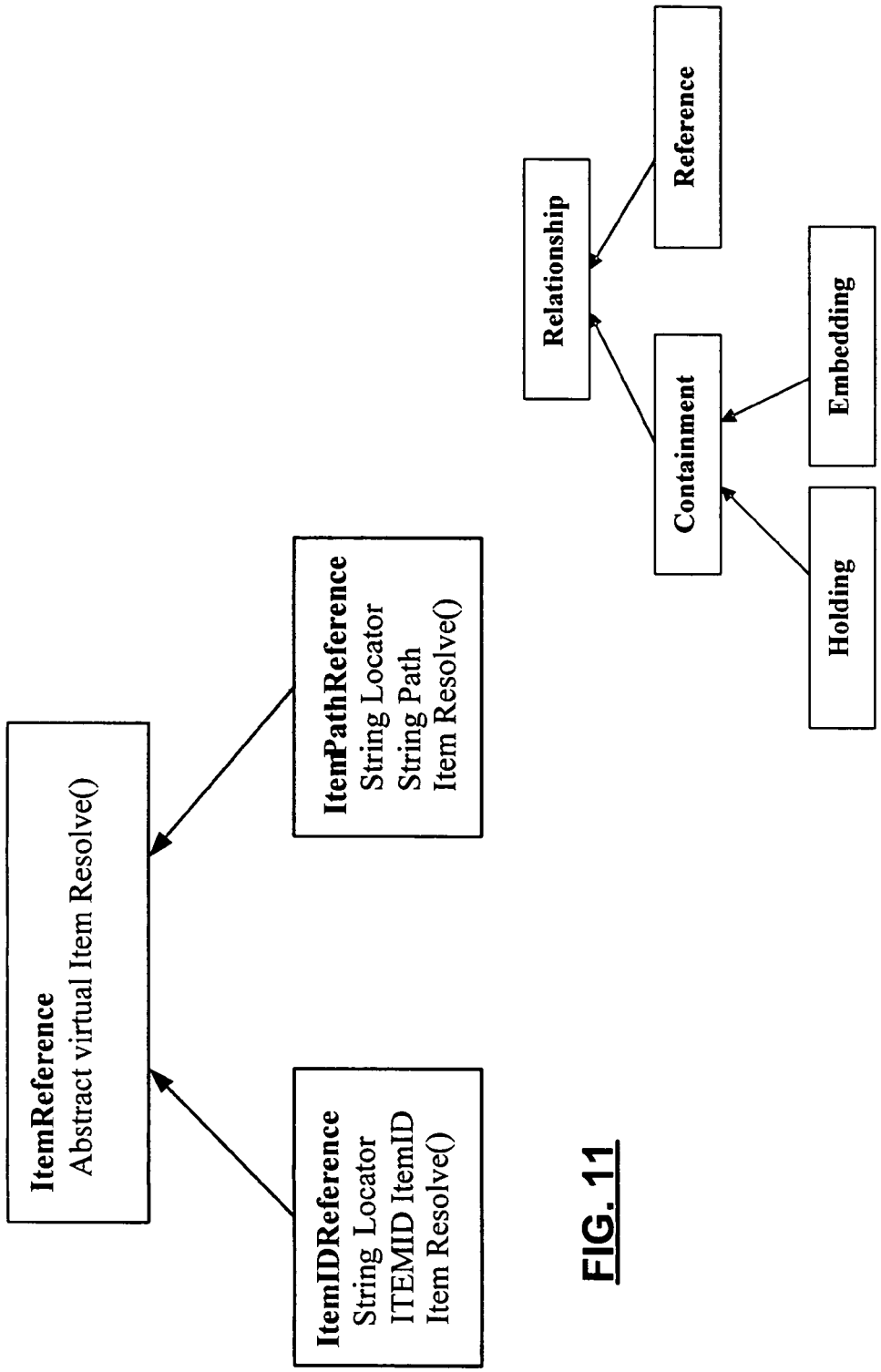

Items Defined in the Files Schema

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| G R | G W | G E | G A | Reserved | | | | A S | Standard Access Rights | | | | | | | Object-Specific Access Rights | | | | | | | | | | | | | | | |

GR --> Generic_Read
GW --> Generic_Write
GE --> Generic_Execute
GA --> Generic_ALL
AS --> Right to access SACL

FIG. 26

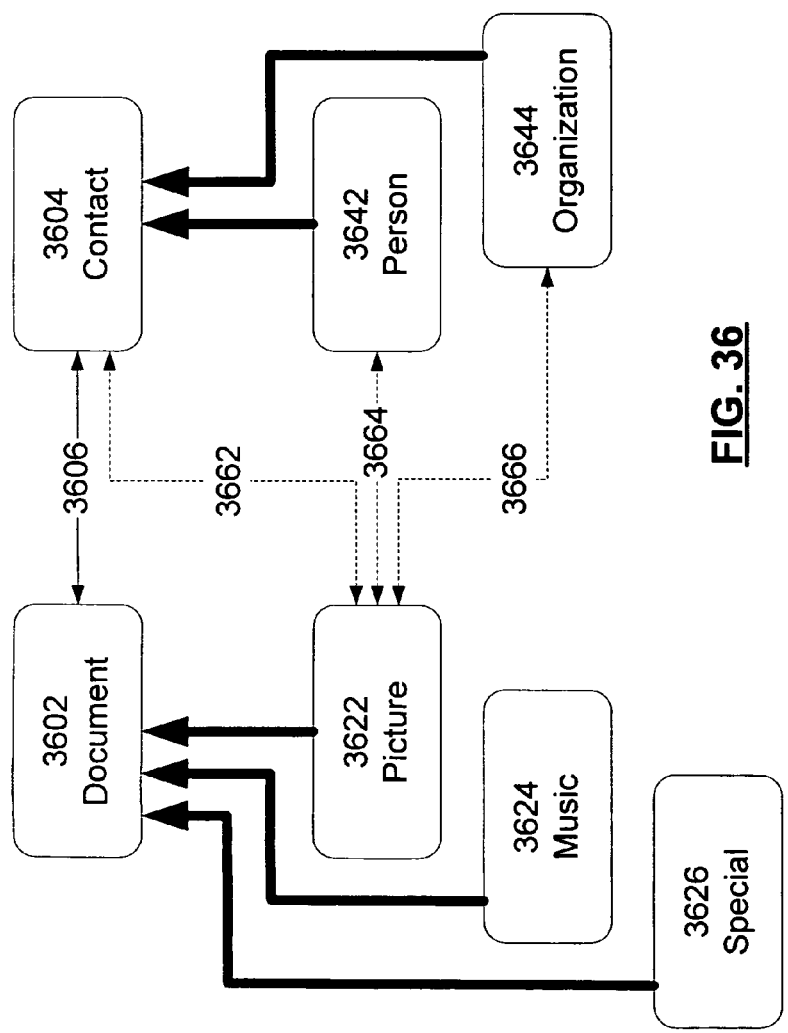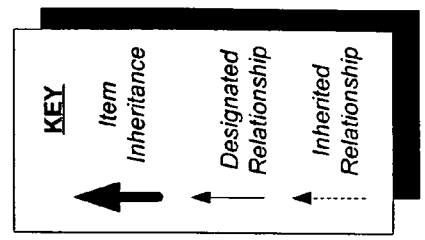
FIG. 36

SYSTEMS AND METHODS FOR EXTENSIONS AND INHERITANCE FOR UNITS OF INFORMATION MANAGEABLE BY A HARDWARE/SOFTWARE INTERFACE SYSTEM

CROSS-REFERENCE

This application is a continuation-in-part of U.S. patent application Ser. No. 10/646,580, filed on Aug. 21, 2003, now U.S. Pat. No. 7,428,546 entitled "SYSTEMS AND METHODS FOR DATA MODELING IN AN ITEM-BASED STORAGE PLATFORM", the contents of which are herein incorporated by reference.

This application is related by subject matter to the inventions disclosed in the following commonly assigned applications, the contents of which are hereby incorporated by reference into this present application in their entirety (and partially summarized herein for convenience): U.S. patent application Ser. No. 10/647,058, filed on Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,645, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, filed on Aug. 21, 2003, entitled "STORAGE PLATFORM FOR ORGANIZING, SEARCHING, AND SHARING DATA".

FIELD OF THE INVENTION

The present invention relates generally to the field of information storage and retrieval, and, more particularly, to an active storage platform for organizing, searching, and sharing different types of data in a computerized system. Various embodiments of the present invention are directed to the use of extension and inheritance methods utilized by a hardware/software interface system to manage data.

BACKGROUND

Individual disk capacity has been growing at roughly seventy percent (70%) per year over the last decade. Moore's law accurately predicted the tremendous gains in central processing unit (CPU) power that has occurred over the years. Wired and wireless technologies have provided tremendous connectivity and bandwidth. Presuming current trends continue, within several years the average laptop computer will possess roughly one terabyte (TB) of storage and contain millions of files, and 500 gigabyte (GB) drives will become commonplace.

Consumers use their computers primarily for communication and organizing personal information, whether it is traditional personal information manager (PIM) style data or media such as digital music or photographs. The amount of digital content, and the ability to store the raw bytes, has increased tremendously; however the methods available to consumers for organizing and unifying this data has not kept pace. Knowledge workers spend enormous amounts of time managing and sharing information, and some studies estimate that knowledge workers spend 15-25% of their time on non-productive information related activities. Other studies estimate that a typical knowledge worker spends about 2.5 hours per day searching for information.

Developers and information technology (IT) departments invest significant amounts of time and money in building their own data stores for common storage abstractions to represent such things as people, places, times, and events. Not only does this result in duplicated work, but it also creates islands of common data with no mechanisms for common searching or sharing of that data. Just consider how many address books can exist today on a computer running the Microsoft Windows operating system. Many applications, such as e-mail clients and personal finance programs, keep individual address books, and there is little sharing among applications of the address book data that each such program individually maintains. Consequently, a finance program (like Microsoft Money) does not share addresses for payees with the addresses maintained in an email contact folder (like the one in Microsoft Outlook). Indeed, many users have multiple devices and logically should synchronize their personal data amongst themselves and across a wide variety of additional sources, including cell phones to commercial services such as MSN and AOL; nevertheless, collaboration of shared documents is largely achieved by attaching documents to e-mail messages—that is, manually and inefficiently.

One reason for this lack of collaboration is that traditional approaches to the organization of information in computer systems have centered on the use of file-folder-and-directory-based systems ("file systems") to organize pluralities of files into directory hierarchies of folders based on an abstraction of the physical organization of the storage medium used to store the files. The Multics operating system, developed during the 1960s, can be credited with pioneering the use of the files, folders, and directories to manage storable units of data at the operating system level. Specifically, Multics used symbolic addresses within a hierarchy of files (thereby introducing the idea of a file path) where physical addresses of the files were not transparent to the user (applications and end-users). This file system was entirely unconcerned with the file format of any individual file, and the relationships amongst and between files was deemed irrelevant at the operating system level (that is, other than the location of the file within the hierarchy). Since the advent of Multics, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of indirection (interpretation) between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable. Moreover, existing file systems know little about the structure of data stored in individual files and, because of this, most of the information remains locked up in files that may only be accessed (and comprehensible) to the applications that wrote them. Consequently, this lack of schematic description of information, and mechanisms for managing information, leads to the creation of silos of data with little data sharing among the individual silos. For example, many personal computer (PC) users have more than five distinct stores that contain information about the people they interact with on some level—for example, Outlook Contacts, online account addressees, Windows Address Book, Quicken Payees, and instant messaging (IM) buddy lists—because organizing files presents a significant challenge to these PC users. Because most existing file systems utilize a nested folder metaphor for organizing files and folders, as the number of files increases the effort necessary to maintain an organization scheme that is flexible and efficient becomes quite daunting. In such situations, it would be very useful to have multiple classifications of a single file; however, using hard or soft links in existing file systems is cumbersome and difficult to maintain.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file and folder based hierarchical structure at the hardware/software interface system level. Other efforts, such as those that attempted to use SmallTalk (and other derivatives), proved to be quite effective at handling file and non-file representations but lacked database features necessary to efficiently organize and utilize the relationships that exist between the various data files, and thus the overall efficiency of such systems was unacceptable. Yet other attempts to use BeOS (and other such operating systems research) proved to be inadequate at handling non-file representations—the same core shortcoming of traditional file systems—despite being able to adequately represent files while providing some necessary database features.

Database technology is another area of the art in which similar challenges exits. For example, while the relational database model has been a great commercial success, in truth independent software vendors (ISV) generally exercise a small portion of the functionality available in relational database software products (such as Microsoft SQL Server). Instead, most of an application's interaction with such a product is in the form of simple "gets" and "puts". While there are a number of readily apparent reasons for this—such as being platform or database agnostic—one key reason that often goes unnoticed is that the database does not necessarily provide the exact abstractions that a major business application vendor really needs. For example, while the real world has the notion of "items", such as "customers" or "orders" (along with an order's embedded "line items" as items in and of themselves), relational databases only talk in terms of tables and rows. Consequently, while the application may desire to have aspects of consistency, locking, security, and/or triggers at the item level (to name a few), generally databases provide these features only at the table/row level. While this may work fine if each item gets mapped to a single row in some table in the database, in the case of an order with multiple line items there may be reasons why an item actually gets mapped to multiple tables and, when that is the case, the simple relational database system does not quite provide the right abstractions. Consequently, an application must build logic on top of the database to provide these basic abstractions. In other words, the basic relational model does not provide a sufficient platform for storage of data on which higher-level applications can easily be developed because the basic relational model requires a level of indirection between the application and the storage system—where the semantic structure of the data might only be visible in the application in certain instances. While some database vendors are building higher-level functionality into their products—such as providing object relational capabilities, new organizational models, and the like—none have yet to provide the kind of comprehensive solution needed, where a truly comprehensive solution is one which provides both useful data model abstractions (such as "Items," "Extensions," "Relationships," and so on) for useful domain abstractions (such as "Persons," "Locations," "Events," etc.).

In view of the foregoing deficiencies in existing data storage and database technologies, there is a need for a new storage platform that provides an improved ability to organize, search, and share all types of data in a computer system—a storage platform that extends and broadens the data platform beyond existing file systems and database systems, and that is designed to be the store for all types of data. The present invention, together with the related inventions incorporated by reference earlier herein, satisfies this need. In particular, the present invention provides methods of extension and inheritance for objects manipulated by a hardware/software interface system.

SUMMARY

The following summary provides an overview of various aspects of the invention described in the context of the related inventions incorporated-by-reference earlier herein (the "related inventions"). This summary is not intended to provide an exhaustive description of all of the important aspects of the invention, nor to define the scope of the invention. Rather, this summary is intended to serve as an introduction to the detailed description and figures that follow.

The present invention, as well as the related inventions, are collectively directed to a storage platform for organizing, searching, and sharing data. The storage platform of the present invention extends and broadens the concept of data storage beyond existing file systems and database systems, and is designed to be the store for all types of data including structured, non-structured, or semi-structured data.

The storage platform of the present invention comprises a data store implemented on a database engine. The database engine comprises a relational database engine with object relational extensions. The data store implements a data model that supports organization, searching, sharing, synchronization, and security of data. Specific types of data are described in schemas, and the platform provides a mechanism to extend the set of schemas to define new types of data (essentially subtypes of the basic types provides by the schemas). A synchronization capability facilitates the sharing of data among users or systems. File-system-like capabilities are provided that allow interoperability of the data store with existing file systems but without the limitation of such traditional file systems. A change tracking mechanism provides the ability track changes to the data store. The storage platform further comprises a set of application program interfaces that enable applications to access all of the foregoing capabilities of the storage platform and to access the data described in the schemas.

The data model implemented by the data store defines units of data storage in terms of items, elements, and relationships. An item is a unit of data storable in a data store and can comprise one or more elements and relationships. An element is an instance of a type comprising one or more fields (also referred to herein as a property). A relationship is a link between two items. (As used herein, these and other specific terms may be capitalized in order to offset them from other terms used in close proximity; however, there is no intention whatsoever to distinguish between a capitalized term, e.g. "Item", and the same term when not capitalized, e.g., "item", and no such distinction should be presumed or implied.)

The computer system further comprises a plurality of Items where each Item constitutes a discrete storable unit of information that can be manipulated by a hardware/software interface system; a plurality of Item Folders that constitute an organizational structure for said Items; and a hardware/software interface system for manipulating a plurality of Items and wherein each Item belongs to at least one Item Folder and may belong to more than one Item Folder.

An Item or some of the Item's property values may be computed dynamically as opposed to being derived from a persistent store. In other words, the hardware/software interface system does not require that the Item be stored, and certain operations are supported such as the ability to enumerate the current set of Items or the ability to retrieve an Item given its identifier (which is more fully described in the sections that describe the application programming interface, or API) of the storage platform—for example, an Item might be the current location of a cell phone or the temperature reading on a temperature sensor. The hardware/software interface system may manipulate a plurality of Items, and may further comprise Items interconnected by a plurality of Relationships managed by the hardware/software interface system.

A hardware/software interface system for the computer system further comprises a core schema to define a set of core Items which said hardware/software interface system understands and can directly process in a predetermined and predictable way. To manipulate a plurality of Items, the computer system interconnects said Items with a plurality of Relationships and manages said Relationships at the hardware/software interface system level.

The API of the storage platform provides data classes for each item, item extension, and relationship defined in the set of storage platform schemas. In addition, the application programming interface provides a set of framework classes that define a common set of behaviors for the data classes and that, together with the data classes, provide the basic programming model for the storage platform API. The storage platform API provides a simplified query model that enables application programmers to form queries based on various properties of the items in the data store, in a manner that insulates the application programmer from the details of the query language of the underlying database engine. The storage platform API also collects changes to an item made by an application program and then organizes them into the correct updates required by the database engine (or any kind of storage engine) on which the data store is implemented. This enables application programmers to make changes to an item in memory, while leaving the complexity of data store updates to the API.

Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods.

Within view of this overarching structure of interrelated inventions (described in detail in Section II of the Detailed Description), the present invention is specifically directed to the use of Extensions to extend functionality of Item and Property types, as well as to the use of Inheritance to facilitate efficient searching and organization among related Items (described in detail in Section III of the Detailed Description). Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 2 is a block diagram illustrating a computer system divided into three component groups: the hardware component, the hardware/software interface system component, and the application programs component;

FIG. 5A is a block diagram illustrating the structure of an Item;

FIG. 5B is a block diagram illustrating the complex property types of the Item of FIG. 5A;

FIG. 5C is a block diagram illustrating the "Location" Item wherein its complex types are further described (explicitly listed);

FIG. 8B is a block diagram illustrating the property types in the Core Schema;

FIG. 11 is a diagram illustrating a reference type hierarchy of the data model of the storage platform;

FIG. 12 is a diagram illustrating how relationships are classified;

FIG. 26 is a diagram illustrating an access mask format used for data security purposes;

FIG. 36 illustrates a series of interrelated Items and a subset of their Relationships;

DETAILED DESCRIPTION

Figure 1:
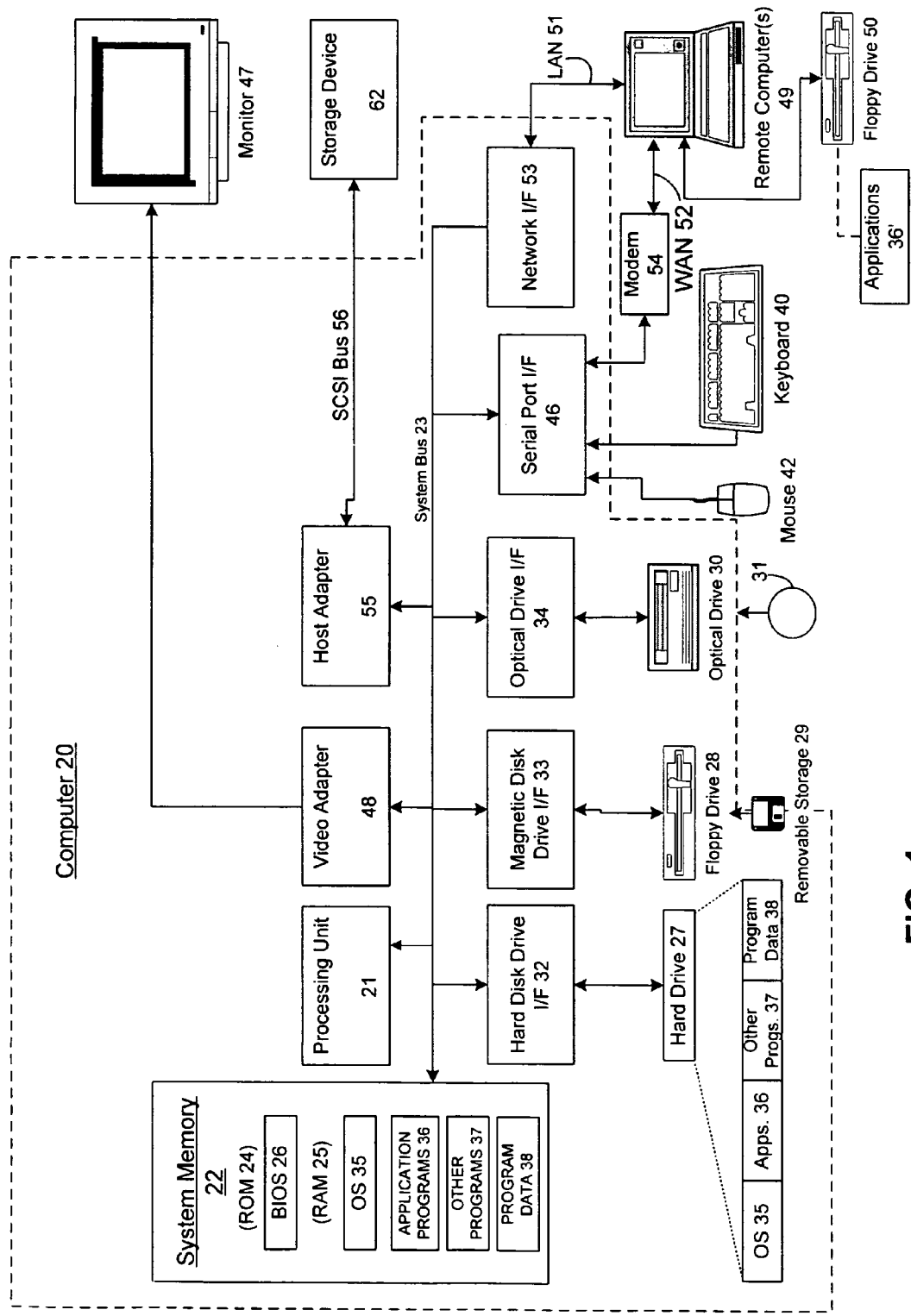
FIG. 1 is a block diagram representing a computer system in which aspects of the present invention may be incorporated.

| TABLE OF CONTENTS | |
|---|---|
| I. INTRODUCTION | 18 |
|    A. EXEMPLARY COMPUTING ENVIRONMENT | 18 |
|    B. TRADITIONAL FILE-BASED STORAGE | 22 |
| II. WINFS STORAGE PLATFORM FOR ORGANIZING, SEARCHING, AND SHARING DATA | 24 |
|    C. GLOSSARY | 24 |
|    D. STORAGE PLATFORM OVERVIEW | 25 |
|    E. THE DATA MODEL | 26 |
|       1. Items | 28 |
|       2. Item Identification | 32 |
|       3. Item Folders and Categories | 32 |
|       4. Schemas | 34 |
|          a) Base Schema | 34 |
|          b) Core Schema | 35 |
|       5. Relationships | 37 |
|          a) Relationship Declaration | 38 |
|          b) Holding Relationship | 39 |
|          c) Embedding Relationships | 40 |
|          d) Reference Relationships | 41 |
|          e) Rules and Constraints | 42 |
|          f) Ordering of Relationships | 42 |
|       6. Extensibility | 48 |
|          a) Item extensions | 49 |
|          b) Extending NestedElement types | 53 |
|    F. DATABASE ENGINE | 55 |
|       1. Data Store Implementation Using UDTs | 56 |
|       2. Item Mapping | 57 |
|       3. Extension Mapping | 58 |
|       4. Nested Element Mapping | 58 |
|       5. Object Identity | 58 |

TABLE OF CONTENTS -continued

| | | | | |
|---|---|---|---|---|
| | 6. | SQL Object Naming | | 58 |
| | 7. | Column Naming | | 59 |
| | 8. | Search Views | | 60 |
| | | a) | Item | 61 |
| | | | (1) Master Item Search View | 61 |
| | | | (2) Typed Item Search Views | 61 |
| | | b) | Item Extensions | 62 |
| | | | (1) Master Extension Search View | 62 |
| | | | (2) Typed Extension Search Views | 63 |
| | | c) | Nested Elements | 63 |
| | | d) | Relationships | 64 |
| | | | (1) Master Relationship Search View | 64 |
| | | | (2) Relationship Instance Search Views | 64 |
| | | e) | | 65 |
| | 9. | Updates | | 65 |
| | 10. | Change Tracking & Tombstones | | 66 |
| | | a) | Change Tracking | 66 |
| | | | (1) Change Tracking in "Master" Search Views | 66 |
| | | | (2) Change Tracking in "Typed" Search Views | 67 |
| | | b) | Tombstones | 68 |
| | | | (1) Item Tombstones | 68 |
| | | | (2) Extension Tombstones | 69 |
| | | | (3) Relationships Tombstone | 69 |
| | | | (4) Tombstone Cleanup | 70 |
| | 11. | Helper APIs and Functions | | 70 |
| | | a) | Function [System.Storage].GetItem | 70 |
| | | b) | Function [System.Storage].GetExtension | 70 |
| | | c) | Function [System.Storage].GetRelationship | 71 |
| | 12. | Metadata | | 71 |
| | | a) | Schema Metadata | 71 |
| | | b) | Instance Metadata | 71 |
| G. | SECURITY | | | 71 |
| H. | NOTIFICATIONS AND CHANGE TRACKING | | | 72 |
| I. | SYNCHRONIZATION | | | 73 |
| | 1. | Storage-Platform-to-Storage Platform Synchronization | | 73 |
| | | a) | Synchronization (Sync) Controlling Applications | 74 |
| | | b) | Schema annotation | 75 |
| | | c) | Sync Configuration | 76 |
| | | | (1) Community Folder - Mappings | 76 |
| | | | (2) Profiles | 77 |
| | | | (3) Schedules | 78 |
| | | d) | Conflict Handling | 78 |
| | | | (1) Conflict Detection | 79 |
| | | | (a) Knowledge-based Conflicts | 79 |
| | | | (b) Constraint-based Conflicts | 79 |
| | | | (2) Conflict Processing | 80 |
| | | | (a) Automatic Conflict resolution | 80 |
| | | | (b) Conflict Logging | 81 |
| | | | (c) Conflict inspection and resolution | 81 |
| | | | (d) Convergence of replicas and Propagation of Conflict Resolutions | 81 |
| | 2. | Synchronizing to non-storage platform data stores | | 82 |
| | | a) | Sync Services | 83 |
| | | | (1) Change Enumeration | 83 |
| | | | (2) Change Application | 84 |
| | | | (3) Conflict Resolution | 84 |
| | | b) | Adapter Implementation | 85 |
| | 3. | Security | | 85 |
| | 4. | Manageability | | 86 |
| J. | TRADITIONAL FILE SYSTEM INTEROPERABILITY | | | 86 |
| K. | STORAGE PLATFORM API | | | 87 |
| III. | EXTENSIONS AND INHERITANCE | | | 94 |
| A. | TYPE SYSTEM | | | 94 |
| B. | TYPE FAMILIES | | | 99 |
| | 1. | Nested Element Types | | 100 |
| | 2. | Item Types | | 100 |
| | 3. | Relationship Types | | 100 |
| | | a) | Relationship Semantics | 102 |
| | | b) | Relationship Rules and Constraints | 104 |
| | 4. | Extension Types | | 105 |
| C. | EHANCED FUNCTIONALITY | | | 106 |
| | 1. | Inheritance | | 106 |
| | 2. | Extensions | | 107 |
| IV. | CONCLUSION | | | 108 |

I. Introduction

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

A. Exemplary Computing Environment

Numerous embodiments of the present invention may execute on a computer. FIG. 1 and the following discussion is intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As illustrated in the block diagram of FIG. 2, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

B. Traditional File-Based Storage

In most computer systems today, "files" are units of storable information that may include the hardware/software interface system as well as application programs, data sets, and so forth. In all modern hardware/software interface systems (Windows, Unix, Linux, Mac OS, virtual machine systems, and so forth), files are the basic discrete (storable and retrievable) units of information (e.g., data, programs, and so forth) that can be manipulated by the hardware/software interface system. Groups of files are generally organized in "folders." In Microsoft Windows, the Macintosh OS, and other hardware/software interface systems, a folder is a collection of files that can be retrieved, moved, and otherwise manipulated as single units of information. These folders, in turn, are organized in a tree-based hierarchical arrangement called a "directory" (discussed in more detail herein below). In certain other hardware/software interface systems, such as DOS, z/OS and most Unix-based operating systems, the terms "directory" and/or "folder" are interchangeable, and early Apple computer systems (e.g., the Apple IIe) used the term "catalog" instead of directory; however, as used herein, all of these terms are deemed to be synonymous and interchangeable and are intended to further include all other equivalent terms for and references to hierarchical information storage structures and their folder and file components.

Figure 2A:
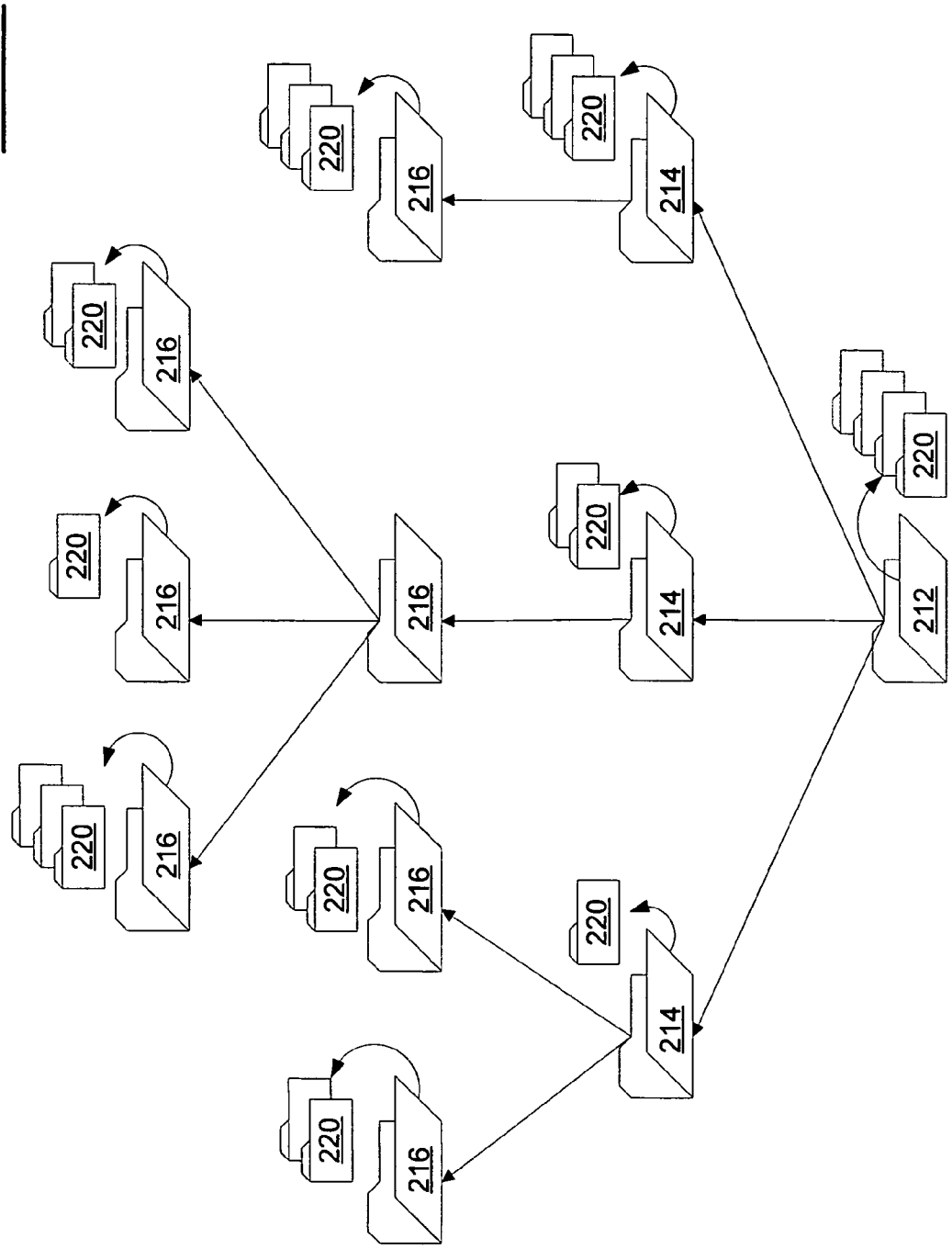
FIG. 2A illustrates the traditional tree-based hierarchical structure for files grouped in folders in a directory in a file-based operating system.

Traditionally, a directory (a.k.a. a directory of folders) is a tree-based hierarchical structure wherein files are grouped into folders and folder, in turn, are arranged according to relative nodal locations that comprise the directory tree. For example, as illustrated in FIG. 2A, a DOS-based file system base folder (or "root directory") 212 may comprise a plurality of folders 214, each of which may further comprise additional folders (as "subfolders" of that particular folder) 216, and each of these may also comprise additional folders 218 ad infinitum. Each of these folders may have one or more files 220 although, at the hardware/software interface system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files—that is, each folder owns its subfolders and files. For example, when a folder is deleted by the hardware/software interface system, that folder's subfolders and files are also deleted (which, in the case of each subfolder, further includes its own subfolders and files recursively). Likewise, each file is generally owned by only one folder and, although a file can be copied and the copy located in a different folder, a copy of a file is itself a distinct and separate unit that has no direct connection to the original (e.g., changes to the original file are not mirrored in the copy file at the hardware/software interface system level). In this regard, files and folders are therefore characteristically "physical" in nature because folders are the treated like physical containers, and files are treated as discrete and separate physical elements inside these containers.

II. WinFS Storage Platform for Organizing, Searching, and Sharing Data

The present invention, in combination with the related inventions incorporated by reference as discussed earlier herein, is directed to a storage platform for organizing, searching, and sharing data. The storage platform of the present invention extends and broadens the data platform beyond the kinds of existing file systems and database systems discussed above, and is designed to be the store for all types of data, including a new form of data called Items.

C. Glossary

As used herein and in the claims, the following terms have the following meanings:

An "Item" is an unit of storable information accessible to a hardware/software interface system that, unlike a simple file, is an object having a basic set of properties that are commonly supported across all objects exposed to an end-user by the hardware/software interface system shell. Items also have properties and relationships that are commonly supported across all Item types including features that allow new properties and relationships to be introduced (and discussed in great detail later herein).

An "operating system" (OS) is a special program that acts as an intermediary between application programs and computer hardware. An operating system comprises, in most cases, a shell and a kernel.

A "hardware/software interface system" is software, or a combination of hardware and software, that serves as the interface between the underlying hardware components of a computer system and applications that execute on the computer system. A hardware/software interface system typically comprises (and, in some embodiments, may solely consist of) an operating system. A hardware/software interface system may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

D. Storage Platform Overview

Figure 3:
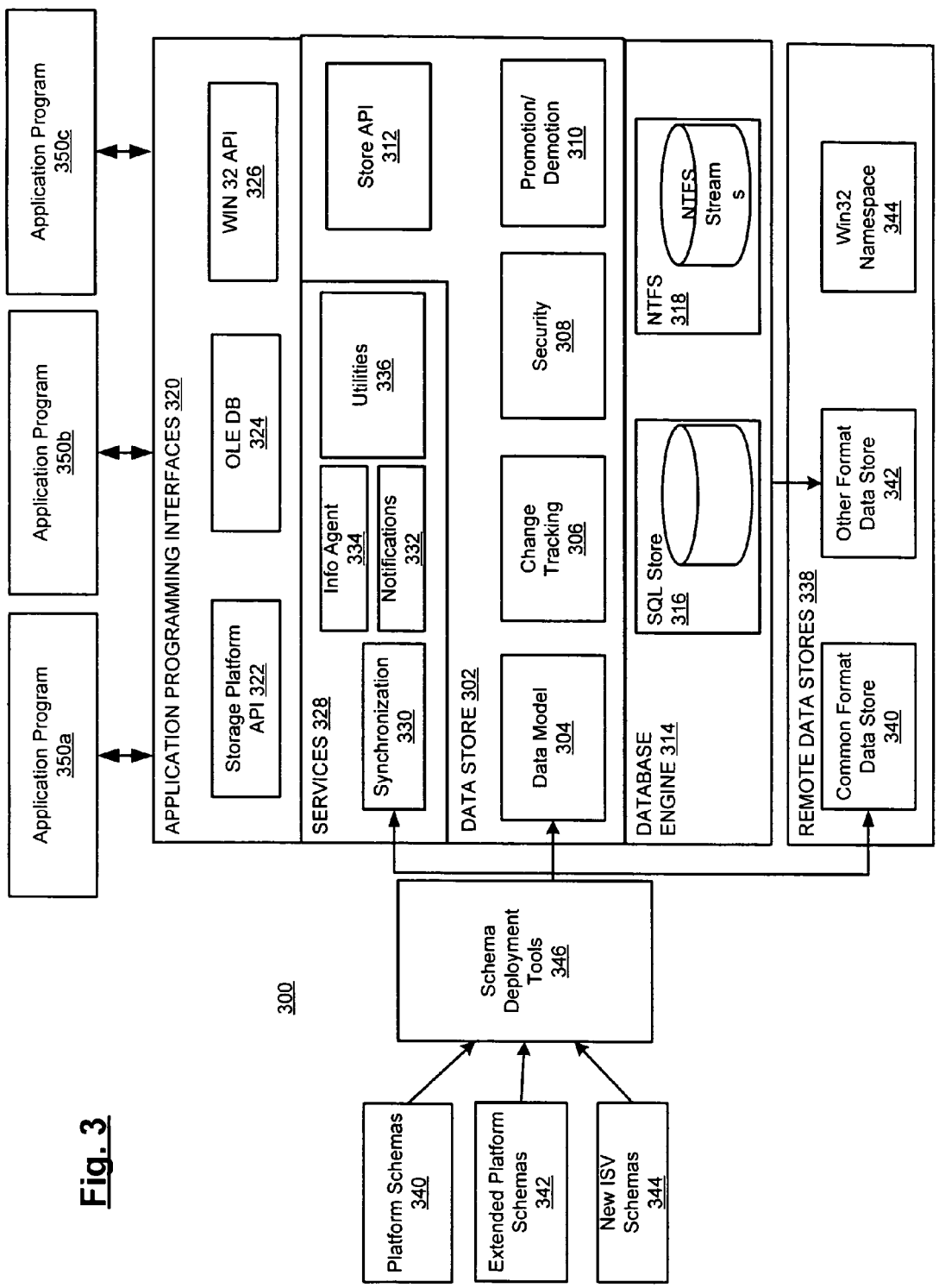
FIG. 3 is a block diagram illustrating a storage platform.

Referring to FIG. 3, a storage platform 300 comprises a data store 302 implemented on a database engine 314. In one embodiment, the database engine comprises a relational database engine with object relational extensions. In one embodiment, the relational database engine 314 comprises the Microsoft SQL Server relational database engine. The data store 302 implements a data model 304 that supports the organization, searching, sharing, synchronization, and security of data. Specific types of data are described in schemas, such as schemas 340, and the storage platform 300 provides tools 346 for deploying those schemas as well as for extending those schemas, as described more fully below.

A change tracking mechanism 306 implemented within the data store 302 provides the ability track changes to the data store. The data store 302 also provides security capabilities 308 and a promotion/demotion capability 310, both of which are discussed more fully below. The data store 302 also provides a set of application programming interfaces 312 to expose the capabilities of the data store 302 to other storage platform components and application programs (e.g., application programs 350a, 350b, and 350c) that utilize the storage platform. The storage platform of the present invention still further comprises an application programming interfaces (API) 322, which enables application programs, such as application programs 350a, 350b, and 350c, to access all of the foregoing capabilities of the storage platform and to access the data described in the schemas. The storage platform API 322 may be used by application programs in combination with other APIs, such as the OLE DB API 324 and the Microsoft Windows Win32 API 326.

The storage platform 300 of the present invention may provide a variety of services 328 to application programs, including a synchronization service 330 that facilitates the sharing of data among users or systems. For example, the synchronization service 330 may enable interoperability with other data stores 340 having the same format as data store 302, as well as access to data stores 342 having other formats. The storage platform 300 also provides file system capabilities that allow interoperability of the data store 302 with existing file systems, such as the Windows NTFS files system 318. In at least some embodiments, the storage platform 320 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent. Through its common storage foundation, and schematized data, the storage platform of the present invention enables more efficient application development for consumers, knowledge workers and enterprises. It offers a rich and extensible programming surface area that not only makes available the capabilities inherent in its data model, but also embraces and extends existing file system and database access methods.

In the following description, and in various ones of the figures, the storage platform 300 of the present invention may be referred to as "WinFS." However, use of this name to refer to the storage platform is solely for convenience of description and is not intended to be limiting in any way.

E. The Data Model

The data store 302 of the storage platform 300 of the present invention implements a data model that supports the organization, searching, sharing, synchronization, and security of data that resides in the store. In the data model of the present invention, an "Item" is the fundamental unit of storage information. The data model provides a mechanism for declaring Items and Item extensions and for establishing relationships between Items and for organizing Items in Item Folders and in Categories, as described more fully below.

The data model relies on two primitive mechanisms, Types and Relationships. Types are structures which provide a format which governs the form of an instance of the Type. The format is expressed as an ordered set of Properties. A Property is a name for a value or set of values of a given Type. For example a USPostalAddress type might have the properties Street, City, Zip, State in which Street, City and State are of type String and Zip is of Type Int32. Street may be multi-valued (i.e. a set of values) allowing the address to have more than one value for the Street property. The system defines certain primitive types that can be used in the construction of other types—these include String, Binary, Boolean, Int16, Int32, Int64, Single, Double, Byte, DateTime, Decimal and GUID. The Properties of a Type may be defined using any of the primitive types or (with some restrictions noted below) any of the constructed types. For example a Location Type might be defined that had Properties Coordinate and Address where the Address Property is of Type USPostalAddress as described above. Properties may also be required or optional.

Relationships can be declared and represent a mapping between the sets of instances of two types. For example there may be a Relationship declared between the Person Type and the Location Type called LivesAt which defines which people live at which locations. The Relationship has a name, two endpoints, namely a source endpoint and a target endpoint. Relationships may also have an ordered set of properties. Both the Source and Target endpoints have a Name and a Type. For example the LivesAt Relationship has a Source called Occupant of Type Person and a Target called Dwelling of Type Location and in addition has properties StartDate and EndDate indicating the period of time for which the occupant lived at the dwelling. Note that a Person may live at multiple dwellings over time and a dwelling may have multiple occupants so the most likely place to put the StartDate and EndDate information is on the relationship itself.

Relationships define a mapping between instances that is constrained by the types given as the endpoint types. For example the LivesAt relationship cannot be a relationship in which an Automobile is the Occupant because an Automobile is not a Person.

The data model does allow the definition of a subtype-supertype relationship between types. The subtype-supertype relationship also known as the BaseType relationship is defined in such a way that if Type A is a BaseType for Type B it must be the case that every instance of B is also an instance of A. Another way of expressing this is that every instance that conforms to B must also conform to A. If, for example A has a property Name of Type String while B has a property Age of Type Int16, it follows that any instance of B must have both a Name and an Age. The type hierarchy may be envisaged as an tree with a single supertype at the root. The branches from the root provide the first level subtypes, the branches at this level provide the second level subtypes and so on to the leaf-most subtypes which themselves do not have any subtypes. The tree is not constrained to be of a uniform depth but cannot contain any cycles. A given Type may have zero or many subtypes and zero or one super type. A given instance may conform to at most one type together with that type's super types. To put it another way, for a given instance at any level in the tree the instance may conform to at most one subtype at that level. A type is said to be Abstract if instances of the type must also be an instance of a subtype of the type.

1. Items

An Item is a unit of storable information that, unlike a simple file, is an object having a basic set of properties that are commonly supported across all objects exposed to an end-user or application program by the storage platform. Items also have properties and relationships that are commonly supported across all Item types including features that allow new properties and relationships to be introduced, as discussed below.

Items are the objects for common operations such as copy, delete, move, open, print, backup, restore, replicate, and so forth. Items are the units that can be stored and retrieved, and all forms of storable information manipulated by the storage platform exist as Items, properties of Items, or Relationships between Items, each of which is discussed in greater detail herein below.

Items are intended to represent real-world and readily-understandable units of data like Contacts, People, Services, Locations, Documents (of all various sorts), and so on. FIG. 5A is a block diagram illustrating the structure of an Item. The unqualified name of the Item is "Location". The qualified name of the Item is "Core.Location" which indicates that this Item structure is defined as a specific type of Item in the Core Schema. (The Core Schema is discussed in more detail later herein.)

The Location Item has a plurality of properties including EAddresses, MetropolitanRegion, Neighborhood, and PostalAddresses. The specific type of property for each is indicated immediately following the property name and is separated from the property name by a colon (":"). To the right of the type name, the number of values permitted for that property type is indicated between brackets ("[ ]") wherein an asterisk ("*") to the right of the colon (":") indicates an unspecified and/or unlimited number ("many"). A "1" to the right of the colon indicates that there can be at most one value. A zero ("0") to the left of the colon indicates that the property is optional (there may be no value at all). A "1" to the left of the colon indicates that there must be at least one value (the property is required). Neighborhood and MetropolitanRegion are both of type "nvarchar" (or equivalent) which is a predefined data type or "simple type" (and denoted herein by the lack of capitalization). EAddresses and PostalAddresses, however, are properties of defined types or "complex types" (as denoted herein by capitalization) of types EAddress and PostalAddress respectively. A complex type is type that is derived from one or more simple data types and/or from other complex types. The complex types for the properties of an Item also constitute "nested elements" since the details of the complex type are nested into the immediate Item to define its properties, and the information pertaining to these complex types is maintained with the Item that has these properties (within the Item's boundary, as discussed later herein). These concepts of typing are well known and readily appreciated by those of skill in the art.

FIG. 5B is a block diagram illustrating the complex property types PostalAddress and EAddress. The PostalAddress property type defines that an Item of property type PostalAddress can be expected to have zero or one City values, zero or one CountryCode values, zero or one MailStop values, and any number (zero to many) of PostalAddressTypes, and so on and so forth. In this way, the shape of the data for a particular property in an Item is hereby defined. The EAddress property type is similarly defined as shown. Although optionally used herein this Application, another way to represent the complex types in the Location Item is to draw the Item with the individual properties of each complex type listed therein. FIG. 5C is a block diagram illustrating the Location Item wherein its complex types are further described. However, it should be understood that this alternative representation of the Location Item in this FIG. 5C is for the exact same Item illustrated in FIG. 5A. The storage platform of the present invention also allows subtyping whereby one property type can be a subtype of another (where the one property type inherits the properties of another, parent property type).

Figure 6B:
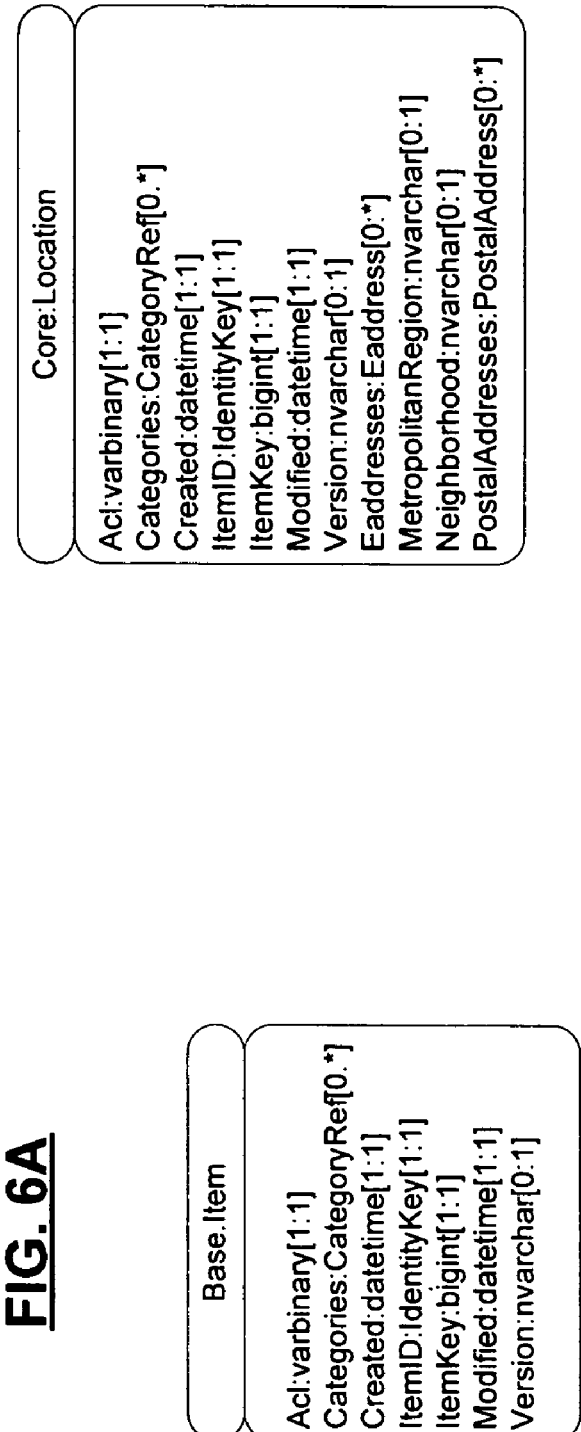
FIG. 6B is a block diagram illustrating the subtype Item of FIG. 6A wherein its inherited types are explicitly listed (in addition to its immediate properties)
Figure 6A:
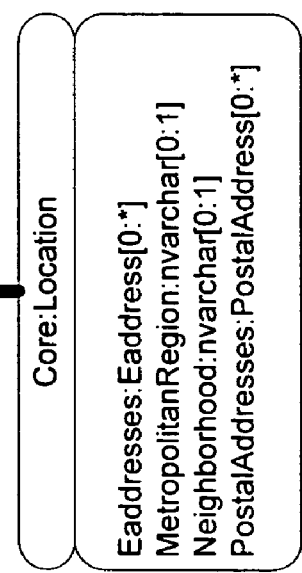
FIG. 6A illustrates an Item as a subtype of the Item found in the Base Schema.

Similar to but distinct from properties and their property types, Items inherently represent their own Item Types that can also be the subject of subtyping. In other words, the storage platform in several embodiments of the present invention allows an Item to be a subtype of another Item (whereby the one Item inherits the properties of the other, parent Item). Moreover, for various embodiments of the present invention, every Item is a subtype of the "Item" Item type which is the first and foundational Item type found in the Base Schema. (The Base Schema will also be discussed in detail later herein.) FIG. 6A illustrates an Item, the Location Item in this Instance, as being a subtype of the Item Item type found in the Base Schema. In this drawing, the arrow indicates that the Location Item (like all other Items) is a subtype of the Item Item type. The Item Item type, as the foundational Item from which all other Items are derived, has a number of important properties such as ItemId and various timestamps, and thereby defines the standard properties of all Items in an operating system. In the present figure, these properties of the Item Item type are inherited by Location and thereby become properties of Location.

Another way to represent the properties in the Location Item inherited from the Item Item type is to draw Location with the individual properties of each property type from the parent Item listed therein. FIG. 6B is a block diagram illustrating the Location Item wherein its inherited types described in addition to its immediate properties. It should be noted and understood that this Item is the same Item illustrated in FIG. 5A, although in the present figure Location is illustrated with all of its properties, both immediate—shown in both this figure and FIG. 5A—and inherited—shown in this figure but not FIG. 5A (whereas in FIG. 5A these properties are referenced by showing with an arrow that the Location Item is a subtype of the Item Item type).

Items are stand-alone objects; thus, if you delete an Item, all of the Items immediate and inherited properties are also deleted. Similarly, when retrieving an Item, what is received is the Item and all of its immediate and inherited properties (including the information pertaining to its complex property types). Certain embodiments of the present invention may enable one to request a subset of properties when retrieving a specific Item; however, the default for many such embodiments is to provide the Item with all of its immediate and inherited properties when retrieved. Moreover, the properties of Items can also be extended by adding new properties to the existing properties of that Item's type. These "extensions" are thereafter bona fide properties of the Item and subtypes of that Item type may automatically include the extension properties.

The "boundary" of the Item is represented by its properties (including complex property types, extensions, and so forth). An Item's boundary also represents the limit of an operation performed on an Item such as copy, delete, move, create, and so on. For example, in several embodiments of the present invention, when an Item is copied, everything within that Item's boundary is also copied. For each Item, the boundary encompasses the following:

The Item Type of the Item and, if the Item is a subtype of another Item (as is the case in several embodiments of the present invention where all Items are derived from a single Item and Item Type in the Base Schema), any applicable subtype information (that is, information pertaining to the parent Item Type). If the original Item being copied is a subtype of another Item, the copy may also be a subtype of that same Item.

The Item's complex-type properties and extensions, if any. If the original Item has properties of complex types (native or extended), the copy may also have the same complex types.

The Item's records on "ownership relationships", that is, the Item's own list of what other Items (the "Target Items") are owned by the present Item (the "Owning Item"). This is particularly relevant in regard to Item Folders, discussed more fully below, and the rule stated below that all Items must belong to at least one Item Folder. Moreover, in regard to embedded items—discussed more fully below—an embedded item is considered to be part of the Item in which it is embedded for operations such as copy, delete, and the like.

2. Item Identification

Items are uniquely identified within the global items space with an ItemID. The Base.Item type defines a field ItemID of type GUID that stores the identity for the Item. An Item must have exactly one identity in the data store 302.

An item reference is a data structure that contains information to locate and identify an Item. In the data model, an abstract type is defined named ItemReference from which all item reference types derive. The ItemReference type defines a virtual method named Resolve. The Resolve method resolves the ItemReference and returns an Item. This method is overridden by the concrete subtypes of ItemReference, which implement a function that retrieves an Item given a reference. The Resolve method is invoked as part of the storage platform API 322.

ItemIDReference is a subtype of ItemReference. It defines a Locator and an ItemID field. The Locator field names (i.e. identifies) an item domain. It is processed by a locator resolution method that can resolve the value of the Locator to an item domain. The ItemID field is of type ItemID ItemPathReference is a specialization of ItemReference that defines a Locator and a Path field. The Locator field identifies an item domain. It is processed by a locator resolution method that can resolve the value of the Locator to an item domain. The Path field contains a (relative) path in the storage platform namespace rooted at the item domain provided by the Locator.

This type of reference cannot be used in a set operation. The reference must generally be resolved through a path resolution process. The Resolve method of the storage platform API 322 provides this functionality.

The reference forms discussed above are represented through the reference type hierarchy illustrated in FIG. 11. Additional reference types that inherit from these types can be defined in the schemas. They can be used in a relationship declaration as type of the target field.

3. Item Folders and Categories

As discussed more fully below, groups of Items can are organized into special Items called Item Folders (which are not to be confused with file folders). Unlike in most file systems, however, an Item can belong to more than one Item Folder, such that when an Item is accessed in one Item Folder and revised, this revised Item can then be accessed directly from another Item folder. In essence, although access to an Item may occur from different Item Folders, what is actually being accessed is in fact the very same Item. However, an Item Folder does not necessarily own all of its member Items, or may simply co-own Items in conjunction with other folders, such that the deletion of an Item Folder does not necessarily result in the deletion of the Item. Nevertheless, in several embodiments of the present invention, an Item must belong to at least one Item Folder so that if the sole Item Folder for a particular Item is deleted then, for some embodiments, the Item is automatically deleted or, in alternative embodiments, the Item automatically becomes a member of a default Item Folder (e.g., a "Trash Can" Item Folder conceptually similar to similarly-named folders used in various file-and-folder-based systems).

As also discussed more fully below, Items may also belong to Categories based on common described characteristic such as (a) an Item Type (or Types), (b) a specific immediate or inherited property (or properties), or (c) a specific value (or values) corresponding to an Item property. For example, a Item comprising specific properties for personal contact information might automatically belong to a Contact Category, and any Item having contact information properties would likewise automatically belong to this Category. Likewise, any Item having a location property with a value of "New York City" might automatically belong to a New York City Category.

Categories are conceptually different form Item Folders in that, whereas Item Folders may comprise Items that are not interrelated (i.e., without a common described characteristic), each Item in a Category has a common type, property, or value (a "commonality") that is described for that Category, and it is this commonality that forms the basis for its relationship to and among the other Items in the Category. Moreover, whereas an Item's membership in a particular Folder is not compulsory based on any particular aspect of that Item, for certain embodiments all Items having a commonality categorically related to a Category might automatically become a member of the Category at the hardware/software interface system level. Conceptually, Categories can also be thought of as virtual Item Folders whose membership is based on the results of a specific query (such as in the context of a database), and Items that meet the conditions of this query (defined by the commonalities of the Category) would thus comprise the Category's membership.

Figure 4:
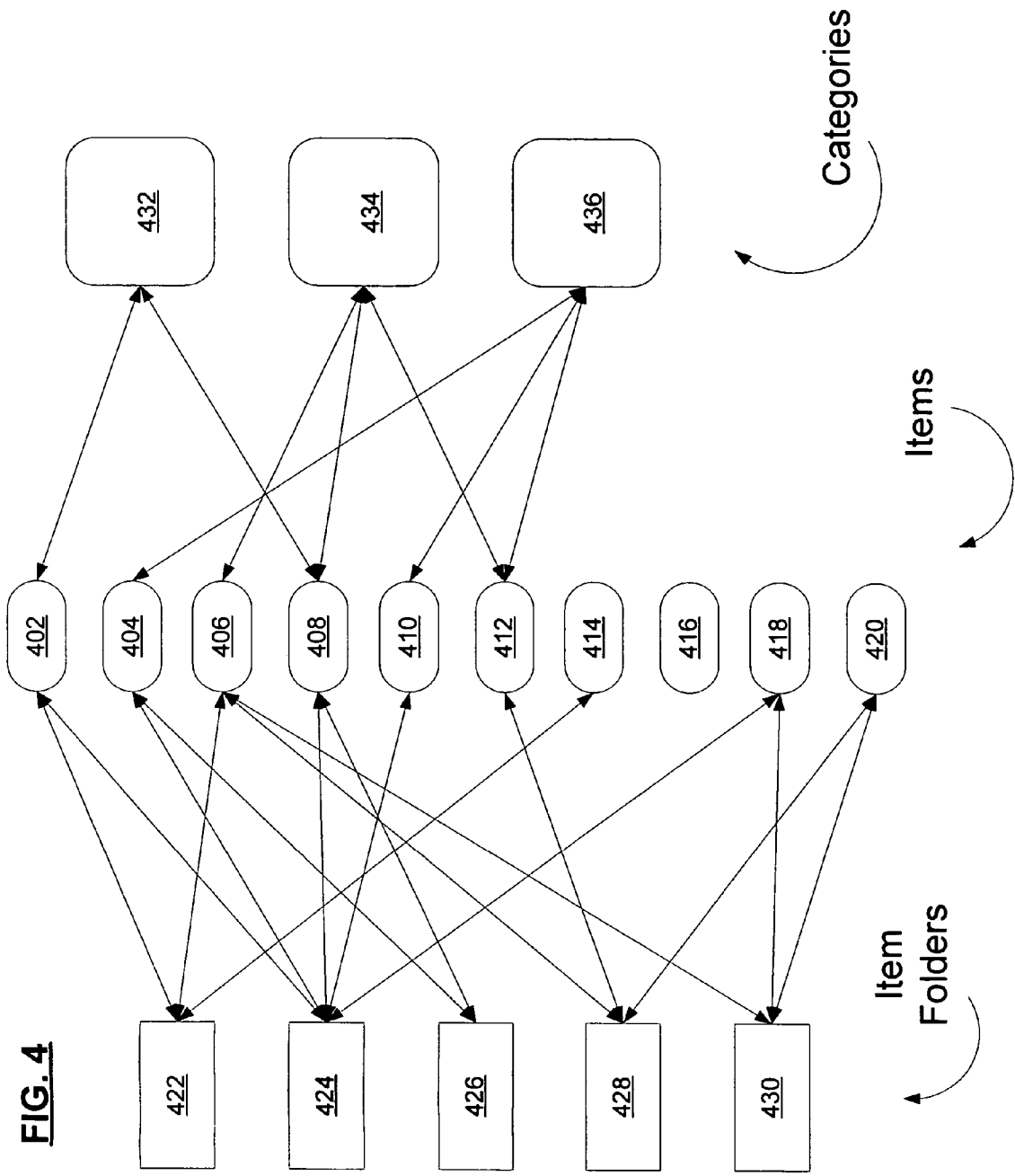
FIG. 4 illustrates the structural relationship between Items, Item Folders, and Categories.

FIG. 4 illustrates the structural relationship between Items, Item Folders, and Categories. A plurality of Items 402, 404, 406, 408, 410, 412, 414, 416, 418, and 420 are members of various Item Folders 422, 424, 426, 428, and 430. Some Items may belong to more than one Item Folder, e.g., Item 402 belong to Item Folders 422 and 424. Some Items, e.g., Item 402, 404, 406, 408, 410, and 412 are also members of one or more Categories 432, 434, and 436, while other times, e.g., Items 414, 416, 418, and 420, may belong to no Categories (although this is largely unlikely in certain embodiments where the possession of any property automatically implies membership in a Category, and thus an Item would have to be completely featureless in order not to be a member of any category in such an embodiment). In contrast to the hierarchical structure of folders, both Categories and Item Folders have structures more akin to directed graphs as shown. In any event, the Items, Item Folders, and Categories are all Items (albeit of different Item Types).

In contrast to files, folders, and directories, the Items, Item Folders, and Categories of the present invention are not characteristically "physical" in nature because they do not have conceptual equivalents of physical containers, and therefore Items may exist in more than one such location. The ability for Items to exist in more than one Item Folder location as well as being organized into Categories provides an enhanced and enriched degree of data manipulation and storage structure capabilities at the hardware/software interface level, beyond that currently available in the art.

4. Schemas a) Base Schema

To provide a universal foundation for the creation and use of Items, various embodiments of the storage platform of the present invention comprise a Base Schema that establishes a conceptual framework for creating and organizing Items and properties. The Base Schema defines certain special types of Items and properties, and the features of these special foundational types from which subtypes can be further derived. The use of this Base Schema allows a programmer to conceptually distinguish Items (and their respective types) from properties (and their respective types). Moreover, the Base Schema sets forth the foundational set of properties that all Items may possess as all Items (and their corresponding Item Types) are derived from this foundational Item in the Base Schema (and its corresponding Item Type).

Figure 7:
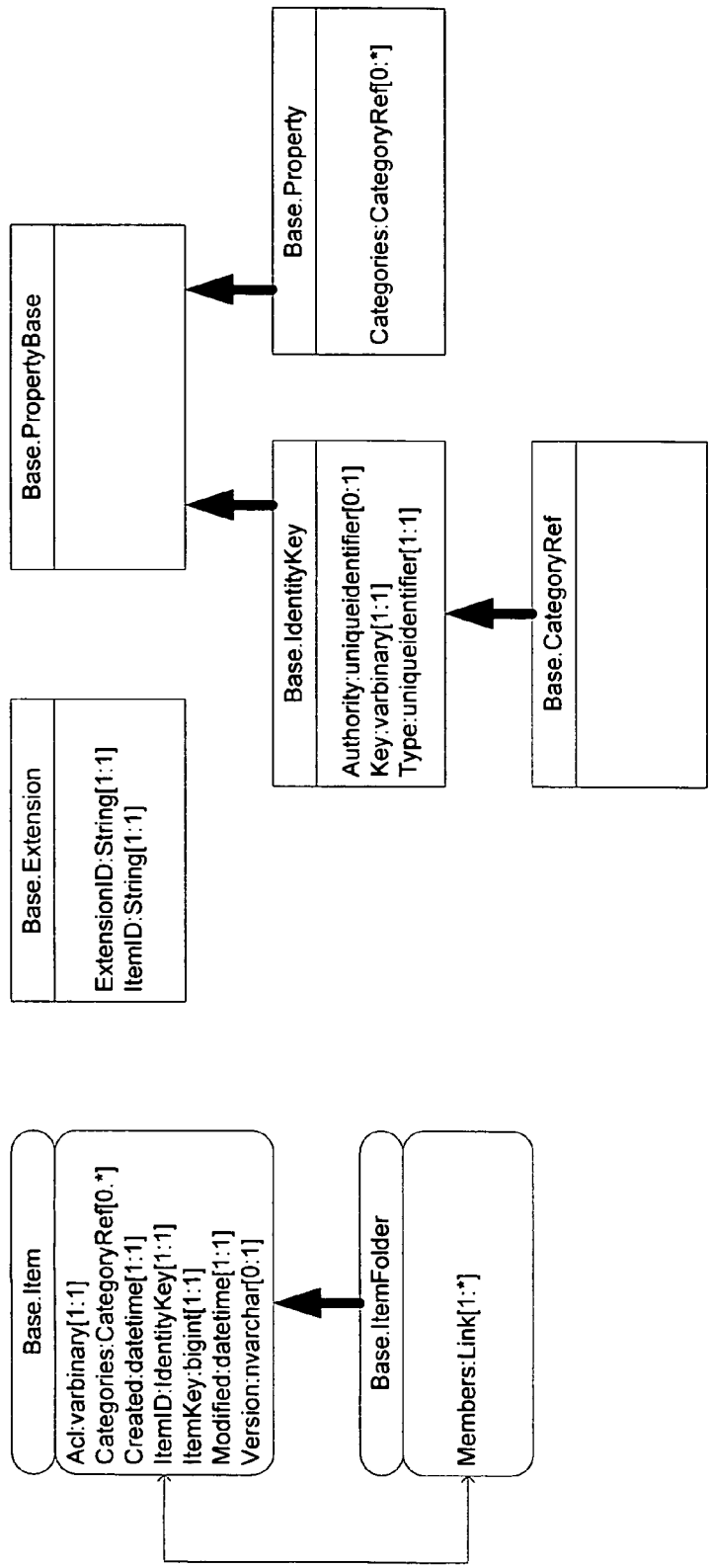
FIG. 7 is a block diagram illustrating the Base Schema including its two top-level class types, Item and Property-Base, and the additional Base Schema types derived therefrom.

As illustrated in FIG. 7, and in regard to several embodiments of the present invention, the Base Schema defines three top-level types: Item, Extension, and PropertyBase. As shown, the Item type is defined by the properties of this foundational "Item" Item type. In contrast, the top level property type "PropertyBase" has no predefined properties and is merely the anchor from which all other property types are derived and through which all derived property types are interrelated (being commonly derived from the single property type). The Extension type properties define which Item the extension extends as well as identification to distinguish one extension from another as an Item may have multiple extensions.

ItemFolder is a subtype of the Item Item type that, in addition to the properties inherited from Item, features a Relationship for establishing links to its members (if any), whereas both IdentityKey and Property are subtypes of PropertyBase. CategoryRef, in turn, is a subtype of IdentityKey.

b) Core Schema

Figure 8A:
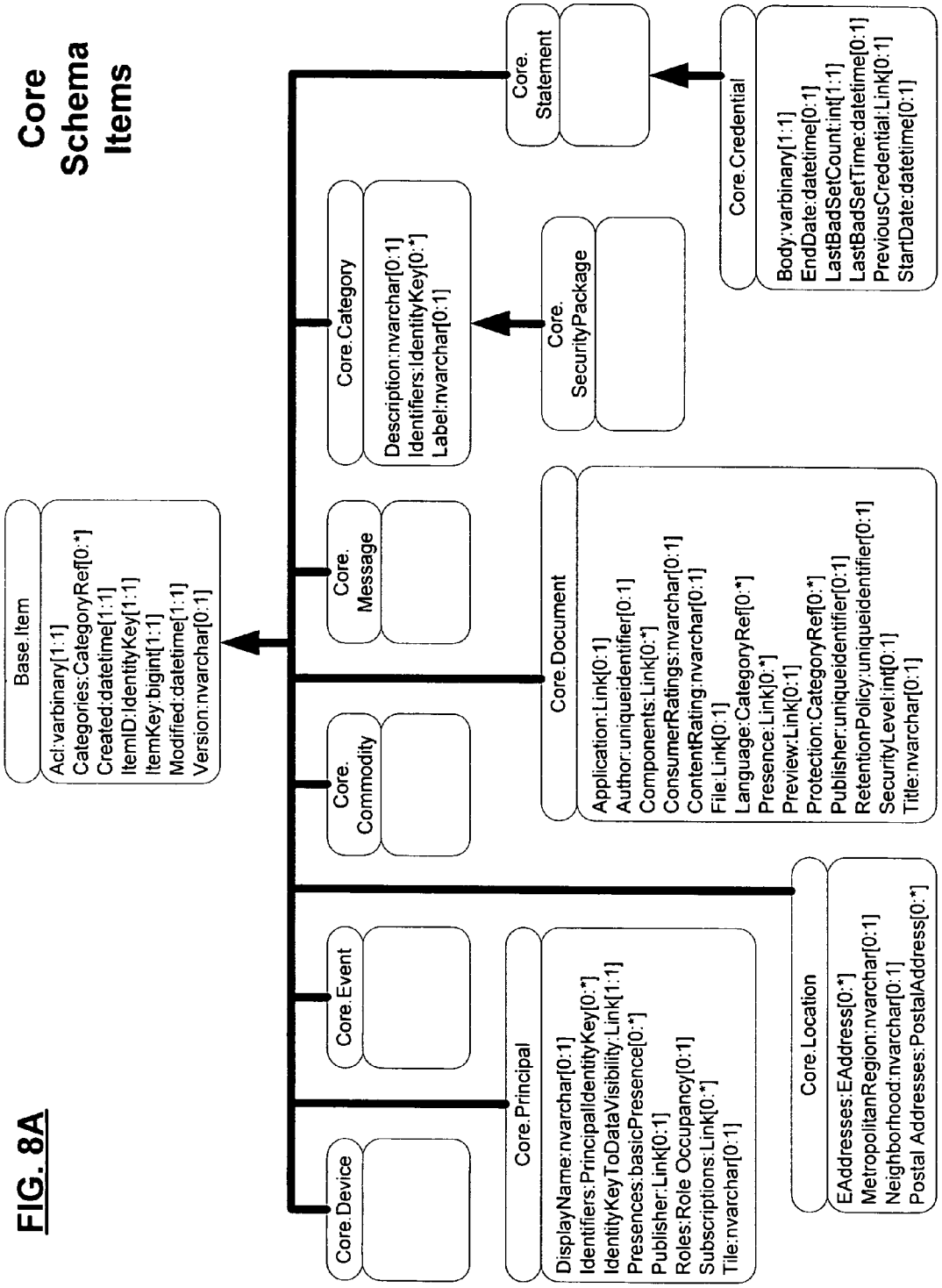
FIG. 8A is a block diagram illustrating Items in the Core Schema.

Various embodiments of the storage platform of the present invention further comprise a Core Schema that provides a conceptual framework for top-level Items type structures. FIG. 8A is a block diagram illustrating Items in the Core Schema, and FIG. 8B is a block diagram illustrating the property types in the Core Schema. The distinction made between files with different extensions (*.com, *.exe, *.bat, *.sys, etc.) and other such criteria in file-and-folder-based systems is analogous to the function of the Core Schema. In the Item-based hardware/software interface system, the Core Schema defines a set of core Item types that, directly (by Item type) or indirectly (by Item subtype), characterize all Items into one or more Core Schema Item types which the Item-based hardware/software interface system understands and can directly process in a predetermined and predictable way. The predefined Item types reflect the most common Items in the Item-based hardware/software interface system and thus a level of efficiency is gained by the Item-based hardware/software interface system understanding these predefined Item types that comprise the Core Schema.

In certain embodiments, the Core Schema is not extendable-that is, no additional Item types can be subtyped directly from the Item type in the Base Schema except for the specific predefined derived Item types that are part of the Core Schema. By preventing extensions to the Core Schema (that is, by preventing the addition of new Items to the Core Schema), the storage platform mandates the use of the Core Schema Item types since every subsequent Item type is necessarily a subtype of a Core Schema Item type. This structure enables a reasonable degree of flexibility in defining additional Item types while also preserving the benefits of having a predefined set of core Item types.

For various embodiments of the present invention, and in reference to FIG. 8A, the specific Item types supported by the Core Schema may include one or more of the following:

Categories: Items of this Item Type (and subtypes derived therefrom) represent valid Categories in the Item-based hardware/software interface system.

Commodities: Items that are identifiable things of value.

Devices: Items having a logical structure that supports information processing capabilities.

Documents: Items with content that is not interpreted by the Item-based hardware/software interface system but is instead interpreted by an application program corresponding to the document type.

Events: Items that record certain occurrences in the environment.

Locations: Items representing physical locations (e.g., geographical locations).

Messages: Items of communication between two or more principals (defined below).

Principals: Items having at least one definitively provable identity aside from an ItemId (e.g., the identification of a person, organization, group, household, authority, service, etc.).

Statements: Items having special information regarding the environment including, without limitation, policies, subscriptions, credentials, and so forth.

Likewise, and in reference to FIG. 8B, the specific property types supported by the Core Schema may include one or more of the following:

Certificates (derived from the foundational PropertyBase type in the Base Schema)

Principal Identity Keys (derived from the IdentityKey type in the Base Schema)

Postal Address (derived from the Property type in the Base Schema)

Rich Text (derived from the Property type in the Base Schema)

EAddress (derived from the Property type in the Base Schema)

IdentitySecurityPackage (derived from the Relationship type in the Base Schema)

RoleOccupancy (derived from the Relationship type in the Base Schema)

BasicPresence (derived from the Relationship type in the Base Schema)

These Items and Properties are further described by their respective properties set forth in FIG. 8A and FIG. 8B.

5. Relationships

Relationships are binary relationships where one Item is designated as source and the other Item as target. The source Item and the target Item are related by the relationship. The source Item generally controls the life-time of the relationship. That is, when the source Item is deleted, the relationship between the Items is also deleted.

Relationships are classified into: Containment and Reference relationships. The containment relationships control the life-time of the target Items, while the reference relationships do not provide any life-time management semantics. FIG. 12 illustrates the manner in which relationships are classified.

The Containment relationship types are further classified into Holding and Embedding relationships. When all holding relationships to an Item are removed, the Item is deleted. A holding relationship controls the life-time of the target through a reference counting mechanism. The embedding relationships enable modeling of compound Items and can be thought of as exclusive holding relationships. An Item can be a target of one or more holding relationships; but an Item can be target of exactly one embedding relationship. An Item that is a target of an embedding relationship can not be a target of any other holding or embedding relationships.

Reference relationships do not control the lifetime of the target Item. They may be dangling—the target Item may not exist. Reference relationships can be used to model references to Items anywhere in the global Item name space (i.e. including remote data stores).

Fetching an Item does not automatically fetch its relationships. Applications must explicitly request the relationships of an Item. In addition, modifying a relationship does not modify the source or the target Item; similarly, adding a relationship does not affect the source/target Item.

a) Relationship Declaration

The explicit relationship types are defined with the following elements:

A relationship name is specified in the Name attribute.

Relationship type, one of the following: Holding, Embedding, Reference. This is specified in the Type attribute.

Source and target endpoints. Each endpoint specifies a name and the type of the referenced Item.

The source endpoint field is generally of type ItemID (not declared) and it must reference an Item in the same data store as the relationship instance.

For Holding and Embedding relationships, the target endpoint field must be of type ItemIDReference and it must reference an Item in the same store as the relationship instance. For Reference relationships the target endpoint can be of any ItemReference type and can reference Items in other storage platform data stores.

Optionally one or more fields of a scalar or PropertyBase type can be declared. These fields may contain data associated with the relationship.

Relationship instances are stored in a global relationships table.

Every relationship instance is uniquely identified by the combination (source ItemID, relationship ID). The relationship ID is unique within a given source ItemID for all relationships sourced in a given Item regardless of their type.

The source Item is the owner of the relationship. While an Item designated as owner controls the life time of the relationship, the relationship itself is separate from the Items it relates. The storage platform API 322 provides mechanisms for exposing relationships associated with an Item.

Here is an example of a relationship declaration:

```
<Relationship Name="Employment" BaseType="Reference" >
    <Source Name="Employee" ItemType="Contact.Person"/>
    <Target Name="Employer" ItemType="Contact.Organization"
        ReferenceType="ItemIDReference"/>
    <Property Name="StartDate" Type="the storage
        platformTypes.DateTime"/>
    <Property Name="EndDate" Type="the storage
        platformTypes.DateTime"/>
    <Property Name="Office" Type="the storage
        platformTypes.DateTime"/>
</Relationship>
```

This is an example of a Reference relationship. The relationship can not be created if the person Item that is referenced by the source reference does not exist. Also, if the person Item is deleted, the relationship instances between the person and organization are deleted. However, if the Organization Item is deleted, the relationship is not deleted and it is dangling.

b) Holding Relationship

Holding relationships are used to model reference count based life-time management of the target Items.

An Item can be a source endpoint for zero or more relationships to Items. An Item that is not an embedded Item can be a target of in one or more holding relationships.

The target endpoint reference type must be ItemIDReference and it must reference an Item in the same store as the relationship instance.

Holding relationships enforce lifetime management of the target endpoint. The creation of a holding relationship instance and the Item that it is targeting is an atomic operation. Additional holding relationship instances can be created that are targeting the same Item. When the last holding relationship instance with a given Item as target endpoint is deleted the target Item is also deleted.

The types of the endpoint Items specified in the relationship declaration will generally be enforced when an instance of the relationship is created. The types of the endpoint Items can not be changed after the relationship is established.

Holding relationships play a key role in forming the Item namespace. They contain the "Name" property that defines the name of the target Item relative to the source Item. This relative name is unique for all the holding relationships sourced from a given Item. The ordered list of this relative names starting from the root Item to a given Item forms the full name to the Item.

The holding relationships form a directed acyclic graph (DAG). When a holding relationship is created the system ensures that a cycle is not created, thus ensuring that the Item namespace forms a DAG.

While the holding relationship controls the life time of the target Item, it does not control the operational consistency of the target endpoint Item. The target Item is operationally independent from the Item that owns it through a holding relationship. Copy, Move, Backup and other operations on an Item that is a source of a holding relationship do not affect the Item that is a target of the same relationship—for example that is, backing up a Folder Item does not automatically backup all the Items in the folder (targets of the FolderMember relationship).

The following is an example of a holding relationship:

```
<Relationship Name="FolderMembers" BaseType="Holding">
    <Source Name="Folder" ItemType="Base.Folder"/>
    <Target Name="Item" ItemType="Base.Item"
        ReferenceType="ItemIDReference"/>
</Relationship>
```

The FolderMembers relationship enables the concept of a Folder as a generic collection of Items.

c) Embedding Relationships

Embedding relationships model the concept of exclusive control of the lifetime of the target Item. They enable the concept of compound Items.

The creation of an embedding relationship instance and the Item that it is targeting is an atomic operation. An Item can be a source of zero or more embedding relationship. However, an Item can be a target of one and only one embedding relationship. An Item that is a target of an embedding relationship can not be a target of a holding relationship.

The target endpoint reference type must be ItemIDReference and it must reference an Item in the same data store as the relationship instance.

The types of the endpoint Items specified in the relationship declaration will generally be enforced when an instance of the relationship is created. The types of the endpoint Items can not be changed after the relationship is established.

Embedding relationships control the operational consistency of the target endpoint. For example the operation of serializing of an Item may include serialization of all the embedding relationships that source from that Item as well as all of their targets; copying an Item also copies all its embedded Items.

The following is an example declaration:

```
<Relationship Name="ArchiveMembers" BaseType="Embedding">
    <Source Name="Archive" ItemType="Zip.Archive"/>
    <Target Name="Member" ItemType="Base.Item "
        ReferenceType="ItemIDReference"/>
    <Property Name="ZipSize" Type="the storage
        platformTypes.bigint"/>
    <Property Name="SizeReduction" Type="the storage
        platformTypes.float"/>
</Relationship>
``` d) Reference Relationships

The reference relationship does not control life time of the Item it references. Even more, the reference relationships do not guarantee the existence of the target, nor do they guarantee the type of the target as specified in the relationship declaration. This means that the reference relationships can be dangling. Also, the reference relationship can reference Items in other data stores. Reference relationships can be thought of as a concept similar to links in web pages.

An example of reference relationship declaration is the following:

```
<Relationship Name="DocumentAuthor" BaseType="Reference">
    <Sourc ItemType="Document" ItemType="Base.Document"/>
    <Target ItemType="Author" ItemType="Base.Author"
        ReferenceType="ItemIDReference"/>
    <Property Type="Role" Type="Core.CategoryRef"/>
    <Property Type="DisplayName" Type="the storage
        platformTypes.nvarchar(256)"/>
</Relationship>
```

Any reference type is allowed in the target endpoint. The Items that participate in a reference relationship can be of any Item type.

Reference relationships are used to model most non-lifetime management relationships between Items. Since the existence of the target is not enforced, the reference relationship is convenient to model loosely-coupled relationships. The reference relationship can be used to target Items in other data stores including stores on other computers.

e) Rules and Constraints

The following additional rules and constraints apply for relationships:

An Item must be a target of (exactly one embedding relationship) or (one or more holding relationships). One exception is the root Item. An Item can be a target of zero or more reference relationships An Item that is a target of embedding relationship can not be source of holding relationships. It can be a source of reference relationships.

An Item can not be a source of holding relationship if it is promoted from file. It can be a source of embedding relationships and reference relationships.

An Item can that is promoted from a file can not be a target of an embedding relationship.

f) Ordering of Relationships

In at least one embodiment, the storage platform of the present invention supports ordering of relationships. The ordering is achieved through a property named "Order" in the base relationship definition. There is no uniqueness constraint on the Order field. The order of the relationships with the same "order" property value is not guaranteed, however it is guaranteed that they may be ordered after relationships with lower "order" value and before relationships with higher "order" field value.

Applications can get the relationships in the default order by ordering on the combination (SourceItemID, RelationshipID, Order). All relationship instances sourced from a given Item are ordered as a single collection regardless of the type of the relationships in the collection. This however guarantees that all relationships of a given type (e.g., FolderMembers) are an ordered subset of the relationship collection for a given Item.

The data store API 312 for manipulating relationships implement a set of operations that support ordering of relationships. The following terms are introduced to help explain the operations:

RelFirst is the first relationship in the ordered collection with order value OrdFirst;

RelLast is the last relationship in the ordered collection with order value OrdLast;

RelX is a given relationship in the collection with order value OrdX;

RelPrev is a closest relationship in the collection to RelX with order value OrdPrev smaller then OrdX; and RelNext is a closest relationship in the collection to RelX with order value OrdNext greater then OrdX The operations include but are not limited to:

InsertBeforeFirst (SourceItemID, Relationship) inserts the relationship as the first relationship in the collection. The value of the "Order" property of the new relationship may be smaller then OrdFirst.

InsertAfterLast (SourceItemID, Relationship) inserts the relationship as the last relationship in the collection. The value of the "Order" property of the new relationship may be greater then OrdLast.

InsertAt (SourceItemID, ord, Relationship) inserts a relationship with the specified value for the "Order" property.

InsertBefore (SourceItemID, ord, Relationship) inserts the relationship before the relationship with the given order value. The new relationship may be assigned "Order" value that is between OrdPrev and ord, noninclusive.

InsertAfter (SourceItemID, ord, Relationship) inserts the relationship after the relationship with the given order value. The new relationship may be assigned "Order" value that is between ord and OrdNext, non-inclusive.

MoveBefore (SourceItemID, ord, RelationshipID) moves the relationship with given relationship ID before the relationship with specified "Order" value. The relationship may be assigned a new "Order" value that is between OrdPrev and ord, non-inclusive.

MoveAfter (SourceItemID, ord, RelationshipID) moves the relationship with given relationship ID after the relationship with specified "Order" value. The relationship may be assigned a new order value that is between ord and OrdNext, non-inclusive.

As previously mentioned, every Item must be a member of an Item Folder. In terms of Relationships, every Item must have a relationship with an Item Folder. In several embodiments of the present invention, certain relationships are represented by Relationships existing between the Items.

As implemented for various embodiments of the present invention, a Relationship provides a directed binary relationship that is "extended" by one Item (the source) to another Item (the target). A Relationship is owned by the source Item (the Item that extended it), and thus the Relationship is removed if the source is removed (e.g., the Relationship is deleted when the source Item is deleted). Moreover, in certain instances, a Relationship may share ownership of (co-own) the target Item, and such ownership might be reflected in the IsOwned property (or its equivalent) of the Relationship (as shown in FIG. 7 for the Relationship property type). In these embodiments, creation of a new IsOwned Relationship automatically increments a reference count on the target Item, and deletion of such a Relationship may decrement the reference count on the target Item. For these specific embodiments, Items continue to exist if they have a reference count greater than zero, and are automatically deleted if and when the count reaches zero. Again, an Item Folder is an Item that has (or is capable of having) a set of Relationships to other Items, these other Items comprising the membership of the Item Folder. Other actual implementations of Relationships are possible and anticipated by the present invention to achieve the functionality described herein.

Regardless of actual implementation, a Relationship is a selectable connection from one object to another. The ability for an Item to belong to more than one Item Folder, as well as to one or more Categories, and whether these Items, Folders, and Categories are public or private, is determined by the meanings given to the existence (or lack thereof) in an Item-based structure. These logical Relationships are the meanings assigned to a set of Relationships, regardless of physical implementation, which are specifically employed to achieve the functionality described herein. Logical Relationships are established between the Item and its Item Folder(s) or Categories (and vice versa) because, in essence, Item Folders and Categories are each a special type of Item. Consequently, Item Folders and Categories can be acted upon the same way as any other Item—copied, added to an email message, embedded in a document, and so and so forth without limitation—and Item Folders and Categories can be serialized and de-serialized (imported and exported) using the same mechanisms as for other Items. (For example, in XML all Items might have a serialization format, and this format applies equally to Item Folders, Categories, and Items.)

The aforementioned Relationships, which represent the relationship between an Item and it Item Folder(s) can logically extend from the Item to the Item Folder, from the Item Folder to the Item, or both. A Relationship that logically extends from an Item to an Item Folder denotes that the Item Folder is public to that Item and shares its membership information with that Item; conversely, the lack of a logical Relationship from an Item to an Item Folder denotes that the Item Folder is private to that Item and does not share its membership information with that Item. Similarly, a Relationship that logically extends from an Item Folder to an Item denotes that the Item is public and sharable to that Item Folder, whereas the lack of a logical Relationship from the Item Folder to the Item denotes that the Item is private and non-sharable. Consequently, when an Item Folder is exported to another system, it is the "public" Items that are shared in the new context, and when an Item searches its Items Folders for other, sharable Items, it is the "public" Item Folders that provide the Item with information regarding sharable Items that belong thereto.

Figure 9:
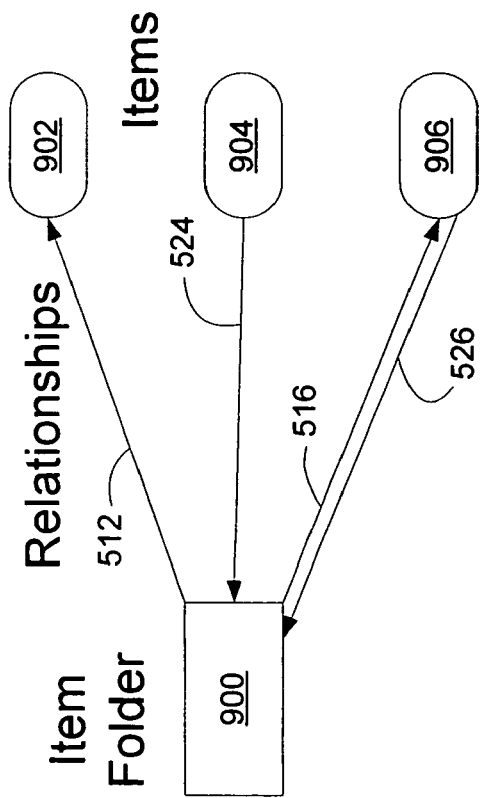
FIG. 9 is a block diagram illustrating an Item Folder, its member Items, and the interconnecting Relationships between the Item Folder and its member Items.

FIG. 9 is a block diagram illustrating an Item Folder (which, again, is an Item itself), its member Items, and the interconnecting Relationships between the Item Folder and its member Items. The Item Folder 900 has as members a plurality of Items 902, 904, and 906. Item Folder 900 has a Relationship 912 from itself to Item 902 which denotes that the Item 902 is public and sharable to Item Folder 900, its members 904 and 906, and any other Item Folders, Categories, or Items (not shown) that might access Item Folder 900. However, there is no Relationship from Item 902 to the Item Folder 900 which denotes that Item Folder 900 is private to Item 902 and does not share its membership information with Item 902. Item 904, on the other hand, does have a Relationship 924 from itself to Item Folder 900 which denotes that the Item Folder 900 is public and shares its membership information with Item 904. However, there is no Relationship from the Item Folder 900 to Item 904 which denotes that Item 904 is private and not sharable to Item Folder 900, its other members 902 and 906, and any other Item Folders, Categories, or Items (not shown) that might access Item Folder 900. In contrast with its Relationships (or lack thereof) to Items 902 and 904, Item Folder 900 has a Relationship 916 from itself to the Item 906 and Item 906 has a Relationship 926 back to Item Folder 900, which together denote that Item 906 is public and sharable to Item Folder 900, its members 902 and 904, and any other Item Folders, Categories, or Items (not shown) that might access Item Folder 900, and that Item Folder 900 is public and shares its membership information with Item 906.

As previously discussed, the Items in an Item Folder do not need to share a commonality because Item Folders are not "described." Categories, on the other hand, are described by a commonality that is common to all of its member Items. Consequently the membership of a Category is inherently limited to Items having the described commonality and, in certain embodiments, all Items meeting the description of a Category are automatically made members of the Category. Thus, whereas Item Folders allow trivial type structures to be represented by their membership, Categories allow membership based on the defined commonality.

Of course Category descriptions are logical in nature, and therefore a Category may be described by any logical representation of types, properties, and/or values. For example, a logical representation for a Category may be its membership to comprise Items have one of two properties or both. If these described properties for the Category are "A" and "B", then the Categories membership may comprise Items having property A but not B, Items having property B but not A, and Items having both properties A and B. This logical representation of properties is described by the logical operator "OR" where the set of members described by the Category are Items having property A OR B. Similar logical operands (including without limitation "AND", "XOR", and "NOT" alone or in combination) can also be used describe a category as will be appreciated by those of skill in the art.

Despite the distinction between Item Folders (not described) and Categories (described), Categories Relationship to Items and Items Relationship to Categories essentially the same way as disclosed herein above for Item Folders and Items in many embodiments of the present invention.

Figure 10:
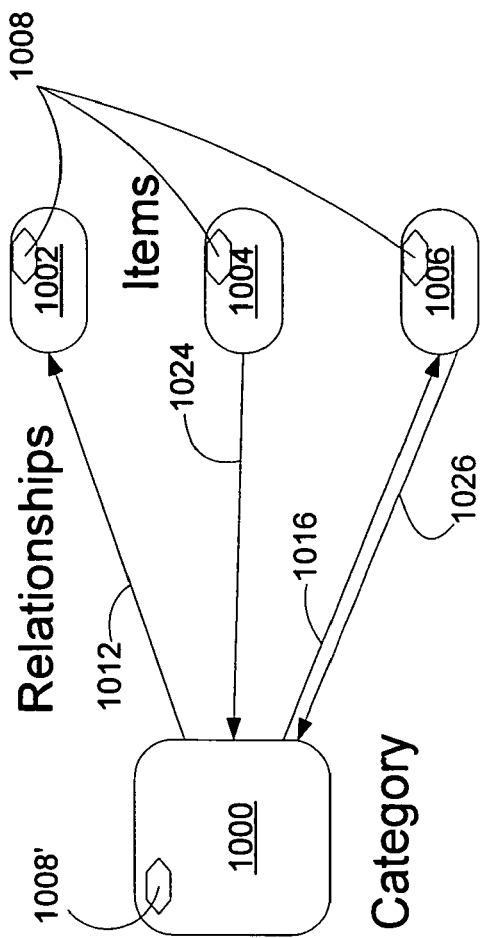
FIG. 10 is a block diagram illustrating a Category (which, again, is an Item itself), its member Items, and the interconnecting Relationships between the Category and its member Items.

FIG. 10 is a block diagram illustrating a Category (which, again, is an Item itself), its member Items, and the interconnecting Relationships between the Category and its member Items. The Category 1000 has as members a plurality of Items 1002, 1004, and 1006, all of which share some combination of common properties, values, or types 1008 as described (commonality description 1008') by the Category 1000. Category 1000 has a Relationship 1012 from itself to Item 1002 which denotes that the Item 1002 is public and sharable to Category 1000, its members 1004 and 1006, and any other Categories, Item Folders, or Items (not shown) that might access Category 1000. However, there is no Relationship from the Item 1002 to the Category 1000 which denotes that Category 1000 is private to Item 1002 and does not share its membership information with Item 1002. Item 1004, on the other hand, does have a Relationship 1024 from itself to Category 1000 which denotes that the Category 1000 is public and shares its membership information with Item 1004. However, there is no Relationship extended from Category 1000 to the Item 1004 which denotes that Item 1004 is private and not sharable to Category 1000, its other members 1002 and 1006, and any other Categories, Item Folders, or Items (not shown) that might access Category 1000. In contrast to its Relationships (or lack thereof) with Items 1002 and 1004, Category 1000 has a Relationship 1016 from itself to Item 1006 and Item 1006 has a Relationship 1026 back to Category 1000, which altogether denotes that Item 1006 is public and sharable to Category 1000, its Item members 1002 and 1004, and any other Categories, Item Folders, or Items (not shown) that might access Category 1000, and that the Category 1000 is public and shares its membership information with Item 1006.

Finally, because Categories and Item Folders are themselves Items, and Items may Relationship to each other, Categories may Relationship to Item Folders and vice versa, and Categories, Item Folders, and Items can Relationship to other Categories, Item Folders, and Item respectively in certain alternative embodiments. However, in various embodiments, Item Folder structures and/or Category structures are prohibited, at the hardware/software interface system level, from containing cycles. Where Item Folder and Category structures are akin to directed graphs, the embodiments that prohibit cycles are akin to directed acyclic graphs (DAGs) which, by mathematical definition in the art of graph theory, are directed graphs wherein no path starts and ends at the same vertex.

6. Extensibility

The storage platform is intended to be provided with an initial set of schemas 340, as described above. In addition, however, in at least some embodiments, the storage platform allows customers, including independent software vendor (ISVs), to create new schemas 344 (i.e. new Item and Nested Element types). This section addresses the mechanism for creating such schemas by extending the Item types and Nested Element types (or simply "Element" types) defined in the initial set of schemas 340.

Preferably, extension of the initial set of Item and Nested Element types is constrained as follows:

an ISV is allowed to introduce new Item types, i.e. subtype Base.Item;

an ISV is allowed to introduce new Nested Element types, i.e. subtype Base.NestedElement;

an ISV is allowed to introduce new extensions, i.e. subtype Base.NestedElement; but, an ISV cannot subtype any types (Item, Nested Element, or Extension types) defined by the initial set of storage platform schemas 340.

Since an Item type or Nested Element type defined by the initial set of storage platform schemas may not exactly match an ISV application's need, it is necessary to allow ISVs to customize the type. This is allowed with the notion of Extensions. Extensions are strongly typed instances but (a) they cannot exist independently and (b) they must be attached to an Item or Nested Element.

In addition to addressing the need for schema extensibility, Extensions are also intended to address the "multi-typing" issue. Since, in some embodiments, the storage platform may not support multiple inheritance or overlapping subtypes, applications can use Extensions as a way to model overlapping type instances (e.g. Document is a legal document as well a secure document).

a) Item Extensions

To provide Item extensibility, the data model further defines an abstract type named Base.Extension. This is a root type for the hierarchy of extension types. Applications can subtype Base.Extension to create specific extension types.

The Base.Extension type is defined in the Base schema as follows:

```
<Type Name="Base.Extension" IsAbstract="True">
    <Propety Name="ItemID"
        Type="the storage platformTypes.uniqueidentified"
        Nullable="false"
        MultiValued="false"/>
    <Property Name="ExtensionID"
        Type="the storage platformTypes.uniqueidentified"
        Nullable="false"
        MultiValued="false"/>
</Type>
```

The ItemID field contains the ItemID of the item that the extension is associated with. An Item with this ItemID must exist. The extension can not be created if the item with the given ItemID does not exist. When the Item is deleted all the extensions with the same ItemID are deleted. The tuple (ItemID, ExtensionID) uniquely identifies an extension instance.

The structure of an extension type is similar to that of an item type:

Extension types have fields;

Fields can be of primitive or nested element types; and

Extension types can be sub-typed.

The following restrictions apply for extension types

Extensions can not be sources and targets of relationships;

Extension type instances can not exist independently from an item; and

Extension types can not be used as field types in the storage platform type definitions There are no constraints on the types of extensions that can be associated with a given Item type. Any extension type is allowed to extend any item type. When multiple extension instances are attached to an item, they are independent from each other in both structure and behavior.

The extension instances are stored and accessed separately from the item. All extension type instances are accessible from a global extension view. An efficient query can be composed that will return all the instances of a given type of extension regardless of what type of item they are associated with. The storage platform APIs provides a programming model that can store, retrieve and modify extensions on items.

The extension types can be type sub-typed using the storage platform single inheritance model. Deriving from an extension type creates a new extension type. The structure or the behavior of an extension cannot override or replace the structure or behaviors of the item type hierarchy. Similar to Item types, Extension type instances can be directly accessed through the view associated with the extension type. The ItemID of the extension indicates which item they belong to and can be used to retrieve the corresponding Item object from the global Item view. The extensions are considered part of the item for the purposes of operational consistency. The Copy/Move, Backup/Restore and other common operations that the storage platform defines may operate on the extensions as part of the item.

Consider the following example. A Contact type is defined in the Windows Type set.

```
<Type Name="Contact" BaseType="Base.Item" >
    <Property Name="Name"
        Type="String"
        Nullable="false"
        MultiValued="false"/>
    <Property Name="Address"
        Type="Address"
        Nullable="true"
        MultiValued="false"/>
</Type>
```

A CRM application developer would like to attach a CRM application extension to the contacts stored in the storage platform. The application developer would define a CRM extension that would contain the additional data structure that the application can manipulate.

```
<Type Name="CRMExtension" BaseType="Base.Extension" >
    <Property Name="CustomerID"
        Type="String"
        Nullable="false"
        MultiValued="false"/>
    ...
</Type>
```

An HR application developer may want to also attach additional data with the Contact. This data is independent from the CRM application data. Again the application developer can create an extension

```
<Type Name="HRExtension" EBaseType="Base.Extension" >
    <Property Name="EmployeeID"
        Type="String"
        Nullable="false"
        MultiValued="false"/>
    ...
</Type>
```

CRMExtension and HRExtension are two independent extensions that can be attached to Contact items. They are created and accessed independently of each other.

In the above example, the fields and methods of the CRMExtension type cannot override fields or methods of the Contact hierarchy. It should be noted that instances of the CRMExtension type can be attached to Item types other than Contact.

When the Contact item is retrieved, its item extensions are not automatically retrieved. Given a Contact item, its related item extensions can be accessed by querying the global extension view for extensions with the same ItemId.

All CRMExtension extensions in the system can be accessed through the CRMExtension type view, regardless of which item they belong to. All item extensions of an item share the same item id. In the above example, the Contact item instance and the attached CRMExtension and HRExtension instances share the same ItemID.

The following table summarizes the similarities and differences between Item, Extension and NestedElement types:

| Item vs. Item Extension vs NestedElement | | | |
|---|---|---|---|
| | Item | Item Extension | NestedElement |
| Item ID | Has its own item id | Shares the item id of the item | Does not have its own item id. Nested element is part of the item |
| Storage | Item hierarchy is stored in its own tables | Item extension hierarchy is stored in its own tables | Stored with item |
| Query/Search | Can query item tables | Can query item extension tables | Can generally be queried only within the containing item context |
| Query/Search scope | Can search across all instances of an item type | Can search across all instances of an item extension type | Can generally only search within nested element type instances of a singe (containing) item |
| Relationship semantics | Can have Relationships to items | No Relationships to item extensions | No Relationships to nested elements |
| Association to items | Can be related to other items via holding, embedded and soft Relationships | Can generally only be related via extensions. The extension semantics is similar to embedded item semantics | Related to item via fields. Nested elements are part of the item | b) Extending NestedElement types

Nested Element types are not extended with the same mechanism as the Item types. Extensions of nested elements are stored and accessed with the same mechanisms as fields of nested element types.

The data model defines a root for nested element types named Element:

```
<Type Name="Element"
    IsAbstract="True">
        <Property Name="ElementID"
            Type="the storage platformTypes.uniqueidentifier"
            Nullable="false"
            MultiValued="false"/>
</Type>
```

The NestedElement type inherits from this type. The NestedElement element type additionally defines a field that is a multi-set of Elements.

```
<Type Name="NestedElement" BaseType="Base.Element"
    IsAbstract="True">
        <Property Name="Extensions"
            Type="Base.Element"
            Nullable="false"
            MultiValued="true"/>
</Type>
```

The NestedElement extensions are different from item extensions in the following ways:

Nested element extensions are not extension types. They do not belong to the extension type hierarchy that is rooted in the Base.Extension type.

Nested element extensions are stored along with the other fields of the item and are not globally accessible—a query can not be composed that retrieves all instances of a given extension type.

These extensions are stored the same way as other nested elements (of the item) are stored. Like other nested sets, the NestedElement extensions are stored in a UDT. They are accessible through the Extensions field of the nested element type.

The collection interfaces used to access multi-valued properties is also used for accessing and iterating over set of type extensions.

The following table summarizes and compares Item Extensions and NestedElement extensions.

| Item extensions vs NestedElement extensions | | |
|---|---|---|
| | Item Extension | NestedElement Extension |
| Storage | Item extension hierarchy is stored in its own tables | Stored like nested elements |
| Query/Search | Can query item extension tables | Can generally only be queried within the containing item context |
| Query/Search scope | Can search across all instances of an item extension type | Can generally only search within nested element type instances of a singe (containing) item |

-continued

| Item extensions vs NestedElement extensions | | |
|---|---|---|
| | Item Extension | NestedElement Extension |
| Programmability | Need special extension APIs and special querying on extension tables | NestedElement extensions are like any other multi-valued field of nested element; normal nested element type APIs are used |
| Behavior | Can associate behavior | No behavior permitted (?) |
| Relationship semantics | No Relationships to item extensions | No Relationships to NestedElement extensions |
| Item ID | Shares the item id of the item | Does not have its own item id. NestedElement extension is part of the item |

F. Database Engine

As mentioned above, the data store is implemented on a database engine. In the present embodiment, the database engine comprises a relational database engine that implements the SQL query language, such as the Microsoft SQL Server engine, with object relational extensions. This section describes the mapping of the data model that the data store implements to the relational store and provides information on the logical API consumed by storage platform clients, in accordance with the present embodiment. It is understood, however, that a different mapping may be employed when a different database engine is employed. Indeed, in addition to implementing the storage platform conceptual data model on a relational database engine, it can also be implemented on other types of databases, e.g. object-oriented and XML databases.

An object-oriented (OO) database system provides persistence and transactions for programming language objects (e.g. C++, Java). The storage platform notion of an "item" maps well to an "Object" in object-oriented systems, though embedded collections would have to be added to Objects. Other storage platform type concepts, like inheritance and nested element types, also map object-oriented type systems. Object-oriented systems typically already support object identity; hence, item identity can be mapped to object identity. The item behaviors (operations) map well to object methods. However, object-oriented systems typically lack organizational capabilities and are poor in searching. Also, object-oriented systems to do not provide support for unstructured and semi-structured data. To support the complete storage platform data model described herein, concepts like relationships, folders, and extensions would need to be added to the object data model. In addition, mechanisms like promotions, synchronization, notifications, and security would need to be implemented.

Similar to object-oriented systems, XML databases, based on XSD (XML Schema Definition), support a single-inheritance based type system. The item type system of the present invention could be mapped to the XSD type model. XSDs also do not provide support for behaviors. The XSDs for items would have to be augmented with item behaviors. XML databases deal with single XSD documents and lack organization and broad search capabilities. As with object-oriented databases, to support the data model described herein, other concepts like relationships, and folders would need to be incorporated into such XML databases; also, mechanisms like synchronization, notifications and security would need to be implemented.

Figure 13:
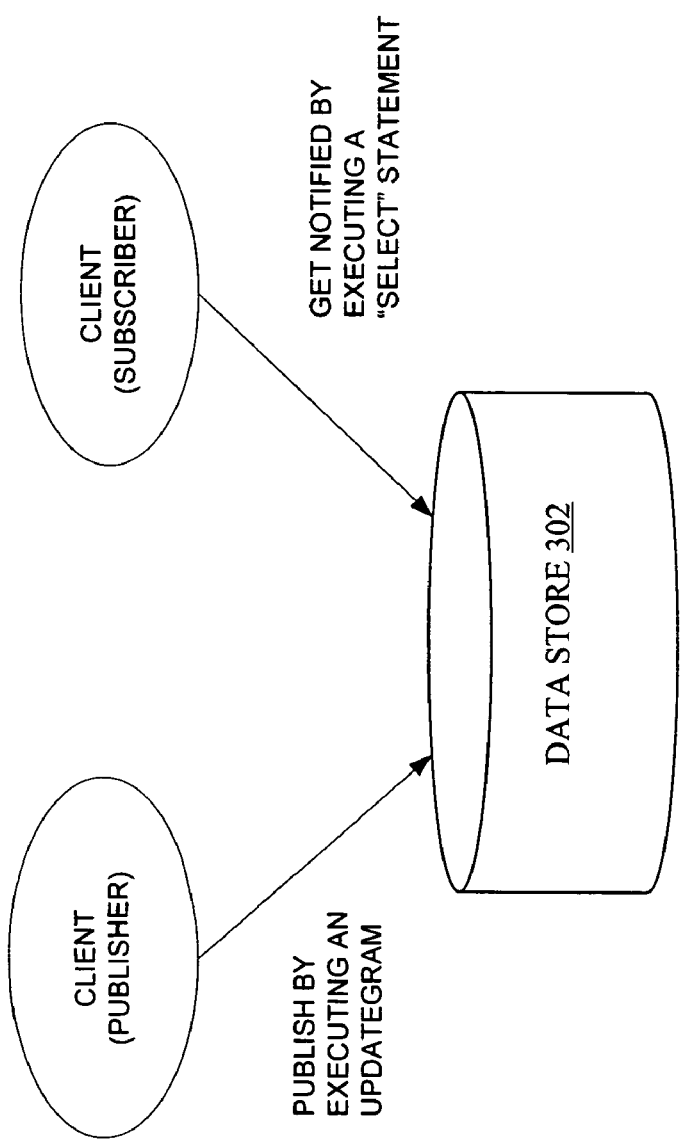
FIG. 13 is a diagram illustrating a notification mechanism.
Figure 14:
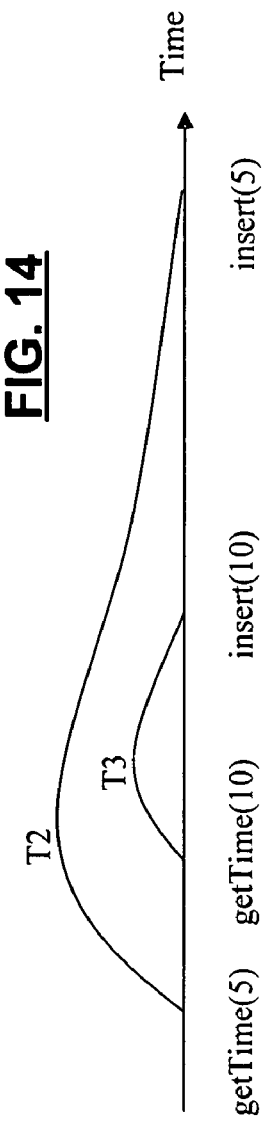
FIG. 14 is a diagram illustrating an example in which two transactions are both inserting a new record into the same B-Tree.
Figure 15:
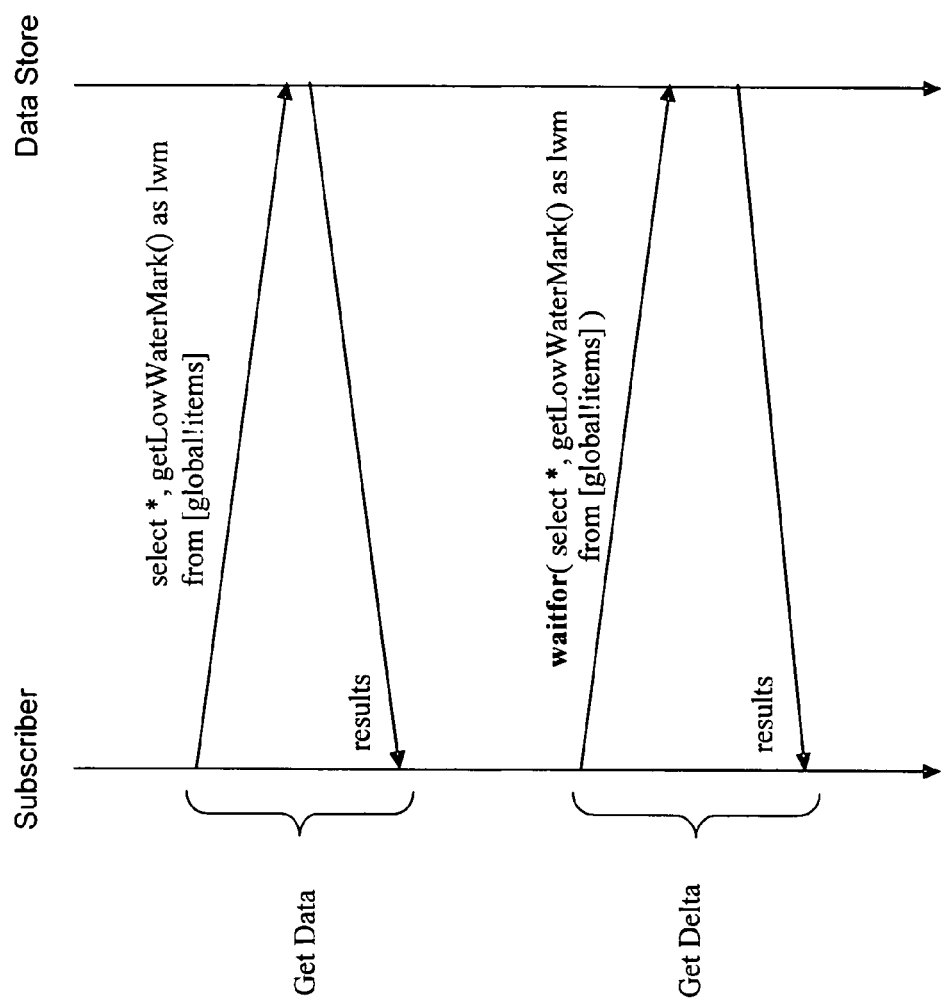
FIG. 15 illustrates a data change detection process.
Figure 17:
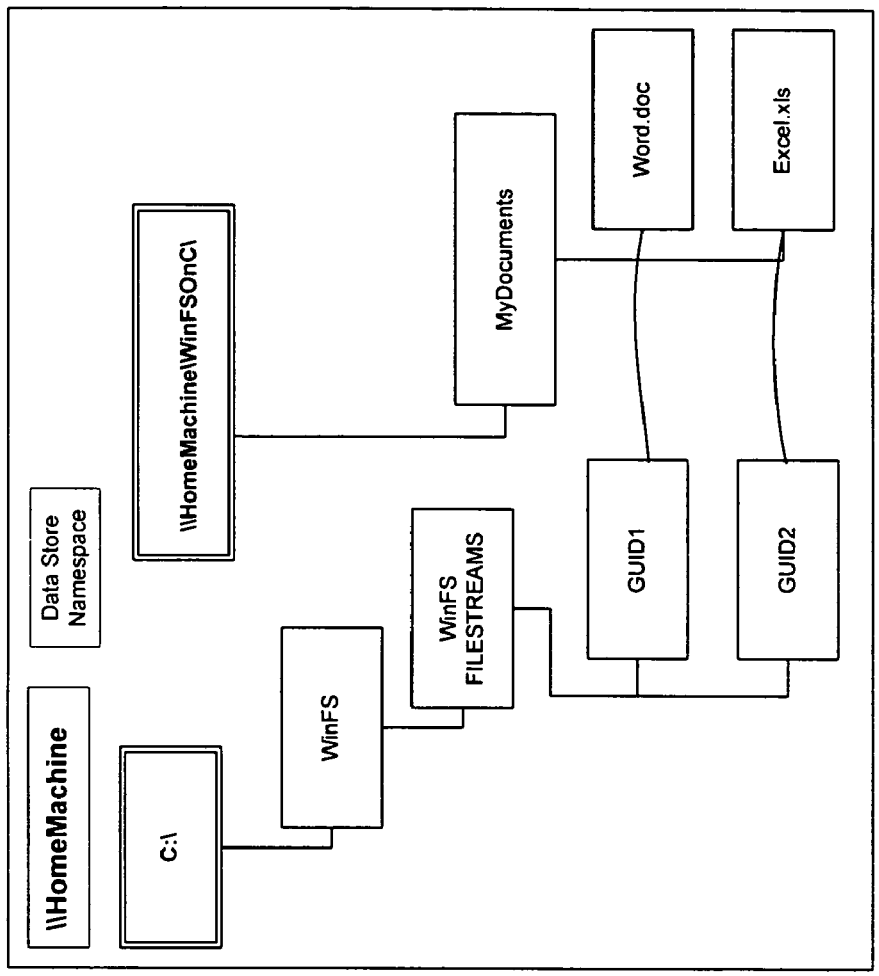
FIG. 17 shows an example in which an existing folder of a directory-based file system is moved into the storage platform data store.
Figure 16:
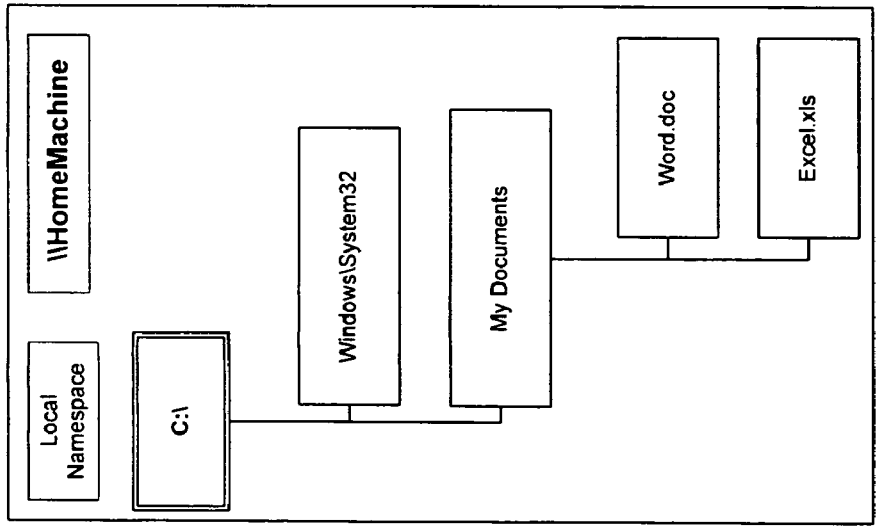
FIG. 16 illustrates an exemplary directory tree.

In regard to the following subsections, a few illustrations are provided to facilitate the general information disclosed:

FIG. 13 is a diagram illustrating a notification mechanism. FIG. 14 is a diagram illustrating an example in which two transactions are both inserting a new record into the same B-Tree. FIG. 15 illustrates a data change detection process. FIG. 16 illustrates an exemplary directory tree. FIG. 17 shows an example in which an existing folder of a directory-based file system is moved into the storage platform data store.

1. Data Store Implementation Using UDTs

In the present embodiment, the relational database engine 314, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types (hereinafter: UDTs) provide a mechanism for type extensibility above and beyond the native scalar type system by enabling users to extend the type system by defining complex, structured types. Once defined by a user, a UDT can be used anywhere in the type system that a built-in scalar type might be used In accordance with an aspect of the present invention, the storage platform schemas are mapped to UDT classes in the database engine store. Data store Items are mapped to UDT classes deriving from the Base.Item type. Like Items, Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be: the type of a column in a row, the type of a parameter of a routine in T-SQL, or the type of a variable in T-SQL The mapping of storage platform schemas to UDT classes is fairly straightforward at a high level. Generally, a storage platform Schema is mapped to a CLR namespace. A storage platform Type is mapped to a CLR class. The CLR class inheritance mirrors the storage platform Type inheritance, and a storage platform Property is mapped to a CLR class property.

2. Item Mapping

Given the desirability for Items to be globally searchable, and the support in the relational database of the present embodiment for inheritance and type substitutability, one possible implementation for Item storage in the database store would be to store all Items in a single table with a column of type Base.Item. Using type substitutability, Items of all types could be stored, and searches could be filtered by Item type and sub-type using Yukon's "is of (Type)" operator.

However, due to concerns about the overhead associated with such an approach, in the present embodiment, the Items are divided by top-level type, such that Items of each type "family" are stored in a separate table. Under this partitioning scheme, a table is created for each Item type inheriting directly from Base.Item. Types inheriting below these are stored in the appropriate type family table using type substitutability, as described above. Only the first level of inheritance from Base.Item is treated specially.

A "shadow" table is used to store copies of globally searchable properties for all Items. This table may be maintained by the Update( ) method of the storage platform API, through which all data changes are made. Unlike the type family tables, this global Item table contains only the top-level scalar properties of the Item, not the full UDT Item object. The global Item table allows navigation to the Item object stored in a type family table by exposing an ItemID and a TypeID.

The ItemID will generally uniquely identify the Item within the data store. The TypeID may be mapped using metadata, which is not described here, to a type name and the view containing the Item. Since finding an Item by its ItemID may be a common operation, both in the context of the global Item table and otherwise, a GetItem( ) function is provided to retrieve an Item object given an Item's ItemID.

For convenient access and to hide implementation details to the extent possible, all queries of Items might be against views built on the Item tables described above. Specifically, views may be created for each Item type against the appropriate type family table. These type views may select all Items of the associated type, including sub-types. For convenience, in addition to the UDT object, the views may expose columns for all of the top-level fields of that type, including inherited fields.

3. Extension Mapping

Extensions are very similar to Items and have some of the same requirements. As another root type supporting inheritance, Extensions are subject to many of the same considerations and trade-offs in storage. Because of this, a similar type family mapping is applied to Extensions, rather than a single table approach. Of course, in other embodiments, a single table approach could be used. In the present embodiment, an Extension is associated with exactly one Item by ItemID, and contains an ExtensionID that is unique in the context of the Item. As with Items, a function might be provided to retrieve an Extension given its identity, which consists of an ItemID and ExtensionID pair. A View is created for each Extension type, similar to the Item type views.

4. Nested Element Mapping

Nested Elements are types that can be embedded in Items, Extensions, Relationships, or other Nested Elements to form deeply nested structures. Like Items and Extensions, Nested Elements are implemented as UDT's, but they are stored within an Items and Extensions. Therefore, Nested Elements have no storage mapping beyond that of their Item and Extension containers. In other words, there are no tables in the system which directly store instances of NestedElement types, and there are no views dedicated specifically to Nested Elements.

5. Object Identity

Each entity in the data model, i.e., each Item, Extension and Relationship, has a unique key value. An Item is uniquely identified by its ItemId. An Extension is uniquely identified by a composite key of (ItemId, ExtensionId). A Relationship is identified by a composite key (ItemId, RelationshipId). ItemId, ExtensionId and RelationshipId are GUID values.

6. SQL Object Naming

All objects created in the data store can be stored in a SQL schema name derived from the storage platform schema name. For example, the storage platform Base schema (often called "Base") may produce types in the "[System.Storage]" SQL schema such as "[System.Storage].Item". Generated names are prefixed by a qualifier to eliminate naming conflicts. Where appropriate, an exclamation character (!) is used as a separator for each logical part of the name. The table below outlines the naming convention used for objects in the data store. Each schema element (Item, Extension, Relationship and View), is listed along with the decorated naming convention used to access instances in the data store.

| Object | Name Decoration | Description | Example |
|---|---|---|---|
| Master Item Search View | Master!Item | Provides a summary of items in the current item domain. | [System.Storage].[Master!Item] |
| Typed Item search view | ItemType | Provides all property data from item and any parent type(s). | [AcmeCorp.Doc].[OfficeDoc] |
| Master Extension Search View | Master!Extension | Provides a summary of all extensions in the current item domain. | [System.Storage].[Master!Extension] |
| Typed extension search view | Extension!extensionType | Provides all property data for extension. | [AcmeCorp.Doc].[Extension!StickyNote] |
| Master Relationship View | Master!Relationship | Provides a summary of all relationships in the current item domain. | [System.Storage].[Master!Relationship] |
| Relationship view | Relationship!relationship Name | Provides all data associated with a given relationship | [AcmeCorp.Doc].[Relationship!AuthorsFrom Document] |
| View | View!viewName | Provides the columns/types based on the schema view definition. | [AcmeCorp.Doc].[View!DocumentTitles] |

7. Column Naming

When mapping any object model into a store, the possibility of naming collisions occur due to additional information stored along with an application object. In order to avoid naming collisions, all non-type specific columns (columns which do not map directly to a named Property in a type declaration) is be prefixed with an underscore (_) character. In the present embodiment, underscore (_) characters are disallowed as the beginning character of any identifier property. Further, in order to unify naming between CLR and the data store, all properties of a storage platform types or schema element (relationship, etc.) should have a capitalized first character.

8. Search Views

Views are provided by the storage platform for searching stored content. A SQL view is provided for each Item and Extension type. Further, views are provided to support Relationships and Views (as defined by the Data Model). All SQL views and underlying tables in the storage platform are read-only. Data may be stored or changed using the Update( ) method of the storage platform API, as described more fully below.

Each view explicitly defined in a storage platform schema (defined by the schema designer, and not automatically generated by the storage platform) is accessible by the named SQL view [<schema-name>].[View!<view-name>]. For example, a view named "BookSales" in the schema "Acme-Publisher.Books" would be accessible using the name "[AcmePublisher.Books].[View!BookSales]". Since the output format of a view is custom on a per-view basis (defined by an arbitrary query provided by the party defining the view), the columns are directly mapped based on the schema view definition.

All SQL search views in the storage platform data store use the following ordering convention for columns:

Logical "key" column (s) of view result such as ItemId, ElementId, RelationshipId, . . .

Metadata information on type of result such as TypeId.

Change tracking columns such as CreateVersion, UpdateVersion, . . .

Type specific column(s) (Properties of the declared type)

Figure 28:
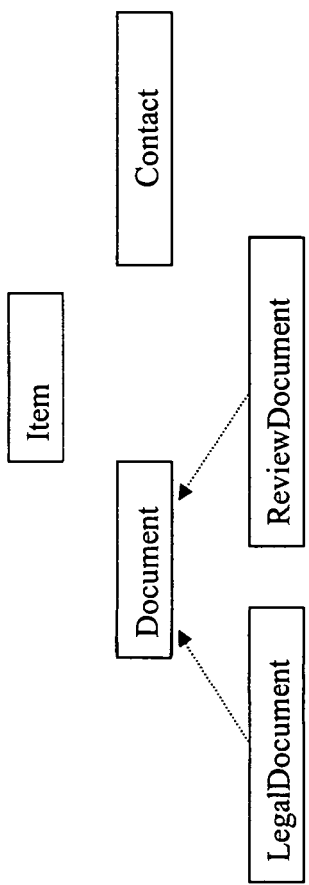
FIG. 28 is a diagram illustrating the concept of an Item search view.

Type specific views (family views) also contain an object column which returns the object Members of each type family are searchable using a series of Item views, with there being one view per Item type in the data store. FIG. 28 is a diagram illustrating the concept of an Item search view.

a) Item

Figure 29:
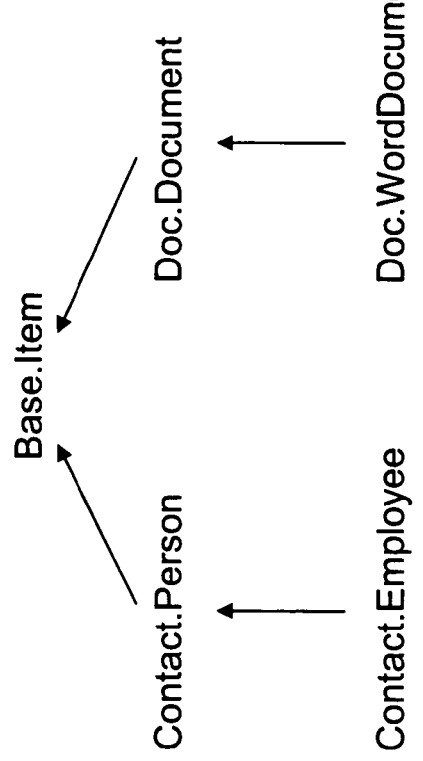
FIG. 29 is a diagram illustrating an exemplary Item hierarchy.

Each Item search view contains a row for each instance of an Item of the specific type or its subtypes. For example, the view for Document could return instances of Document, LegalDocument and ReviewDocument. Given this example, the Item views can be conceptualized as shown in FIG. 29.

(1) Master Item Search View

Each instance of a storage platform data store defines a special Item view called the Master Item View. This view provides summary information on each Item in the data store. The view provides one column per Item type property, a column which described the type of the Item and several columns which are used to provide change tracking and synchronization information. The master item view is identified in a data store using the name "[System.Storage].[Master!Item]".

| Column | Type | Description |
|---|---|---|
| ItemId | ItemId | The storage platform identity of the Item |
| _TypeId | TypeId | The TypeId of the Item - identifies the exact type of the Item and can be used to retrieve information on the type using a Metadata catalog. |

-continued

| Column | Type | Description |
| --- | --- | --- |
| _RootItemId | ItemId | The ItemId of the first non-embedded ancestor that controls the lifetime of this item. |
| <global change tracking> | . . . | Global change tracking information |
| <Item props> | n/a | One column per Item type property |

(2) Typed Item Search Views

Each Item type also has a search view. While similar to the root Item view, this view also provides access to the Item object via the "_Item" column. Each typed item search view is identified in a data store using the name [schemaName].[itemTypeName]. For example [AcmeCorp.Doc].[OfficeDoc].

| Column | Type | Description |
| --- | --- | --- |
| ItemId | ItemId | The storage platform identity of the Item |
| <type change tracking> | . . . | Type change tracking information |
| <parent props> | <property specific> | One column per parent property |
| <item props> | <property specific> | One column per exclusive property of this type |
| _Item | CLR type of Item | CLR object - type of declared Item | b) Item Extensions

All Item Extensions in a WinFS Store are also accessible using search views.

(1) Master Extension Search View

Each instance of a data store defines a special Extension view called the Master Extension View. This view provides summary information on each Extension in the data store. The view has a column per Extension property, a column which describes the type of the Extension and several columns which are used to provide change tracking and synchronization information. The master extension view is identified in a data store using the name "[System. Storage].[Master!Extension]".

| Column | Type | Description |
| --- | --- | --- |
| ItemId | ItemId | The storage platform identity of the Item with which this extension is associated |
| ExtensionId | ExtensionId (GUID) | Id of this extension instance |
| _TypeId | TypeId | The TypeId of the Extension - identifies the exact type of the extension and can be used to retrieve information on the extension using the Metadata catalog. |
| <global change tracking> | . . . | Global change tracking information |
| <ext properties> | <property specific> | One column per Extension type property |

(2) Typed Extension Search Views

Each Extension type also has a search view. While similar to the master extension view, this view also provides access to the Item object via the _Extension column. Each typed extension search view is identified in a data store using the name [schemaName].[Extension!extensionTypeName]. For example [AcmeCorp.Doc].[Extension!OfficeDocExt].

| Column | Type | Description |
| --- | --- | --- |
| ItemId | ItemId | The storage platform identity of the Item with which this extension is associated |
| ExtensionId | ExtensionId (GUID) | Id of this extension instance |
| <type change tracking> | . . . | Type change tracking information |
| <parent props> | <property specific> | One column per parent property |
| <ext props> | <property specific> | One column per exclusive property of this type |
| _Extension | CLR type of Extension instance | CLR object - type of declared Extension | c) Nested Elements

All nested elements are stored within Items, Extensions or Relationships instances. As such, they are accessed by querying the appropriate Item, Extension, or Relationship search view.

d) Relationships

As discussed above, Relationships form the fundamental unit of linking between Items in a storage platform data store.

(1) Master Relationship Search View

Each data store provides a Master Relationship View. This view provides information on all relationship instances in the data store. The master relationship view is identified in a data store using the name "[System.Storage].[Master!Relationship]".

| Column | Type | Description |
| --- | --- | --- |
| ItemId | ItemId | Identity of source endpoint (ItemId) |
| RelationshipId | RelationshipId (GUID) | The id of the relationship instance |
| _RelTypeId | RelationshipTypeId | The RelTypeId of the Relationship - identifies the type of the relationship instance using the Metadata catalog. |
| <global change tracking> | . . . | Global change tracking information. |
| TargetItemReference | ItemReference | Identity of target endpoint |
| _Relationship | Relationship | Instance of the Relationship object for this instance |

(2) Relationship Instance Search Views

Each declared Relationship also has a search view which returns all instances of the particular relationship. While similar to the master relationship view, this view also provides named columns for each property of the relationship data. Each relationship instance search view is identified in a data store using the name [schemaName].[Relationship!relationshipName]. For example [AcmeCorp.Doc].[Relationship!DocumentAuthor].

| Column | Type | Description |
| --- | --- | --- |
| ItemId | ItemId | Identify of source endpoint (ItemId) |
| RelationshipId | RelationshipId (GUID) | The id of the relationship instance |
| <type change tracking> | . . . | Type change tracking information |
| TargetItemReference | ItemReference | Identity of target endpoint |
| <source name> | ItemId | Named property of source endpoint identity (alias for ItemId) |
| <target name> | ItemReference or derived class | Named property of target endpoint identity (alias and cast for TargetItemReference) |
| <rel property> | <property specific> | One column per property of the relationship definition |
| _Relationship | CLR type of Relationship instance | CLR object - type of declare Relationship | e)

9. Updates

All views in the storage platform data store are read-only. In order to create a new instance of a data model element (item, extension or relationship), or to update an existing instance, the ProcessOperation or ProcessUpdategram methods of the storage platform API must be used. The ProcessOperation method is a single stored procedure defined by the data store which consumes an "operation" that details an action to be performed. The ProcessUpdategram method is a stored procedure which takes an ordered set of operations, known as an "updategram", which collectively detail a set of actions to be performed.

The operation format is extensible and provides various operations over the schema elements. Some common operations include:

1. Item operations:
    a. CreateItem (Creates a new item in the context of an embedding or holding relationship)
    b. UpdateItem (updates an existing Item)
2. Relationship operations:
    a. CreateRelationship (creates an instance of a reference or holding relationship)
    b. UpdateRelationship (updates a relationship instance)
    c. DeleteRelationship (removes a relationship instances)
3. Extension operations:
    a. CreateExtension (adds an extension to an existing Item)
    b. UpdateExtension (updates an existing extension)
    c. DeleteExtension (deletes an extension)

10. Change Tracking & Tombstones

Change tracking and tombstone services are provided by the data store, as discussed more fully below. This section provides an outline of the change tracking information exposed in a data store.

a) Change Tracking

Each search view provided by the data store contains columns used to provide change tracking information; the columns are common across all Item, Extension and Relationship views. Storage platform Schema Views, defined explicitly by schema designers, do not automatically provide change tracking information—such information is provided indirectly through the search views on which the view itself is built.

For each element in the data store, change tracking information is available from two places—the "master" element view and the "typed" element view. For example, change tracking information on the AcmeCorp.Document.Document Item type is available from the Master Item View "[System.Storage].[Master!Item]" and typed Item search view [AcmeCorp.Document].[Document].

(1) Change Tracking in "Master" Search Views

Change tracking information in the master search views provides information on the creation and update versions of an element, information on which sync partner created the element, which sync partner last updated the element and the version numbers from each partner for creation and update. Partners in sync relationships (described below) are identified by partner key. A single UDT object named _ChangeTrackingInfo of type [System.Storage.Store].ChangeTrackingInfo contains all this information. The type is defined in the System.Storage schema. _ChangeTrackingInfo is available in all global search views for Item, Extension and Relationship. The type definition of ChangeTrackingInfo is:

```
<Type Name="ChangeTrackingInfo" BaseType="Base.NestedElement">
    <FieldProperty Name="CreationLocalTS"
        Type="SqlTypes.SqlInt64"
        Nullable="False" />
    <FieldProperty Name="CreatingPartnerKey"
        Type="SqlTypes.SqlInt32"    Nullable="False" />
    <FieldProperty Name="CreatingPartnerTS"
        Type="SqlTypes.SqlInt64"    Nullable="False" />
    <FieldProperty Name="LastUpdateLocalTS"
        Type="SqlTypes.SqlInt64"    Nullable="False" />
    <FieldProperty Name="LastUpdatingPartnerKey"
        Type="SqlTypes.SqlInt32"    Nullable="False" />
    <FieldProperty Name="LastUpdatingPartnerTS"
        Type="SqlTypes.SqlInt64"
        Nullable="False" />
</Type>
```

These properties contain the following information:

| Column | Description |
| --- | --- |
| _CreationLocalTS | Creation time stamp by the local machine |
| _CreatingPartnerKey | PartnerKey of the partner who created this entity. If the entity was locally created, this is the local machine's PartnerKey. |
| _CreatingPartnerTS | Timestamp of the time at which this entity was created at the partner corresponding to _CreatingPartnerKey. |
| _LastUpdateLocalTS | Local timestamp corresponding to the update time at the local machine |
| _LastUpdatingPartnerKey | PartnerKey of the partner who last updated this entity. If the last update to the entity was done locally, this is the local machine's PartnerKey. |
| _LastUpdatingPartnerTS | Timestamp of the time at which this entity was updated at the partner corresponding to _LastUpdatingPartnerKey. |

(2) Change Tracking in "Typed" Search Views

In addition to providing the same information as the global search view, each typed search view provides additional information recording the sync state of each element in the sync topology.

| Column | Type | Description |
| --- | --- | --- |
| <global change tracking> | ... | Information from global change tracking |
| _ChangeUnitVersions | MultiSet<ChangeUnitVersion> | Description of version numbers of the change units within the particular element |
| _ElementSyncMetadata | ElementSyncMetadata | Additional version-independent metadata about this item that is only of interest to the Synchronization runtime. |
| _VersionSyncMetadata | VersionSyncMetadata | Additional version-specific metadata about this version that is only of interest to the Synchronization runtime | b) Tombstones

The data store provides tombstone information for Items, Extensions and Relationships. The tombstone views provide information about both live and tombstoned entities (items, extensions and relationships) in one place. The item and extension tombstone views do not provide access to the corresponding object, while the relationship tombstone view provides access to the relationship object (the relationship object is NULL in the case of a tombstoned relationship).

(1) Item Tombstones

Item tombstones are retrieved from the system via the view [System.Storage].[Tombstone!Item].

| Column | Type | Description |
| --- | --- | --- |
| ItemId | ItemID | Identity of the Item |
| _TypeID | TypeId | Type of the Item |
| <Item properties> | ... | Properties defined for all items |
| _RootItemId | ItemID | ItemID of the first non-embedding item which contains this item. |
| _ChangeTrackingInfo | CLR instance of type ChangeTrackingInfo | Change tracking information for this item |
| _IsDeleted | BIT | This is a flag that is 0 for live items, and 1 for tombstoned items. |
| _DeletionWallclock | UTCDATETIME | The UTC wall clock date time according to the partner which deleted the item. It is NULL if the Item is live. |

(2) Extension Tombstones

Extension tombstones are retrieved from the system using the view [System.Storage].[Tombstone!Extension]. Extension change tracking information is similar to that provided for Items with the addition of the ExtensionId property.

| Column | Type | Description |
| --- | --- | --- |
| ItemID | ItemID | Identity of the Item which owns the Extension |
| ExtensionId | ExtensionId | Extension Id of the Extension |
| _TypeID | TypeId | Type of the extension |
| _ChangeTrackingInfo | CLR instance of type ChangeTrackingInfo | Change tracking information for this extension |
| _IsDeleted | BIT | This is a flag that is 0 for live items, and 1 for tombstoned extensions. |
| _DeletionWallclock | UTCDATETIME | The UTC wall clock date time according to the partner which deleted the extension. It is NULL if the extension is live. |

(3) Relationships Tombstone

Relationship tombstones are retrieved from the system via the view [System.Storage].[Tombstone!Relationship]. Relationships tombstone information is similar to that provided for Extensions. However, additional information is provided on the target ItemRef of the relationship instance. In addition, the relationship object is also selected.

| Column | Type | Description |
| --- | --- | --- |
| ItemID | ItemID | Identity of the Item which owned the relationship (identity of relationship source endpoint) |
| RelationshipId | RelationshipId | RelationshipId of the relationship |
| _TypeID | TypeId | Type of the relationship |
| _ChangeTrackingInfo | CLR instance of type ChangeTrackingInfo | Change tracking information for this relationship |
| _IsDeleted | BIT | This is a flag that is 0 for live items, and 1 for tombstoned extensions. |
| _DeletionWallclock | UTCDATETIME | The UTC wall clock date time according to the partner which deleted the relationship. It is NULL if the relationship is live. |
| _Relationship | CLR instance of a Relationship | This is the relationship object for live relationship. It is NULL for tombstoned relationships. |
| TargetItemReference | ItemReference | Identity of target endpoint |

(4) Tombstone Cleanup

In order to prevent unbounded growth of tombstone information, the data store provides a tombstone cleanup task. This task determines when tombstone information may be discarded. The task computes a bound on the local create/update version and then truncates the tombstone information by discarding all earlier tombstone versions.

11. Helper APIs and Functions

The Base mapping also provides a number of helper functions. These functions are supplied to aid common operations over the data model.

a) Function [System.Storage].GetItem

```
Returns an Item object given an ItemId
//
Item GetItem (ItemId ItemId)
``` b) Function [System.Storage].GetExtension

```
// Returns an extension object given an ItemId and ExtensionId
//
Extension GetExtension (ItemId ItemId, ExtensionId ExtensionId)
``` c) Function [System.Storage].GetRelationship

```
// Returns an relationship object given an ItemId and RelationshipId
//
Relationship GetRelationship (ItemId ItemId, RelationshipId RelationshipId)
```

12. Metadata

There are two types of metadata represented in the Store: instance metadata (the type of an Item, etc), and type metadata.

a) Schema Metadata

Schema metadata is stored in the data store as instances of Item types from the Meta schema.

b) Instance Metadata

Instance metadata is used by an application to query for the type of an Item and finds the extensions associated with an Item. Given the ItemId for an Item, an application can query the global item view to return the type of the Item and use this value to query the Meta.Type view to return information on the declared type of the Item. For example,

```
// Return metadata Item object for given Item instance
//
SELECT m._Item AS metadataInfoObj
FROM [System.Storage].[Item] i INNER JOIN
[Meta].[Type] m ON i._TypeId = m.ItemId
WHERE i.ItemId = @ItemId
```

G. Security

In general, all securable objects arrange their access rights using the access mask format shown in the FIG. 26. In this format, the low-order 16 bits are for object-specific access rights, the next 7 bits are for standard access rights, which apply to most types of objects, and the 4 high-order bits are used to specify generic access rights that each object type can map to a set of standard and object-specific rights. The ACCESS_SYSTEM_SECURITY bit corresponds to the right to access the object's SACL.

In the access mask structure of FIG. 26, item specific rights are placed in the Object Specific Rights section (low order 16-bits). Because in the present embodiment, the storage platform exposes two sets of APIs to administer security—Win32 and the storage platform API, the file system object specific rights must be considered in order to motivate the design of the storage platform object specific rights.

Figure 27:
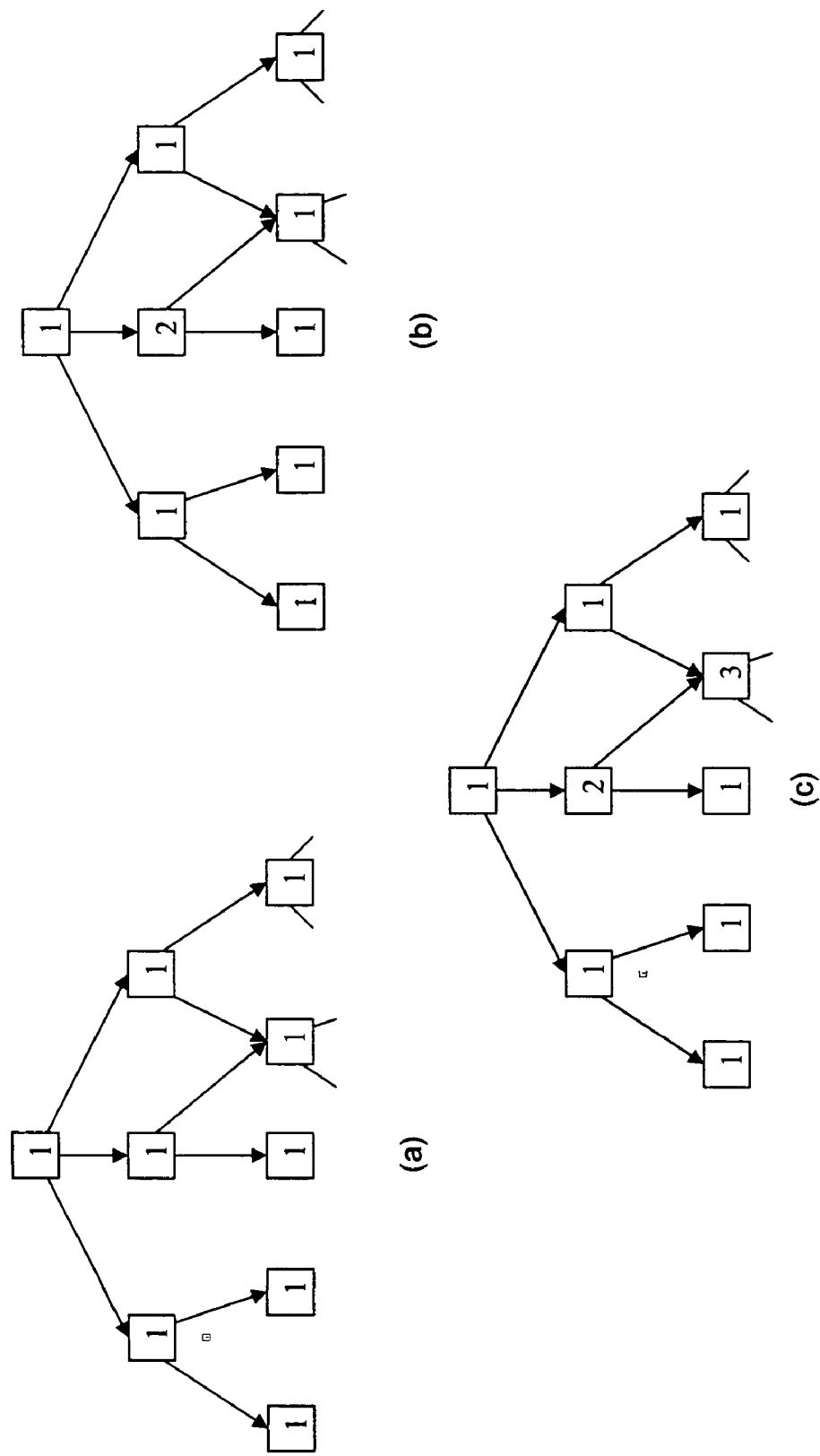
FIG. 27 (parts a, b, and c) depicts a new identically protected security region being carved out of an existing security region.

The security model for the storage platform of the present invention is fully described in the related applications incorporated by reference earlier herein. In this regard, FIG. 27 (parts a, b, and c) depicts a new identically protected security region being carved out of an existing security region, in accordance with one embodiment of a security model.

H. Notifications and Change Tracking

According to another aspect of the present invention, the storage platform provides a notifications capability that allows applications to track data changes. This feature is primarily intended for applications which maintain volatile state or execute business logic on data change events. Applications register for notifications on items, item extensions and item relationships. Notifications are delivered asynchronously after data changes have been committed. Applications may filter notifications by item, extension and relationship type as well as type of operation.

According to one embodiment, the storage platform API 322 provides two kinds of interfaces for notifications. First, applications register for simple data change events triggered by changes to items, item extensions and item relationships. Second, applications create "watcher" objects to monitor sets of items, item extensions and relationships between items. The state of a watcher object can be saved and re-created after a system failure or after a system has gone off-line for an extended period of time. A single notification may reflect multiple updates.

Additional details regarding this functionality can be found in the related applications incorporated by reference earlier herein.

I. Synchronization

According to another aspect of the present invention, the storage platform provides a synchronization service 330 that (i) allows multiple instances of the storage platform (each with its own data store 302) to synchronize parts of their content according to a flexible set of rules, and (ii) provides an infrastructure for third parties to synchronize the data store of the storage platform of the present invention with with other data sources that implement proprietary protocols.

Storage platform-to-storage platform synchronization occurs among a group of participating replicas. For example, with reference to FIG. 3, it may be desirable to provide synchronization between the data store 302 of the storage platform 300 with another remote data store 338 under the control of another instance of the storage platform, perhaps running on a different computer system. The total membership of this group is not necessarily known to any given replica at any given time.

Different replicas can make the changes independently (i.e. concurrently). The process of synchronization is defined as making every replica aware of the changes made by other replicas. This synchronization capability is inherently multi-master.

The synchronization capability of the present invention allows replicas to:

determine which changes another replica is aware of;
request information about changes that this replica is not aware of;

convey information about changes that the other replica is not aware of;
determine when two changes are in conflict with each other;
apply changes locally;
convey conflict resolutions to other replicas to ensure convergence; and
resolve the conflicts based on specified policies for conflict resolutions.

1. Storage Platform-to-Storage Platform Synchronization

The primary application of the synchronization service 330 of the storage platform of the present invention is to synchronize multiple instances of the storage platform (each with its own data store). The synchronization service operates at the level of the storage platform schemas (rather than the underlying tables of the database engine 314). Thus, for example, "Scopes" are used to define synchronization sets as discussed below.

The synchronization service operates on the principle of "net changes". Rather than recording and sending individual operations (such as with transactional replication), the synchronization service sends the end-result of those operations, thus often consolidating the results of multiple operations into a single resulting change.

The synchronization service does not in general respect transaction boundaries. In other words, if two changes are made to a storage platform data store in a single transaction, there is no guarantee that these changes are applied at all other replicas atomically—one may show up without the other. The exception to this principle is that if two changes are made to the same Item in the same transaction, then these changes are guaranteed to be sent and applied to other replicas atomically. Thus, Items are the consistency units of the synchronization service.

a) Synchronization (Sync) Controlling Applications

Any application can connect to the synchronization service and initiate a sync operation. Such an application provides all of the parameters needed to perform synchronization (see sync profile below). Such applications are referred to herein as Sync Controlling Applications (SCAs).

When synchronizing two storage platform instances, sync is initiated on one side by an SCA. That SCA informs the local synchronization service to synchronize with the remote partner. On the other side, the synchronization service is awoken by the messages sent by the synchronization service from the originating machine. It responds based on the persistent configuration information (see mappings below) present on the destination machine. The synchronization service can be run on schedule or in response to events. In these cases, the synchronization service implementing the schedule becomes the SCA.

To enable synchronization, two steps need to be taken. First, the schema designer must annotate the storage platform schema with appropriate sync semantics (designating Change Units as described below). Second, synchronization must be properly configured on all of the machines having an instance of the storage platform that is to participate in the synchronization (as described below).

b) Schema Annotation

A fundamental concept of the synchronization service is that of a Change Unit. A Change Unit is a smallest piece of schema that is individually tracked by the storage platform. For every Change Unit, the synchronization service may be able to determine whether it changed or did not change since the last sync.

Designating Change Units in the schema serves several purposes. First, it determines how chatty the synchronization service is on the wire. When a change is made inside a Change Unit, the entire Change Unit is sent to the other replicas, since the synchronization service does not know which part of the Change Unit was changed. Second, it determines the granularity of conflict detection. When two concurrent changes (these terms are defined in detail in subsequent sections) are made to the same change unit, the synchronization service raises a conflict; on the other hand, if concurrent changes are made to different change units, then no conflict is raised and the changes are automatically merged. Third, it strongly affects the amount of meta-data kept by the system. Much of the synchronization service meta-data is kept per-Change Unit; thus, making Change Units smaller increases the overhead of sync.

Defining Change Units requires finding the right trade-offs. For that reason, the synchronization service allows schema designers to participate in the process.

In one embodiment, the synchronization service does not support Change Units that are larger than an element. However, it does support the ability for schema designers to specify smaller change units than an element—namely, grouping multiple attributes of an element into a separate Change Unit. In that embodiment, this is accomplished using the following syntax:

```
<Type Name="Appointment" MajorVersion="1" MinorVersion="0"
ExtendsType="Base.Item"
    Extends Version="1">
    <Field Name="MeetingStatus" Type="the storage
    platformTypes.uniqueidentifier Nullable="False"/>
    <Field Name="OrganizerName" Type="the storage
    platformTypes.nvarchar(512)" Nullable="False"/>
    <Field Name="OrganizerEmail" Type="the storage
    platformTypes.nvarchar(512)"
        TypeMajorVersion="1"      MultiValued="True"/>
    ...
    <ChangeUnit Name="CU_Status">
        <Field Name="MeetingStatus"/>
    </ChangeUnit>
    <ChangeUnit Name="CU_Organizer"/>
        <Field Name="OrganizerName" />
        <Field Name="OrganizerEmail" />
    </ChangeUnit>
    ...
</Type>
``` c) Sync Configuration

A group of storage platform partners that wish to keep certain parts of their data in sync are referred to as a sync community. While the members of the community want to stay in sync, they do not necessarily represent the data in exactly the same way; in other words, sync partners may transform the data they are synchronizing.

In a peer-to-peer scenario, it is impractical for peers to maintain transformation mappings for all of their partners. Instead, the synchronization service takes the approach of defining "Community Folders". A community folder is an abstraction that represents a hypothetical "shared folder" that all community members are synchronizing with.

This notion is best illustrated by an example. If Joe wants to keep My Documents folders of his several computers in sync, Joe defines a community folder called, say, JoesDocuments. Then, on every computer, Joe configures a mapping between the hypothetical JoesDocuments folder and the local My Documents folder. From this point on, when Joe's computers synchronize with each other, they talk in terms of documents in JoesDocuments, rather than their local items. This way, all Joe's computers understand each other without having to know who the others are—the Community Folder becomes the lingua franca of the sync community.

Configuring the synchronization service consists of three steps: (1) defining mappings between local folders and community folders; (2) defining sync profiles that determine what gets synchronized (e.g. whom to sync with and which subsets should be sent and which received); and (3) defining the schedules on which different sync profiles should run, or running them manually.

(1) Community Folder—Mappings

Community Folder mappings are stored as XML configuration files on individual machines. Each mapping has the following schema:

/mappings/communityFolder

This element names the community folder that this mapping is for. The name follows the syntax rules of Folders.

/mappings/localFolder

This element names the local folder that the mapping transforms into. The name follows the syntax rules of Folders. The folder must already exist for the mapping to be valid. The items within this folder are considered for synchronization per this mapping.

/mappings/transformations

This element defines how to transform items from the community folder to the local folder and back. If absent or empty, no transformations are performed. In particular, this means that no IDs are mapped. This configuration is primarily useful for creating a cache of a Folder.

/mappings/transformations/mapIDs

This element requests that newly generated local IDs be assigned to all of the items mapped from the community folder, rather than reusing community IDs. The Sync Runtime will maintain ID mappings to convert items back and forth.

/mappings/transformations/localRoot

This element requests that all root items in the community folder be made children of the specified root.

/mappings/runAs

This element controls under whose authority requests against this mapping are processed. If absent, sender is assumed.

/mappings/runAs/sender

The presence of this element indicates that the sender of messages to this mapping must be impersonated, and requests processed under his credentials.

(2) Profiles

A Sync Profile is a total set of parameters needed to kick off synchronization. It is supplied by an SCA to the Sync Runtime to initiate sync. Sync profiles for storage platform-to-storage platform synchronization contain the following information:

Local Folder, to serve as the source and destination for changes;

Remote Folder name to synchronize with—this Folder must be published from the remote partner by way of a mapping as defined above;

Direction—the synchronization service supports send-only, receive-only, and send-receive sync;

Local Filter—selects what local information to send to the remote partner. Expressed as a storage platform query over the local folder;

Remote Filter—selects what remote information to retrieve from the remote partner—expressed as a storage platform query over the community folder;

Transformations—defines how to transform items to and from the local format;

Local security—specifies whether the changes retrieved from the remote endpoint are to be applied under the permissions of the remote endpoint (impersonated) or the user initiating the sync locally; and Conflict resolution policy—specifies whether conflicts should be rejected, logged, or automatically resolved—in the latter case, it specifies which conflict resolver to use, as well as the configuration parameters for it.

The synchronization service provides a runtime CLR class that allows simple building of Sync Profiles. Profiles can also be serialized to and from XML files for easy storage (often alongside schedules). However, there is no standard place in the storage platform where all the profiles are stored; SCAs are welcome to construct a profile on the spot without ever persisting it. Note that there is no need to have a local mapping to initiate sync. All sync information can be specified in the profile. The mapping is, however, required in order to respond to sync requests initiated by the remote side.

(3) Schedules

In one embodiment, the synchronization service does not provide its own scheduling infrastructure. Instead, it relies on another component to peform this task—the Windows Scheduler available with the Microsoft Windows operating system. The synchronization service includes a command-line utility that acts as an SCA and triggers synchronization based on a sync profile saved in an XML file. This utility makes it very easy to configure the Windows Scheduler to run synchronization either on schedule, or in response to events such as user logon or logoff.

d) Conflict Handling

Conflict handling in the synchronization service is divided into three stages: (1) conflict detection, which occurs at change application time—this step determines if a change can be safely applied; (2) automatic conflict resolution and logging—during this step (that takes place immediately after the conflict is detected) automatic conflict resolvers are consulted to see if the conflict can be resolved—if not, the conflict can be optionally logged; and (3) conflict inspection and resolution—this step takes place if some conflicts have been logged, and occurs outside of the context of the sync session—at this time, logged conflicts can be resolved and removed from the log.

(1) Conflict Detection

In the present embodiment, the synchronization service detects two types of conflicts: knowledge-based and constraint-based.

(a) Knowledge-Based Conflicts

A knowledge-based conflict occurs when two replicas make independent changes to the same Change Unit. Two changes are called independent if they are made without knowledge of each other—in other words, the version of the first is not covered by the knowledge of the second and vice versa. The synchronization service automatically detects all such conflicts based on the replicas' knowledge as described above.

It is sometimes helpful to think of conflicts as forks in the version history of a change unit. If no conflicts occur in the life of a change unit, its version history is a simple chain—each change occurring after the previous one. In the case of a knowledge-based conflict, two changes occur in parallel, causing the chain to split and become a version tree.

(b) Constraint-Based Conflicts

There are cases where independent changes violate an integrity constraint when applied together. For instance, two replicas creating a file with the same name in the same directory could cause such a conflict to occur.

A constraint-based conflict involves two independent changes (just like a knowledge-based one), but they do not affect the same change unit. Rather, they affect different change units but with a constraint existing between them.

The synchronization service detects constraint violations at change application time and raises constraint-based conflicts automatically. Resolving constraint-based conflicts usually requires custom code that modifies the changes in such as way as to not violate the constraint; The synchronization service does not provide a general-purpose mechanism for doing so.

(2) Conflict Processing

When a conflict is detected, the synchronization service can take one of three actions (selected by the sync initiator in the Sync Profile): (1) reject the change, returning it back to sender; (2) log a conflict into a conflict log; or (3) resolve the conflict automatically.

If the change is rejected, the synchronization service acts as if the change did not arrive at the replica. A negative acknowledgement is sent back to the originator. This resolution policy is primarily useful on head-less replicas (such as file servers) where logging conflicts is not feasible. Instead, such replicas force the others to deal with the conflicts by rejecting them.

Sync initiators configure conflict resolution in their Sync Profiles. The synchronization service supports combining multiple conflict resolvers in a single profile in the following ways—first, by specifying a list of conflict resolvers to be tried one after another, until one of them succeeds; and second, by associating conflict resolvers with conflict types, e.g. directing update-update knowledge-based conflicts to one resolver, but all the other conflicts to the log.

(a) Automatic Conflict Resolution

The synchronization service provides a number of default conflict resolvers. This list includes:

local-wins: disregard incoming changes if in conflict with locally stored data;

remote-wins: disregard local data if in conflict with incoming changes;

last-writer-wins: pick either local-wins or remote-wins per change unit based on the timestamp of the change (note that the synchronization service in general does not rely on clock values; this conflict resolver is the sole exception to that rule);

Deterministic: pick a winner in a manner that is guaranteed to be the same on all replicas, but not otherwise meaningful—one embodiment of the synchronization services uses lexicographic comparisons of partner IDs to implement this feature.

In addition, ISVs can implement and install their own conflict resolvers. Custom conflict resolvers may accept configuration parameters; such parameters must be specified by the SCA in the Conflict Resolution section of the Sync Profile.

When a conflict resolver handles a conflict, it returns the list of operations that need to be performed (in lieu of the conflicting change) back to the runtime. The synchronization service then applies these operations, having properly adjusted remote knowledge to include what the conflict handler has considered.

It is possible that another conflict is detected while applying the resolution. In such a case, the new conflict must be resolved before the original processing resumes.

When thinking of conflicts as branches in the version history of an item, conflict resolutions can be viewed as joins—combining two branches to form a single point. Thus, conflict resolutions turn version histories into DAGs.

(b) Conflict Logging

A very particular kind of a conflict resolver is the Conflict Logger. The synchronization service logs conflicts as Items of type ConflictRecord. These records are related back to the items that are in conflict (unless the items themselves have been deleted). Each conflict record contains: the incoming change that caused the conflict; the type of the conflict: update-update, update-delete, delete-update, insert-insert, or constraint; and the version of the incoming change and the knowledge of the replica sending it. Logged conflicts are available for inspection and resolution as described below.

(c) Conflict Inspection and Resolution

The synchronization service provides an API for applications to examine the conflict log and to suggest resolutions of the conflicts in it. The API allows application to enumerate all conflicts, or conflicts related to a given Item. It also allows such applications to resolve logged conflicts in one of three ways: (1) remote wins—accepting the logged change and overwriting the conflicting local change; (2) local wins—ignoring conflicting parts of the logged change; and (3) suggest new change—where the application proposes a merge that, in its opinion, resolves the conflict. Once conflicts are resolved by an application, the synchronization service removes them from the log.

(d) Convergence of Replicas and Propagation of Conflict Resolutions

In complex synchronization scenarios, the same conflict can be detected at multiple replicas. If this occurs, several things can happen: (1) the conflict can be resolved on one replica, and the resolution be sent to the other; (2) the conflict is resolved on both replicas automatically; or (3) the conflict is resolved on both replicas manually (through the conflict inspection API).

To ensure convergence, the synchronization service forwards conflict resolutions to other replicas. When a change that resolves a conflict arrives at a replica, the synchronization service automatically finds any conflict records in the log that are resolved by this update and eliminates them. In this sense, a conflict resolution at one replica is binding on all the other replicas.

If different winners are chosen by different replicas for the same conflict, the synchronization service applies the principle of binding conflict resolution and picks one of the two resolutions to win over the other automatically. The winner is picked in a deterministic fashion that is guaranteed to produce the same results at all times (one embodiment uses replica ID lexicographic comparisons).

If different "new changes" are suggested by different replicas for the same conflict, the synchronization service treats this new conflict as a special conflict and uses the Conflict Logger to prevent it from propagating to other replicas. Such situation commonly arises with manual conflict resolution.

2. Synchronizing to Non-Storage Platform Data Stores

According to another aspect of the storage platform of the present invention, the storage platform provides an architecture for ISVs to implement Sync Adapters that allow the storage platform to synchronize to legacy systems such as Microsoft Exchange, AD, Hotmail, etc. Sync Adapters benefit from the many Sync Service provided by the synchronization service, as described below.

Despite the name, Sync Adapters do not need to be implemented as plug-ins into some storage platform architecture. If desired, a "sync adapter" can simply be any application that utilizes the synchronization service runtime interfaces to obtain services such as change enumeration and application.

In order to make it simpler for others to configure and run synchronization to a given backend, Sync Adapter writers are encouraged to expose the standard Sync Adapter interface, which runs sync given the Sync Profile as described above. The profile provides configuration information to the adapter, some of which adapters pass to the Sync Runtime to control runtime services (e.g. the Folder to synchronize).

a) Sync Services

The synchronization service provides a number of sync services to adapter writers. For the rest of this section, it is convenient to refer to the machine on which the storage platform is doing synchronization as the "client" and the non-storage platform backend that the adapter is talking to as the "server".

(1) Change Enumeration

Based on the change-tracking data maintained by the synchronization service, Change Enumeration allows sync adapters to easily enumerate the changes that have occurred to a data store Folder since the last time synchronization with this partner was attempted.

Changes are enumerated based on the concept of an "anchor"—an opaque structure that represents information about the last synchronization. The anchor takes the form of the storage platform Knowledge, as described in the proceeding sections. Sync adapters utilizing change enumeration services fall into two broad categories: those using "stored anchors" vs. those using "supplied anchors".

The distinction is based on where the information about the last sync is stored—on the client, or on the server. It is often easier for adapters to store this information on the client—the backend is often not capable of conveniently storing this information. On the other hand, if multiple clients synchronize to the same backend, storing this information on the client is inefficient and in some cases incorrect—it makes one client unaware of the changes that the other client has already pushed up to the server. If an adapter wants to use a server-stored anchor, the adapter needs to supply it back to the storage platform at the time of change enumeration.

In order for the storage platform to maintain the anchor (either for local or remote storage), the storage platform needs to be made aware of the changes that were successfully applied at the server. These and only these changes can be included in the anchor. During change enumeration, Sync Adapters use an Acknowledgement interface to report which changes were successfully applied. At the end of synchronization, adapters using supplied anchors must read the new anchor (which incorporates all of the successfully-applied changes) and send it to their backend.

Often, Adapters need to store adapter-specific data along with the items they insert into the storage platform data store. Common examples of such data are remote IDs and remote versions (timestamps). The synchronization service provides a mechanism for storing this data, and Change Enumeration provides a mechanism to receive this extra data along with the changes being returned. This eliminates the need for adapters to re-query the database in most cases.

(2) Change Application

Figure 24:
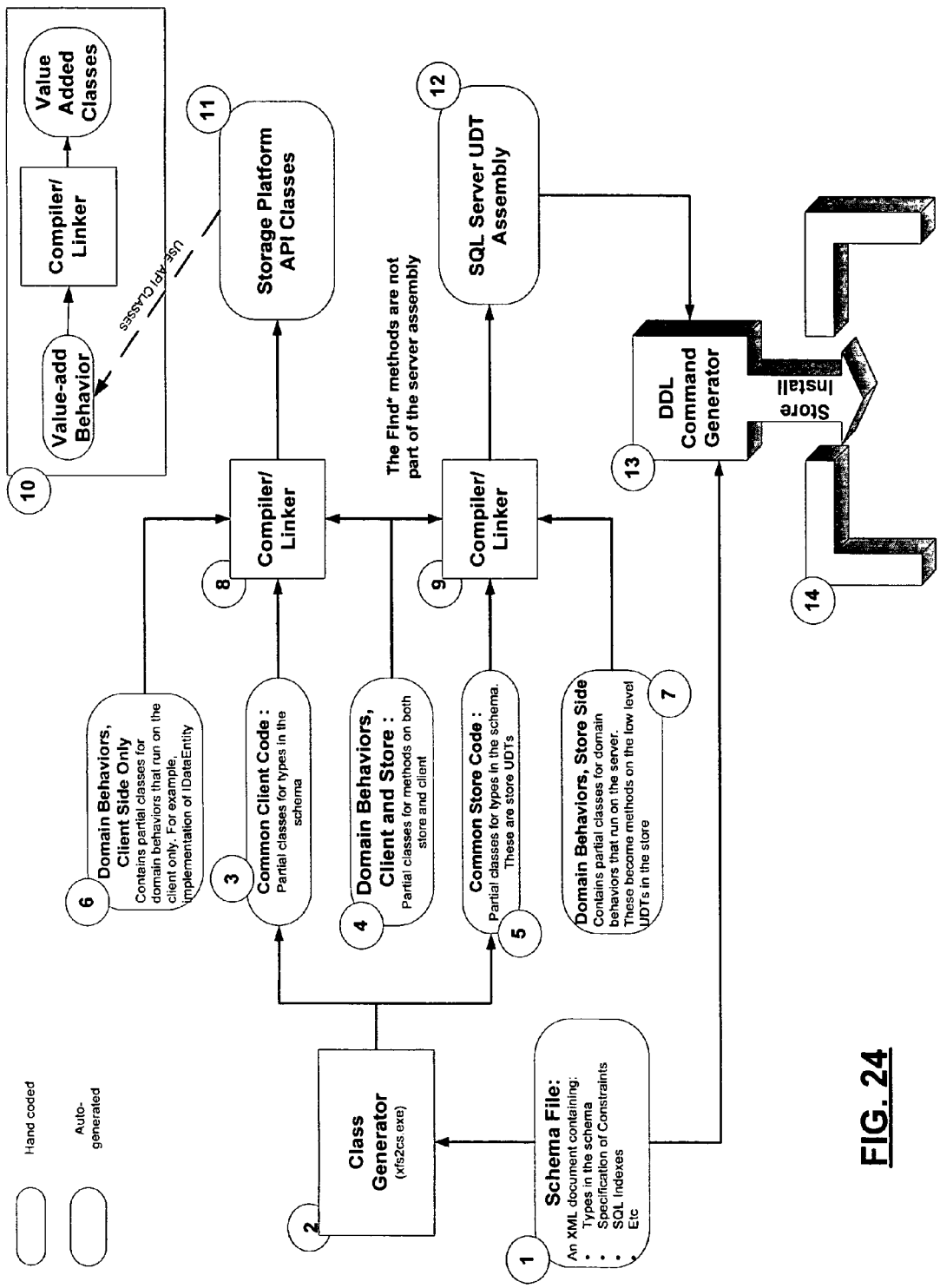
FIG. 24 illustrates the process by which storage platform API classes are generated from the storage platform Schema.

Change Application allows Sync Adapters to apply changes received from their backend to the local storage platform. Adapters are expected to transform the changes to the storage platform schema. FIG. 24 illustrates the process by which storage platform API classes are generated from the storage platform Schema.

The primary function of change application is to automatically detect conflicts. As in the case of Storage Platform-to-Storage Platform sync, a conflict is defined as two overlapping changes being made without knowledge of each other. When adapters use Change Application, they must specify the anchor with respect to which conflict detection is performed. Change Application raises a conflict if an overlapping local change that is not covered by the adapter's knowledge is detected. Similar to Change Enumeration, adapters may use either stored or supplied anchors. Change Application supports efficient storage of adapter-specific meta-data. Such data may be attached by the adapter to the changes being applied, and might be stored by the synchronization service. The data might be returned on next change enumeration.

(3) Conflict Resolution

The Conflict Resolution mechanisms described above (logging and automatic resolution options) are available to sync adapters as well. Sync adapters may specify the policy for conflict resolution when applying changes. If specified, conflicts may be passed on to the specified conflict handler and resolved (if possible). Conflicts can also be logged. It is possible that the adapter may detect a conflict when attempting to apply a local change to the backend. In such a case, the adapter may still pass the conflict on to the Sync Runtime to be resolved according to policy. In addition, Sync Adapters may request that any conflicts detected by the synchronization service be sent back to them for processing. This is particularly convenient in the case where the backend is capable of storing or resolving conflicts.

b) Adapter Implementation

While some "adapters" are simply applications utilizing runtime interfaces, adapters are encouraged to implement the standard adapter interfaces. These interfaces allow Sync Controlling Applications to: request that the adapter perform synchronization according to a given Sync Profile; cancel on-going synchronization; and receive progress reporting (percentage complete) on an ongoing sync.

3. Security

The synchronization service strives to introduce as little as possible into the security model implemented by the storage platform. Rather than defining new rights for synchronization, existing rights are used. Specifically, anyone who can read a data store Item can enumerate changes to that item;

anyone who can write to a data store Item can apply changes to that item; and anyone who can extend a data store Item can associate sync meta-data with that item.

The synchronization service does not maintain secure authorship information. When a change is made at replica A by user U and forwarded to replica B, the fact that the change was originally made at A (or by U) is lost. If B forwards this change to replica C, this is done under B's authority, not that of A. This leads to the following limitation: if a replica is not trusted to make its own changes to an item, it cannot forward changes made by others.

When the synchronization service is initiated, it is done by a Sync Controlling Application. The synchronization service impersonates the identity of the SCA and performs all operations (both locally and remotely) under that identity. To illustrate, observe that user U cannot cause the local synchronization service to retrieve changes from a remote storage platform for items that user U does not have read access.

4. Manageability

Monitoring a distributed community of replicas is a complex problem. The synchronization service may use a "sweep" algorithm to collect and distribute information about the status of the replicas. The properties of the sweep algorithm ensure that information about all configured replicas is eventually collected and that failing (non-responsive) replicas are detected.

This community-wide monitoring information is made available at every replica. Monitoring tools can be run at an arbitrarily-chosen replica to examine this monitoring information and make administrative decisions. Any configuration changes must be made directly at the affected replicas.

J. Traditional File System Interoperability

As mentioned above, the storage platform of the present invention is, in at least some embodiments, intended to be embodied as an integral part of the hardware/software interface system of a computer system. For example, the storage platform of the present invention may be embodied as an integral part of an operating system, such as the Microsoft Windows family of operating systems. In that capacity, the storage platform API becomes a part of the operating system APIs through which application programs interact with the operating system. Thus, the storage platform becomes the means through which application programs store information on the operating system, and the Item based data model of the storage platform therefore replaces the traditional files system of such an operating system. For example, as embodied in the Microsoft Windows family of operating systems, the storage platform might replace the NTFS file system implemented in that operating system. Presently, application programs access the services of the NTFS file system through the Win32 APIs exposed by the Windows family of operating systems.

Recognizing, however, that completely replacing the NTFS file system with the storage platform of the present invention would require recoding of existing Win32-based application programs and that such recoding may be undesirable, it would be beneficial for the storage platform of the present invention to provide some interoperability with existing file systems, such as NTFS. In one embodiment of the present invention, therefore, the storage platform enables application programs which rely on the Win32 programming model to access the contents of both the data store of the storage platform as well as the traditional NTFS file system. To this end, the storage platform uses a naming convention that is a superset of the Win32 naming conventions to facilitate easy interoperability. Further, the storage platform supports accessing files and directories stored in a storage platform volume through the Win32 API.

Additional details regarding this functionality can be found in the related applications incorporated by reference earlier herein.

K. Storage Platform API

The storage platform comprises an API that enables application programs to access the features and capabilities of the storage platform discussed above and to access items stored in the data store. This section describes one embodiment of a storage platform API of the storage platform of the present invention. Details regarding this functionality can be found in the related applications incorporated by reference earlier herein, with some of this information summarized below for convenience.

Figure 18:
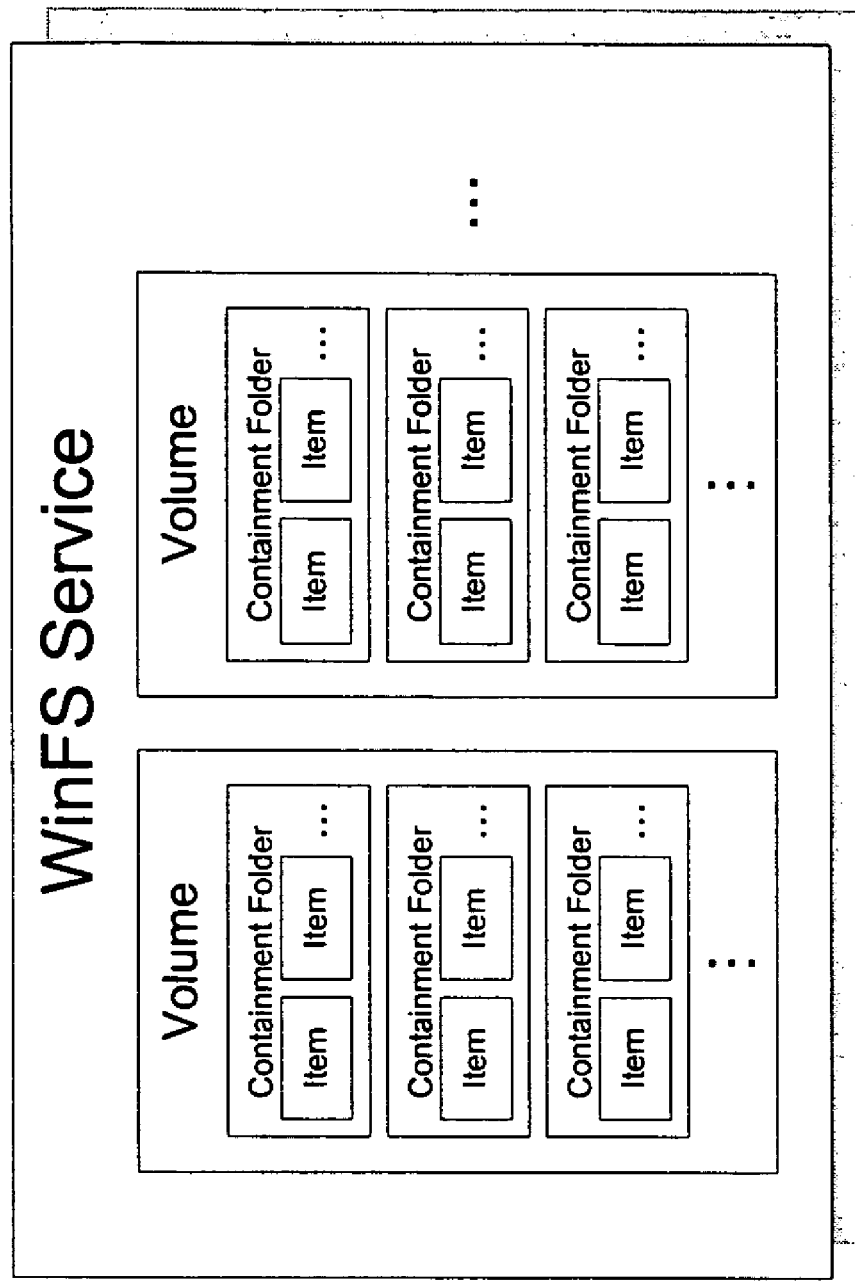
FIG. 18 illustrates the concept of Containment Folders.

Referring to FIG. 18, a Containment Folder is an item which contains holding Relationships to other Items and is the equivalent of the common concept of a file system folder. Each Item is "contained" within at least one containment folder.

Figure 19:
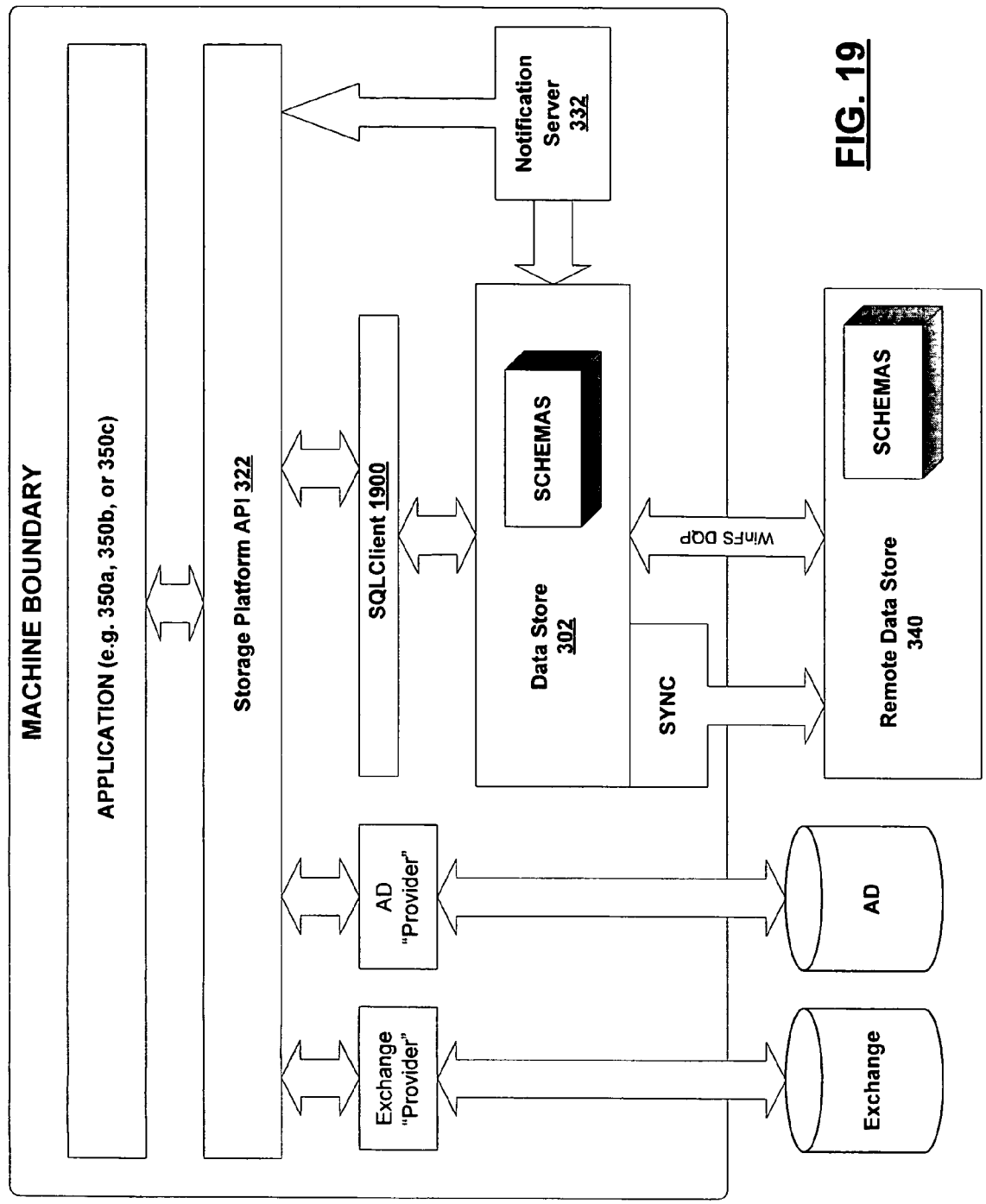
FIG. 19 illustrates the basic architecture of the storage platform API.

FIG. 19 illustrates the basic architecture of the storage platform API, in accordance with the present embodiment. The storage platform API uses SQLClient 1900 to talk to the local data store 302 and may also use SQLClient 1900 to talk to remote data stores (e.g., data store 340). The local store 302 may also talk to the remote data store 340 using either DQP (Distributed Query Processor) or through the the storage platform synchronization service ("Sync") described above. The storage platform API 322 also acts as the bridge API for data store notifications, passing application's subscriptions to the notification engine 332 and routing notifications to the application (e.g., application 350*a*, 350*b*, or 350*c*), as also described above. In one embodiment, the storage platform API 322 may also define a limited "provider" architecture so that it can access data in Microsoft Exchange and AD.

Figure 20:
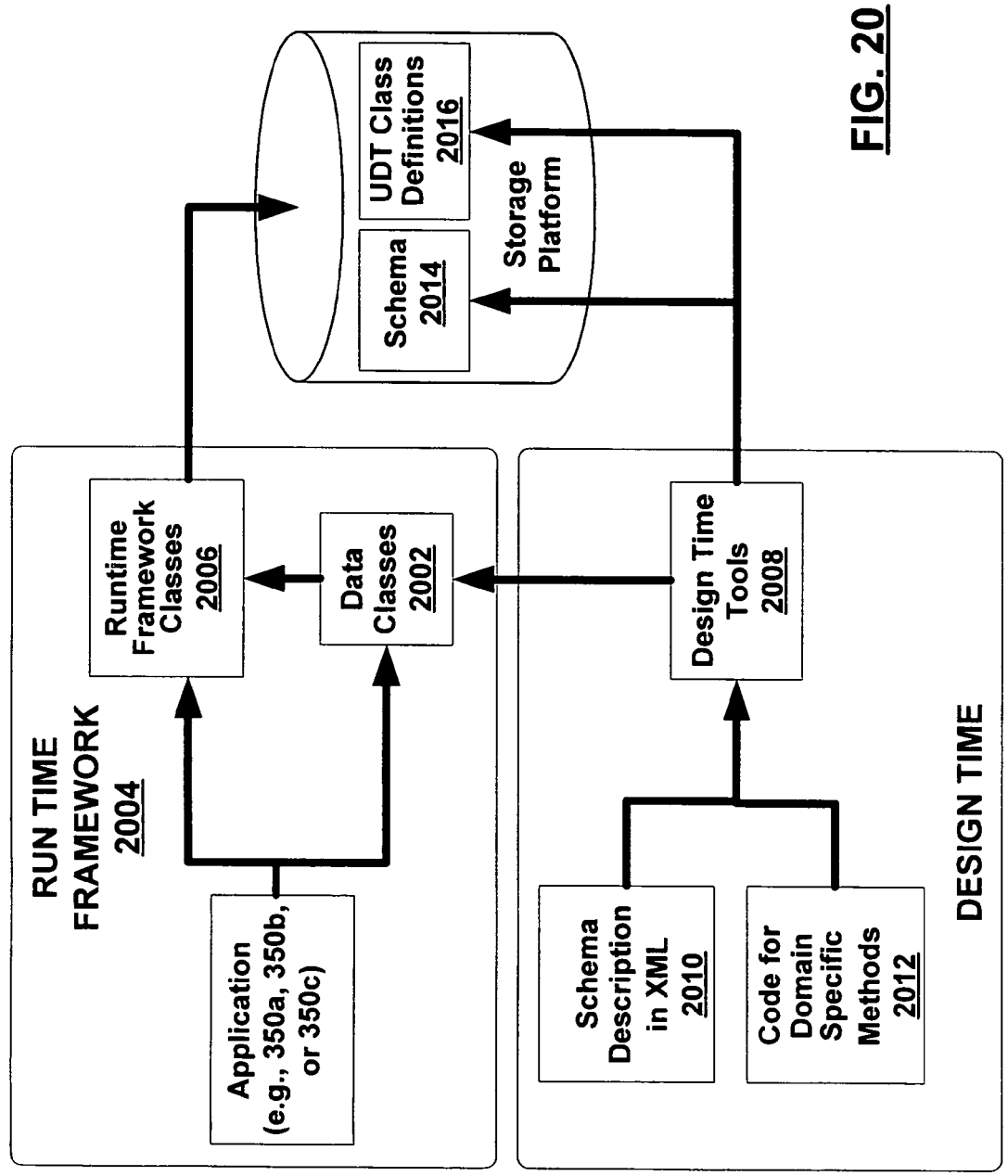
FIG. 20 schematically represents the various components of the storage platform API stack.

FIG. 20 schematically represents the various components of the storage platform API. The storage platform API consists of the following components: (1) data classes 2002, which represent the storage platform element and item types, (2) runtime framework 2004, which manages object persistence and provides support classes 2006; and (3) tools 2008, which are used to generate CLR classes from the storage platform schemas.

Figure 21A:
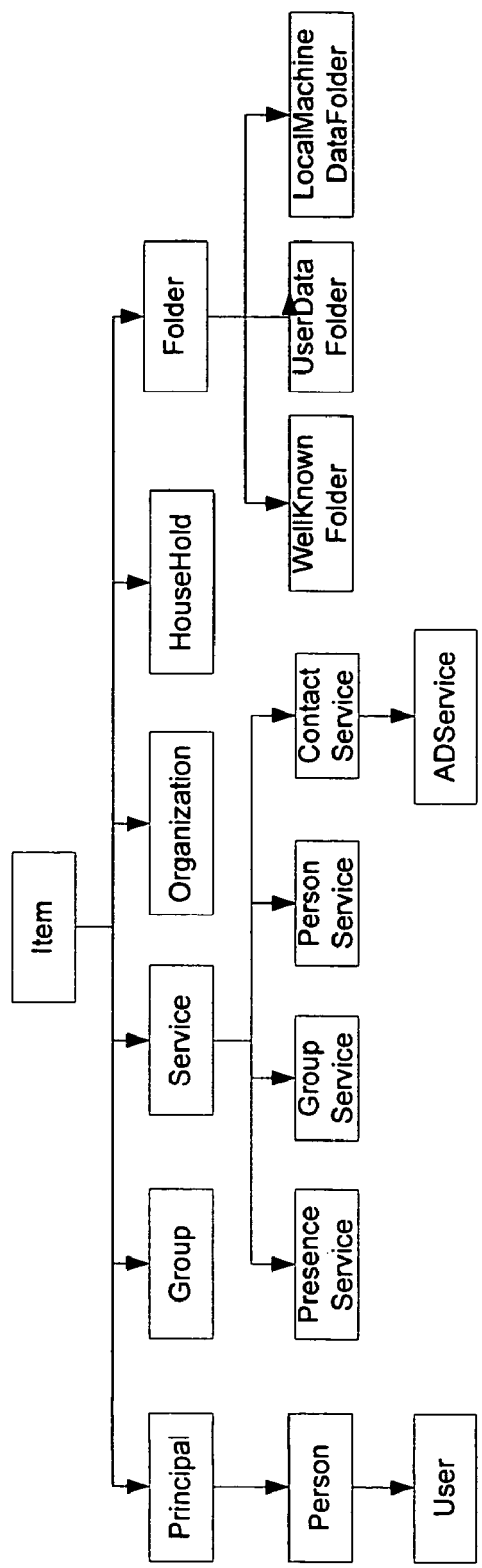
FIG. 21A is a pictorial representation of an exemplary Contacts Item schema.
Figure 21B:
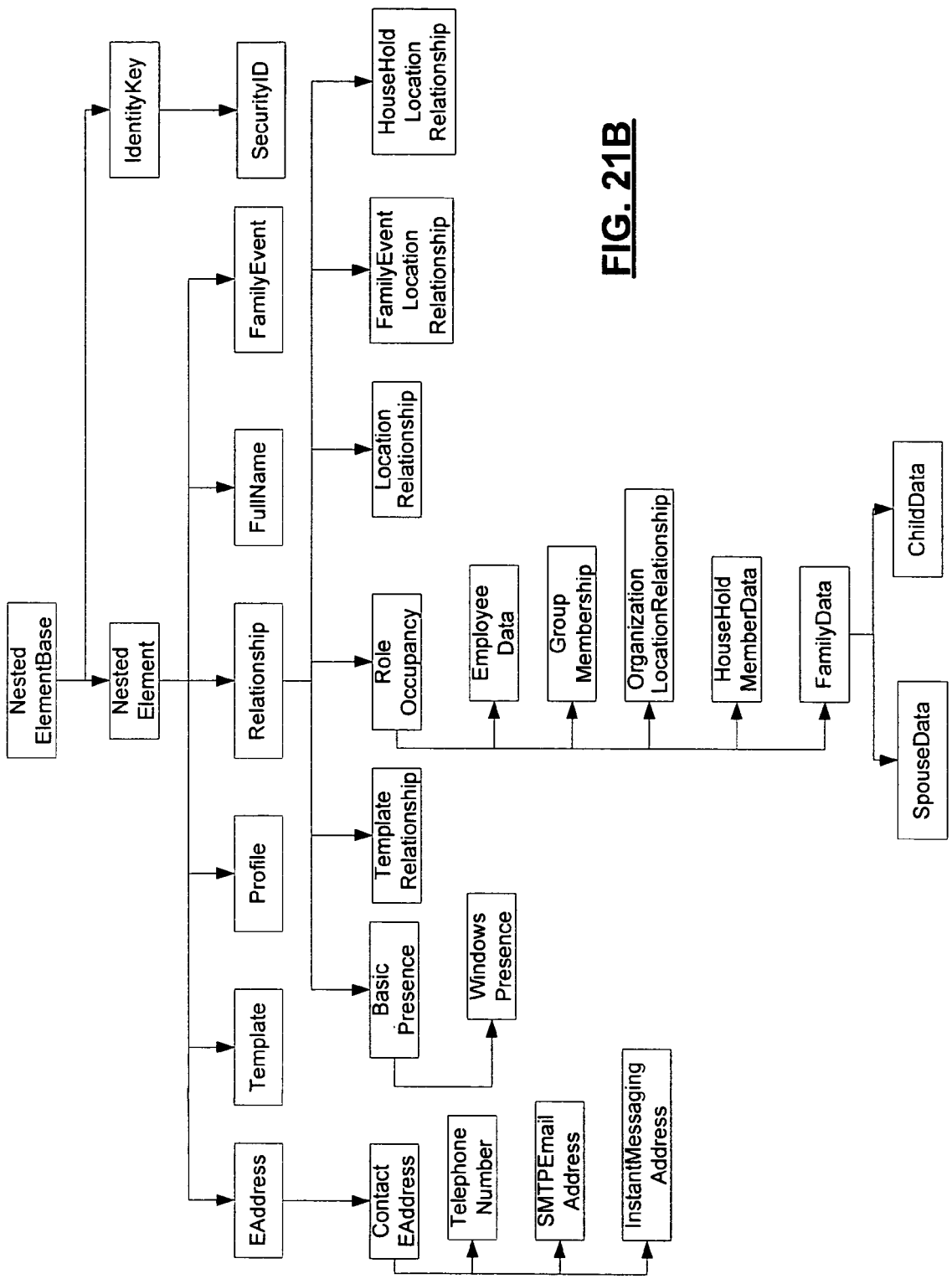
FIG. 21B is a pictorial representation of the Elements for the exemplary Contacts Item schema of FIG. 21A.

The hierarchy of classes resulting from a given schema directly reflects the hierarchy of types in that schema. As an example, consider the Item types defined in the Contacts schema as shown in FIG. 21A and FIG. 21B.

Figure 22:
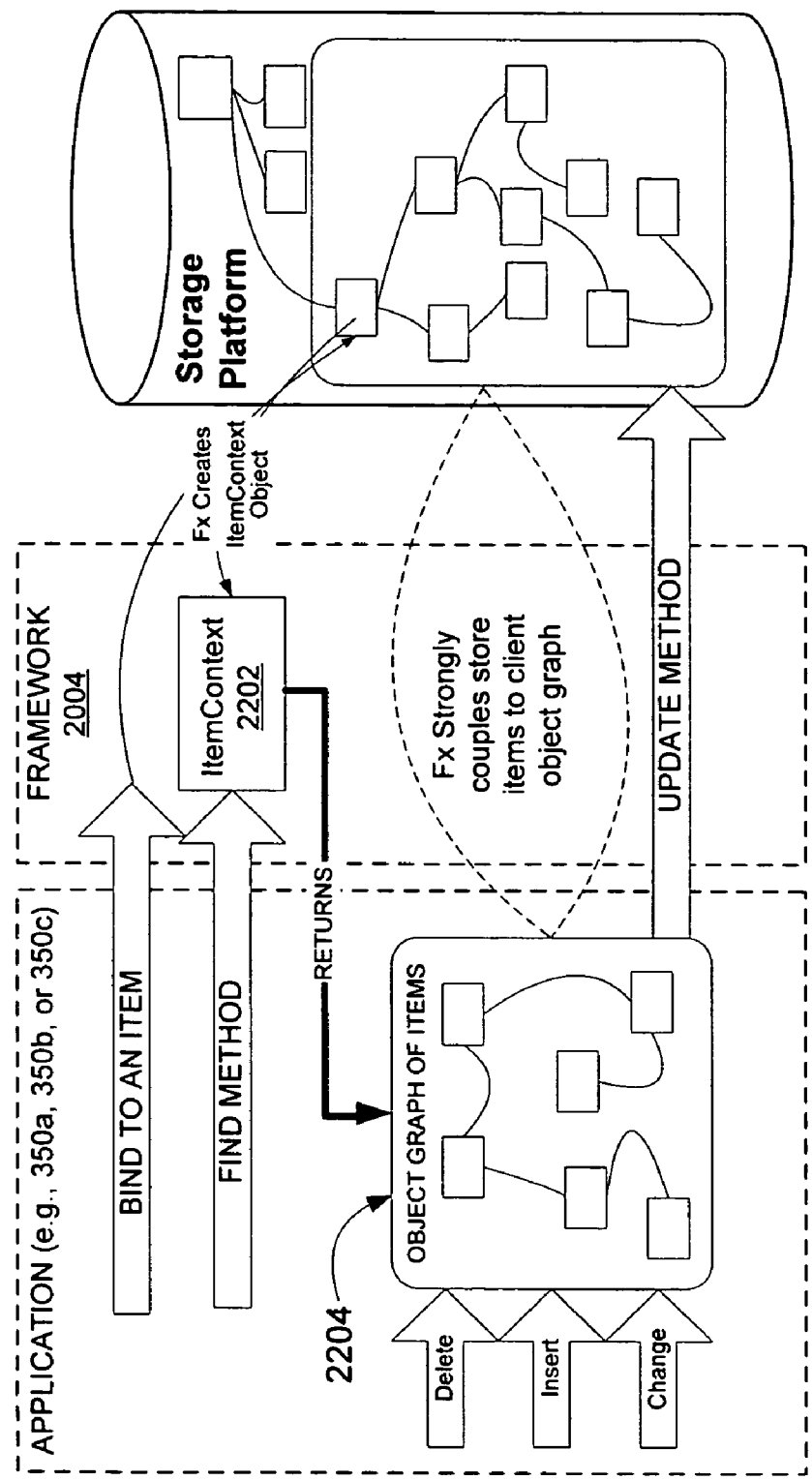
FIG. 22 illustrates the runtime framework of the storage platform API.

FIG. 22 illustrates the runtime framework in operation. The runtime framework operates as follows:

1. An application 350*a*, 350*b*, or 350*c* binds to an item in the storage platform.
2. The framework 2004 creates an ItemContext object 2202 corresponding to the bound item and returns it to the application.
3. The application submits a Find on this ItemContext to get a collection of Items; the returned collection is conceptually an object graph 2204 (due to relationships).
4. The application changes, deletes, and inserts data.
5. The application saves the changes by calling the Update( ) method.

Figure 23:
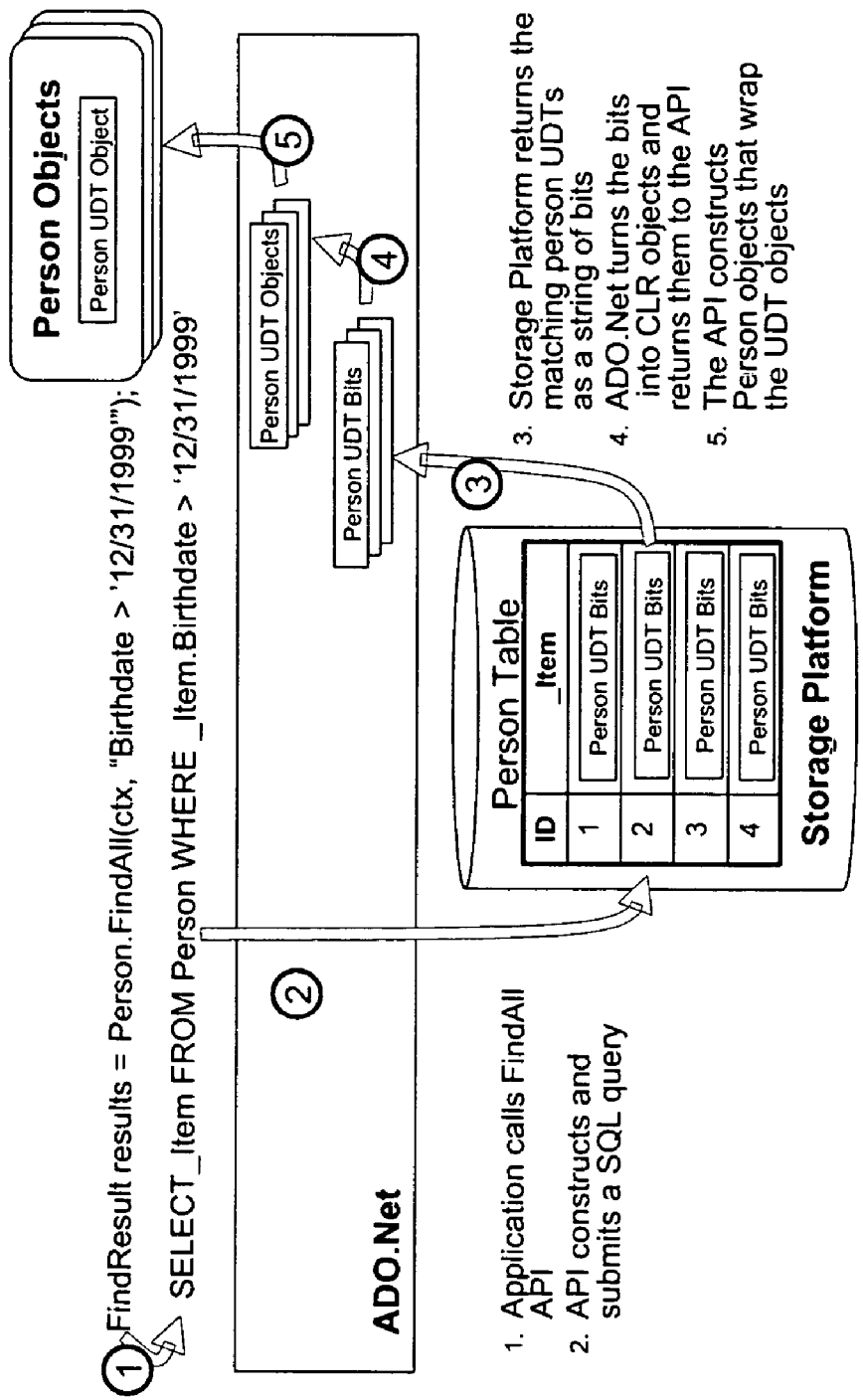
FIG. 23 illustrates the execution of a "FindAll" operation.

FIG. 23 illustrates the execution of a "FindAll" operation.

Figure 25:
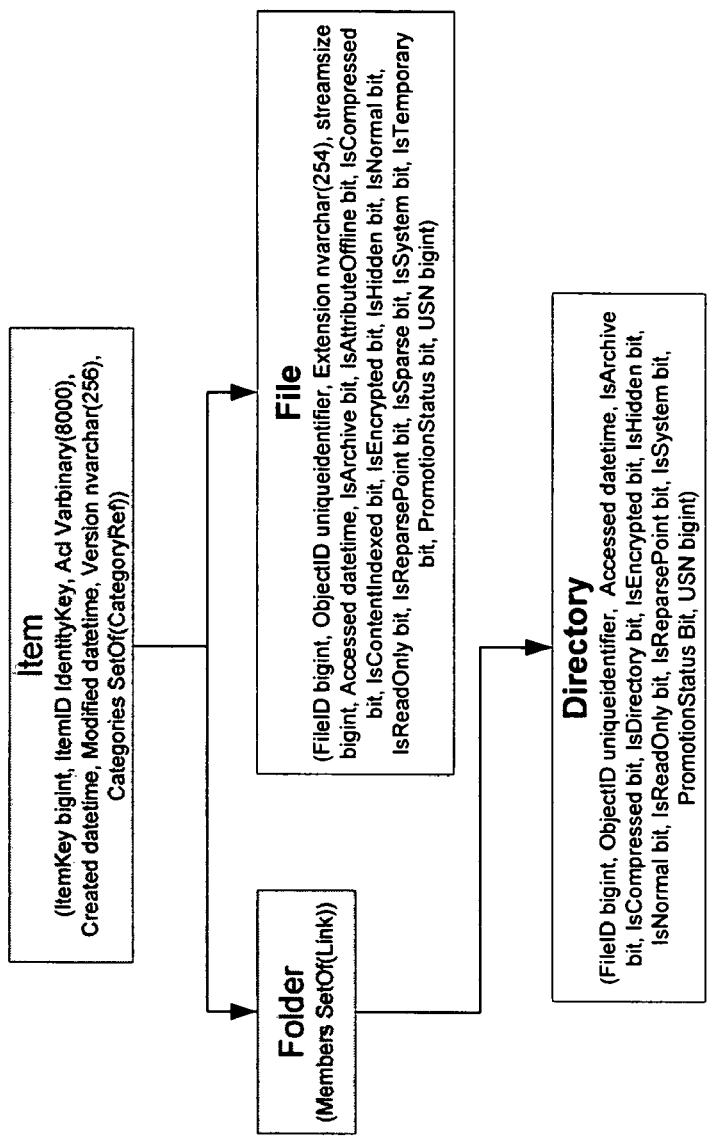
FIG. 25 illustrates a schema on which a File API is based.

FIG. 24 illustrates the process by which storage platform API classes are generated from the storage platform Schema FIG. 25 illustrates the schema on which the File API is based. The storage platform API includes a namespace for dealing with file objects. This namespace is called System.Storage.Files. The data members of the classes in System.Storage.Files directly reflect the information stored in the storage platform store; this information is "promoted" from the file system objects or may be created natively using the Win32 API. The System.Storage.Files namespace has two classes: FileItem and DirectoryItem. The members of these classes and methods thereof can be readily divined by looking at the schema diagram in FIG. 25. FileItem and DirectoryItem are read-only from the storage platform API. In order to modify them, one has to use the Win32 API or classes in System.IO.

In regard to APIs, a programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 30B:
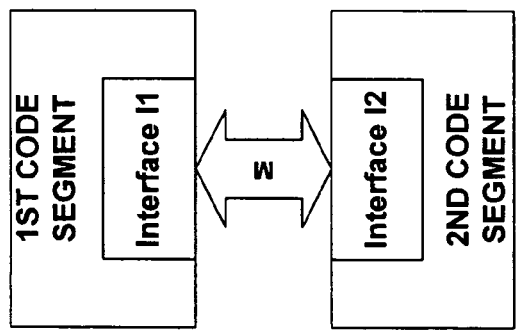
FIG. 30B illustrates an interface as comprising interface objects I1 and I2 which enable first and second code segments of a system to communicate via medium M.
Figure 30A:
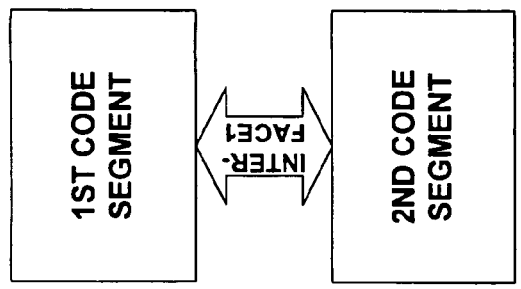
FIG. 30A illustrates an interface Interface1 as a conduit through which first and second code segments communicate.

Notionally, a programming interface may be viewed generically, as shown in FIG. 30A or FIG. 30B. FIG. 30A illustrates an interface Interface1 as a conduit through which first and second code segments communicate. FIG. 30B illustrates an interface as comprising interface objects I1 and I2 (which may or may not be part of the first and second code segments), which enable first and second code segments of a system to communicate via medium M. In the view of FIG. 30B, one may consider interface objects I1 and I2 as separate interfaces of the same system and one may also consider that objects I1 and I2 plus medium M comprise the interface. Although FIGS. 30A and 30B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 30A and 30B, but they nonetheless perform a similar function to accomplish the same overall result. We will now briefly describe some illustrative alternative implementations of a programming interface.

Figure 31B:
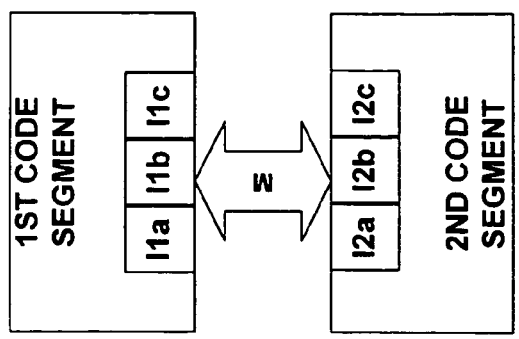
FIG. 31B illustrates how the function provided by interface I1 may be subdivided into multiple interfaces I1a, I1b, I1c.
Figure 31A:
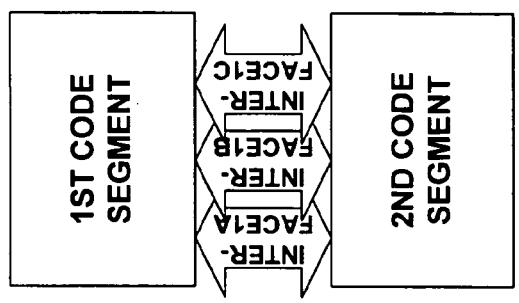
FIG. 31A illustrates how the function provided by interface Interface1 may be subdivided to convert the communications of the interface into multiple interfaces Interface 1A, Interface 1B, Interface 1C.

Factoring: A communication from one code segment to another may be accomplished indirectly by breaking the communication into multiple discrete communications. This is depicted schematically in FIGS. 31A and 31B. As shown, some interfaces can be described in terms of divisible sets of functionality. Thus, the interface functionality of FIGS. 30A and 30B may be factored to achieve the same result, just as one may mathematically provide 24, or 2 times 2 time 3 times 2. Accordingly, as illustrated in FIG. 31A, the function provided by interface Interface1 may be subdivided to convert the communications of the interface into multiple interfaces Interface1A, Interface 1B, Interface 1C, etc. while achieving the same result. As illustrated in FIG. 31B, the function provided by interface 1I may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 31A and 31B, the functional spirit of interfaces Interface1 and I1 remain the same as with FIGS. 30A and 30B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 32A:
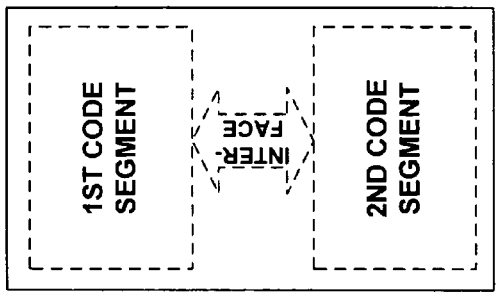
FIG. 32A illustrates a scenario where a meaningless parameter precision can be ignored or replaced with an arbitrary parameter.
Figure 32B:
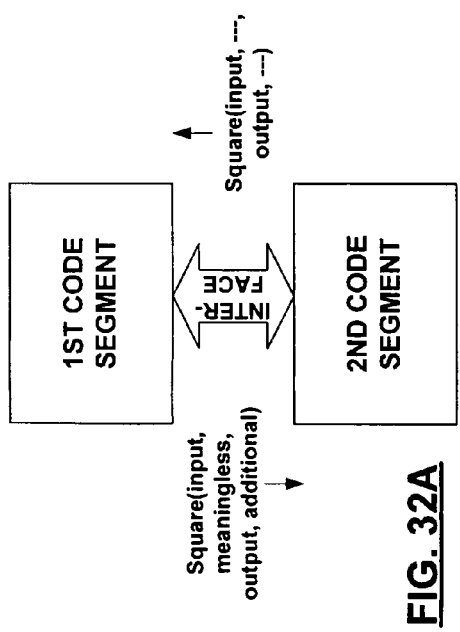
FIG. 32B illustrates a scenario where an interface is replaced by a substitute interface that is defined to ignore or add parameters to an interface.

Redefinition: In some cases, it may be possible to ignore, add or redefine certain aspects (e.g., parameters) of a programming interface while still accomplishing the intended result. This is illustrated in FIGS. 32A and 32B. For example, assume interface Interface1 of FIG. 30A includes a function call Square (input, precision, output), a call that includes three parameters, input, precision and output, and which is issued from the 1st Code Segment to the 2nd Code Segment. If the middle parameter precision is of no concern in a given scenario, as shown in FIG. 32A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 32B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 33A:
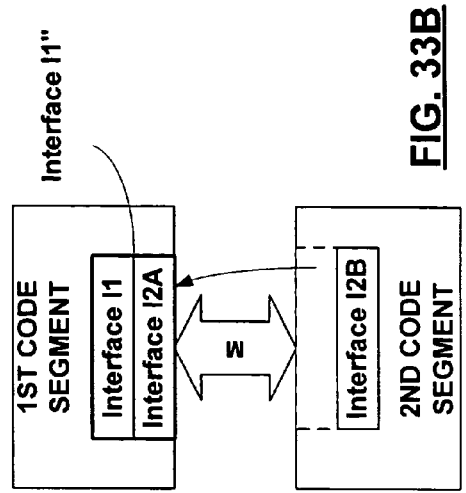
FIG. 33A illustrates a scenario where a 1st and 2nd Code Segments are merged into a module containing them both.
Figure 33B:
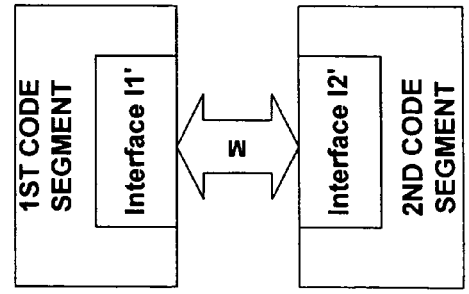
FIG. 33B illustrates a scenario where part or all of an interface may be written inline into another interface to form a merged interface.

Inline Coding: It may also be feasible to merge some or all of the functionality of two separate code modules such that the "interface" between them changes form. For example, the functionality of FIGS. 30A and 30B may be converted to the functionality of FIGS. 33A and 33B, respectively. In FIG. 33A, the previous 1st and 2nd Code Segments of FIG. 30A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 33B, part (or all) of interface I2 from FIG. 30B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 30B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 34B:
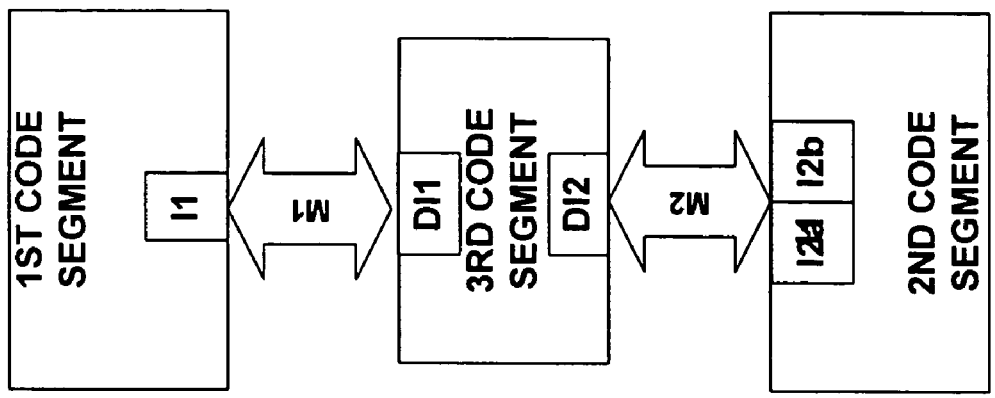
FIG. 34B illustrates how a code segment can be introduced with an interface to receive the communications from one interface but transmit the functionality to second and third interfaces.
Figure 34A:
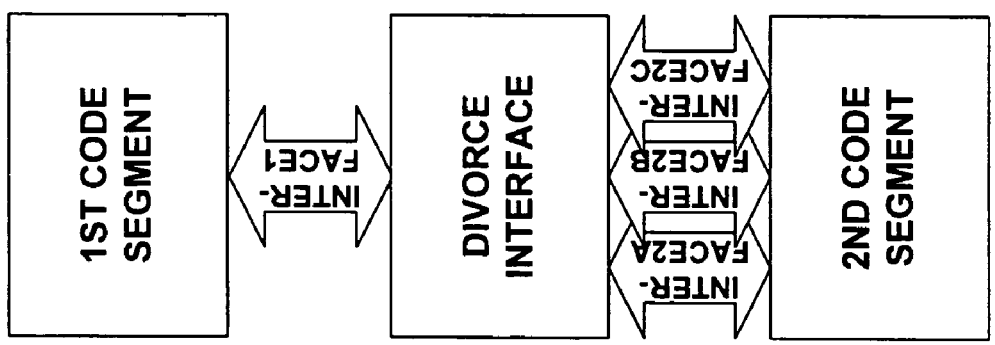
FIG. 34A illustrates how one or more pieces of middleware might convert communications on the first interface to conform them to one or more different interfaces.

Divorce: A communication from one code segment to another may be accomplished indirectly by breaking the communication into multiple discrete communications. This is depicted schematically in FIGS. 34A and 34B. As shown in FIG. 34A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 34B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 30B to a new operating system, while providing the same or similar functional result.

Figure 35A:
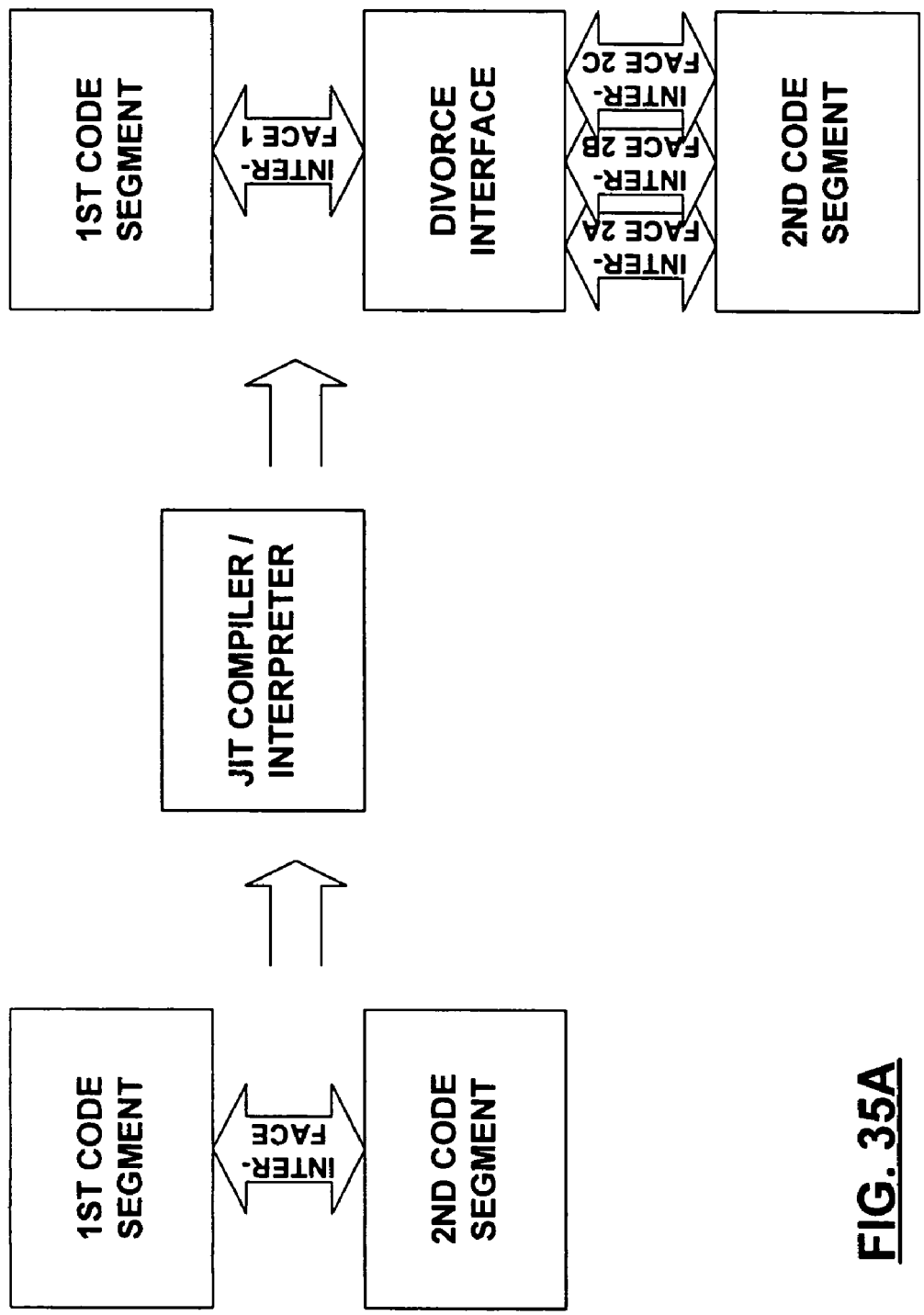
FIG. 35A illustrates how a just-in-time compiler (JIT) might convert communications from one code segment to another code segment.
Figure 35B:
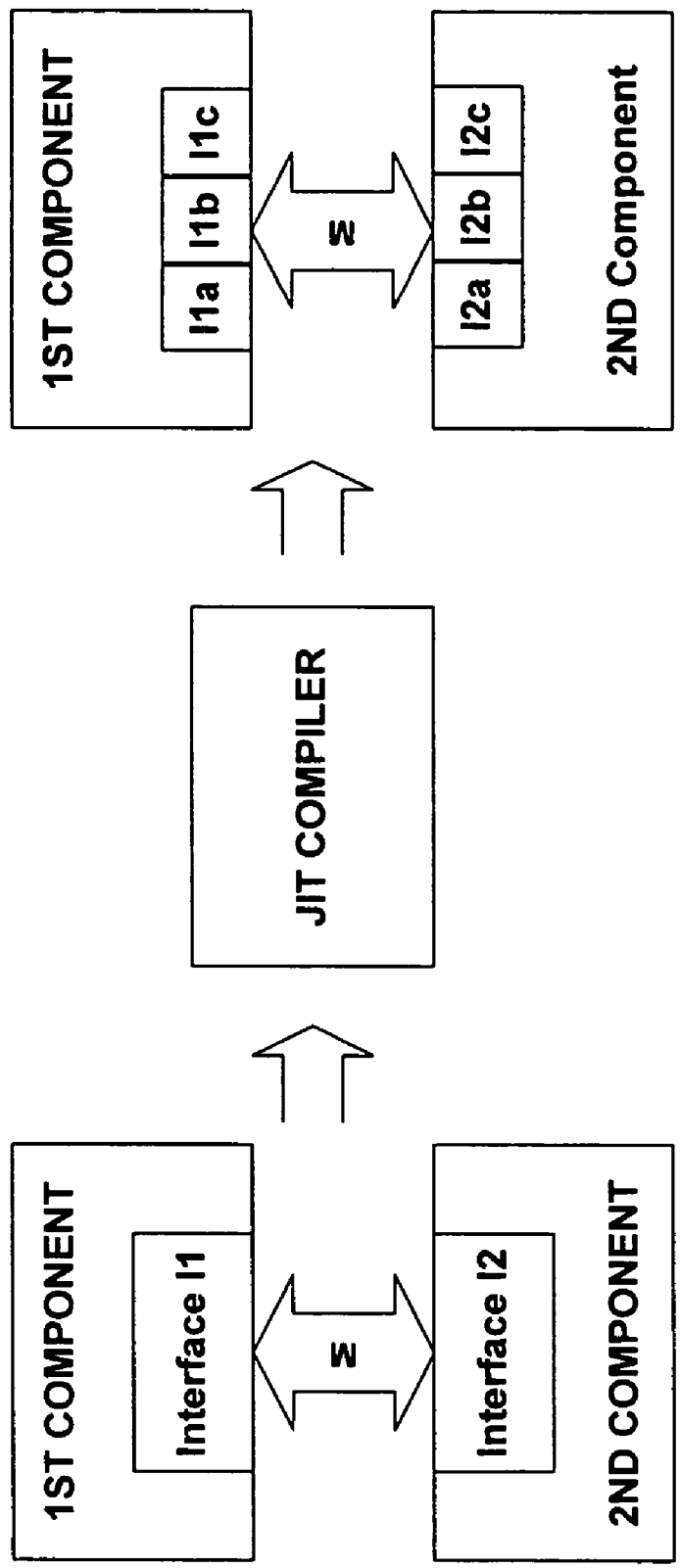
FIG. 35B illustrates a JIT method of dynamically rewriting one or more interfaces may be applied to dynamically factor or otherwise alter said interface.

Rewriting: Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 35A and 35B. As can be seen in FIG. 35A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 35B, this approach of dynamically rewriting the interface(s) may be applied to dynamically factor, or otherwise alter the interface(s) as well.

It should also be noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 30A and 30B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

III. Extensions and Inheritance

A foundational concept of the present invention is the utilization of Items that, to a certain extent, model real-world application objects with complex structures, behaviors, and operations described by a schema and enforced by the hardware/software interface system. To provide rich sub-typing functionality, and in various embodiments of the present invention, a hardware/software interface system (which, for convenience, we shall simply refer to as "WinFS" hereafter) may provides a mechanism by which Items (and Item types) can be extended using "Extensions." Extensions provide additional data structures (Properties, Relationships, etc.) to already existing Items type structures.

As previously discussed herein (and particularly discussed in Sections II.E.6.(a). and II.F.3), while the storage platform is intended to be provided with an initial set of schemas, in at least some embodiments the storage platform allows customers, including independent software vendor (ISVs), to create new schemas (i.e., new Item and Nested Element types). Since an Item type or Nested Element type defined by the initial set of storage platform schemas may not exactly match an ISV application's need, it is necessary to allow ISVs to customize the type. This is allowed with the notion of Extensions. Extensions are strongly typed instances but (a) they cannot exist independently and (b) they must be attached to an Item or Nested Element. Also, in addition to addressing the need for schema extensibility, Extensions are also intended to address "multi-typing" issues. Since, in some embodiments, the storage platform may not support multiple inheritance or overlapping subtypes, applications can use Extensions as a way to model overlapping type instances (e.g., a Document may be a "legal document" as well a "secure document").

A. Type System

In various embodiments of the present invention, the WinFS type system provides a mechanism for defining structures of data. The type system is used to represent data stored in WinFS. A WinFS type is declared in a WinFS schema. A WinFS schema defines a namespace which serves as a logical grouping for a set of types and other WinFS schema elements. WinFS Schemas may be declared using a WinFS Schema Definition Language (SDL) that might use an XML format. The following is an example of a possible schema declaration:

---

<Schema Namespace="System.Storage" >
   Type definitions
</Schema>

---

WinFS Schemas also serve as a unit for type versioning. WinFS defines several system schemas that bootstrap the system. These are the System.Storage schema namespace that contains the type declarations of the root types in the system, and the System.Storage.WinFS schema namespace that declares all the primitive scalar types in the system.

The WinFS type system declares a set of simple scalar types. These types are used as the most primitive building block for all other types in the WinFS type system. These types are declared in the schema namespace System.Storage.WinFS. The following table defines the set of primitive types.

| WinFS Type | Managed SQL Type | CLR Type | Description |
|---|---|---|---|
| String | SqlString | String | Variable-length Unicode data with a maximum length of length of $2^{31}$ characters. Length can be fixed from 1-4000 characters or unconstrained using the "max" keyword. |
| Binary | SqlBinary | Byte[ ] | Variable-length binary data with a maximum length of length of $2^{32}$ bytes. Length can be fixed from 1-8000 bytes or unconstrained using the "max" keyword. |
| Boolean | SqlBoolean | Boolean | Null-able Boolean value |
| Byte | SqlByte | Byte | A singe unsigned byte |
| Int16 | SqlInt16 | Int16 | Integer data from $-2^{15}$ (−32,768) through $2^{15} - 1$ (32,767). |
| Int32 | SqlInt32 | Int32 | Integer (whole number) data from $-2^{31}$ (−2,147,483,648) through $2^{31} - 1$ (2,147,483,647). |
| Int64 | SqlInt64 | Int64 | Integer (whole number) data from $-2^{63}$ (−9223372036854775808) through $2^{63} - 1$ (9223372036854775807). |
| Single | SqlSingle | Single | Floating precision number data from −1.79E+308 through 1.79E+308 |
| Double | SqlDouble | Double | Floating precision number data from −3.40E+38 through 3.40E+38 |
| Decimal | SqlDecimal | Decimal | SQLDecimal has a larger value range then CLR Decimal type. In the store the precision is always 28 digits and scale is 0. |
| DateTime | SqlDateTime | DateTime | Date and time data from Jan. 1, 1753, through Dec. 31, 9999, with an accuracy of three-hundredths of a second, or 3.33 milliseconds. |
| Guid | SqlGuid | Guid | A globally unique identifier (GUID). |
| Xml | SqlXmlReader | XmlReader | For Milestone B, WinFS.Xml will be mapped to "String" type. True XML datatype support is expected in milestone C. |
| Stream | TBD | TBD | A binary data type that is using file stream backed storage for efficient access. This type will be supported in milestone C. |

A WinFS enumeration is a scalar type that declares a set of named constants called a value list. An enumeration type can be used in any place where a scalar type can be used. Here is an example for an enumeration declaration:

```
<Enumeration Name="Gender" >
    <Value Name="Male" />
    <Value Name="Female" />
</Enumeration>
```

The values of the enumeration are zero based. In the example above Gender.Male represents value 0 and Gender.Female represents value 1.

A complex type is defined by a name and a set of properties. A Property is a member field of the type, and is defined by a name and a type. The type of a Property can be either scalar (including enumeration type) or other complex type. A WinFS type that can be used as type of a Property is called a nested type. An instance of a nested type can only exist as a value of a Property of a complex WinFS type—the instance is nested within an instance of a complex type. A nested type is declared using the NestedType schema element. Here are some examples of valid type declarations:

```
<NestedType Name="Address"
BaseType="System.Storage.NestedObject">
    <Property Name="Street" Type="WinFS.String" Size="256" Nullable="false" />
    <Property Name="City" Type=" WinFS.String" Size="256" Nullable="false" />
    <Property Name="State" Type=" WinFS.String" Size="256" Nullable="false" />
    <Property Name="Country" Type="WinFSString" Size="256" Nullable="false" />
</NestedType>
<ItemType Name="Person" BaseType="System.Storage.Item">
    <Property Name="Name" Type="WinFS.String" Size="256" Nullable="false" />
    <Property Name="Age" Type="WinFS.Int32" Nullable="false" Default="1"/>
    <Property Name="Picture" Type="WinFS.Binary" Size="max"/>
    <Property Name="Addresses" Type="MultiSet"
    MultiSetOfType="Address"/>
</ItemType>
```

For properties of type String and Binary a Size attribute must be specified. This attribute specifies the maximum size of the values contained in the Property. A Property can optionally declare a nullability constraint using the Nullable attribute. A value "false" for this attribute indicates that the application must provide a value when creating an instance of the type. Another optional Property attribute is the Default attribute that specifies the default value for the Property. This value will be assigned to the Property at instance creation time if the application did not provide it.

The Addresses Property in the example above is of type MultiSet. A Property of type MultiSet is also referred to as a multi-valued Property. In the example the MultiSet contains a set of instance of type Address. A MultiSet is similar to a collection. It can contain zero or more instances of a complex type. The type of the instance in the MultiSet must be a complex nested type. MultiSet type does not support instances of WinFS scalar types (including enumeration types). A Property of type MultiSet can not be nullable and can not have a default value.

WinFS supports single-inheritance of types. All types in WinFS must inherit from one and only on WinFS type. The inheriting type is referred to as the derived type and the type from which this type was derived is referred to as the base type. The base type in the BaseType attribute of the WinFS type declaration elements. Suppose that type A derives from base type B which in turn derives from type C. The type C is an ancestor type of the types A and B. The type A is a descendant type of the types B and C. A data instance stored in WinFS is always an instance of a single type. We can however treat that data instance as an instance of a set of types containing the type and all its ancestor types. For a data instance which is an instance of such a set of types, we call the type which is not the ancestor of any other type in the set the most-derived type. A singly-typed data instance is an instance of exactly one most-derived type. In general, we will refer to the most-derived type of a singly-typed element as its type. The derived type inherits all the properties declared in its base type. The derived type can declare new properties but can not override the properties defined in the base type. A Property declared in the derived type must not use the same name as a Property of the base type.

The main advantage of inheritance in the data model comes from substitutability of inherited types. Consider the following example:

```
<NestedType Name="Name"
BaseType="System.Storage.NestedObject" >
    <Property Name="FirstName" Type="WinFS.String" />
    <Property Name="LastName" Type="WinFS.String" />
</Nestedype>
<NestedType Name="NameWithMiddleInitial" BaseType="Name" >
    <Property Name="MiddleInitial" Type="WinFS.String" />
</NestedType>
<NestedType Name="Person" BaseType="System.Storage.Item" >
    <Property Name="RealName" Type="Name" />
    <Property Name="OtherNames" Type="MultiSet"
    MultiSetOfType="Name" />
</NestedType>
```

In the above example, type Person has a Property RealName of type Name and a Property OtherNames which is a set of type Name. Normally it would be required that the Property RealName only have instances whose type is Name. However, with inheritance, single-valued instances are allowed to be the value of RealName as long as the type Name is one of ancestors of the most-derived type of that element. So, an instance of NameWithMiddleInitial will be allowed to be the value of the Property RealName.

The same rule is extended to set properties. The Property OtherNames contains a set of elements. For each singly-typed instance which is a member of that set, the most-derived type of that instance must have Name as one of its ancestors. So, some of the instances in the set OtherNames may be instances of type Name while others maybe instances of type NameWithMiddleInitial.

Inheritance also enables convenient querying in that it is possible in the WinFS system to find all instances of a certain type. When looking for all instances of a type, the query engine will also return all instances whose most-derived types are descendents of this type. However, these operations are only supported for Item, Extension, and Relationship types (not Property types). For nested types (a.k.a., Nested Elements, Property, or complex property types), the operation is only supported for instances contained within a single multi-set Property.

B. Type Families

In summary, the WinFS type system defines four distinct type families:
  Nested Element types (a.k.a., Nested types or Property types)
  Item types
  Relationship types
  Extension types Each type family has a different set of properties and usage in the WinFS type system. The System.Storage schema namespace declares four types that serve as root types for each of the type family. The following sections describe the type families in detail.

1. Nested Element Types

Unlike the other WinFS Type families, nested types can be used as types of properties of complex WinFS types. Instances of a nested type can only be nested inside an instance of another complex type. However, Instances of nested types cannot be queried globally—that is, applications cannot compose a simple query that returns all instances of a given nested type in the WinFS store.

2. Item Types

A WinFS Item is an instance of a type whose ancestor is the type System.Storage.Item. This type is a complex type that is the root of the Item type family. System.Storage.Item declares a Property of name ItemId of type Guid. This is a special Property of an Item that serves as a primary key of the Item. The value of this Property is guaranteed to be unique for Items in a given WinFS store. This Property is non-nullable, and must be assigned by the application when creating an instance of an Item type. The ItemId Property is also immutable—it can never change and must not be reused.

The query engine can return instances of a given Item type in a WinFS store. This query may returns all instances of the type and all its type descendent types. Later herein is described the central role that Items have in the WinFS system operational semantics.

3. Relationship Types

Relationship types enable Relationships to exist between Items. WinFS Relationship types describe binary Relationships where one Item is designated as the source and the other Item is designated as the target. A Relationship is an instance of a type whose ancestor is the type System.Storage.Relationship. This type is a root of the Relationship type hierarchy. System.Storage.Relationship type declares the following properties:
  SourceItemId—the ItemId of the Item that is a source of the Relationship instance
  RelationshipId—a unique identifier of the Relationship relative to the source Item; the pair (SourceItemId, RelationshipId) forms the primary key for Relationship types in WinFS
  TargetItemId—the ItemId of the target of the Relationship;
  Mode—one of the 3 possible Relationship instance modes: Holding, Embedding or Reference
  Name—contains the name of the Relationship for holding Relationships
  IsHidden—a Boolean attribute that applications can optionally use to filter Relationships that do not need to be displayed The SourceItemId, RelationshipId, TargetItemId and Mode Property values are immutable. They are assigned at Relationship instance creation time and can not be changed.

A Relationship type is declared as a complex type with the following additional constraints:

Source and target endpoint specification: each endpoint specifies a name and the type of the referenced Item Allowed modes of the instances of the Relationship type: a Relationship instance can not have a value for the Mode Property that is not allowed in the Relationship declaration Here is an example of a Relationship declaration:

```
<RelationshipType Name="DocumentAuthor"
BaseType="System.Storage.Relationship"
AllowsHolding="true"
AllowsEmbedding="false"
AllowsReference="true" >
    <Source Name="Document" Type="Core.Document"/>
    <Target Name="Author" Type="Core.Contact" />
    <Property Name="Role" Type="WinFS.String" />
    <Property Name="DisplayName" Type="WinFS.String" />
</RelationshipType>
```

The DocumentAuthor Relationship is declared with restrictions of instances to Holding or Reference mode. This means that an instance of the DocumentAuthor Relationship can have instances with value Mode="Reference" or Mode="Holding". Instances with value Mode="Embedding" will not be allowed.

The Relationship declares a source endpoint named "Document" of Item type "Core.Document" and a target endpoint of type "Core.Contact". The Relationship also declares two additional properties. The Relationship instances are stored and accessed separately from the Item. All Relationship type instances are accessible from a global Extension view. A query can be composed that will return all the instances of a given type of Relationship.

Given an Item all the Relationships for which the Item is a source can be enumerated based on the SourceItemId Property of the Relationship. Similarly, for a given Item all the Relationship in the same store for which the Item is a target can be enumerated using the TargetItemId Property of the Relationship.

a) Relationship Semantics

The following sections describe the semantics of the different Relationship instance modes:

Holding Relationships: Holding Relationships are used to model reference count based life-time management of the target Items. An Item can be a source endpoint for zero or more Relationships to Items. An Item that is not an embedded Item can be a target of one or more holding Relationships. The target Item must be in the same store as the Relationship instance.

Holding Relationships enforce lifetime management of the target endpoint. The creation of a holding Relationship instance and the Item that it is targeting is an atomic operation. Additional holding Relationship instances can be created that are targeting the same Item. When the last holding Relationship instance with a given Item as target endpoint is deleted the target Item is also be deleted.

The types of the endpoint Items specified in the Relationship declaration will be enforced when an instance of the Relationship is created. The types of the endpoint Items can not be changed after the Relationship is established.

Holding Relationships play a key role in forming the WinFS Item namespace. All holding Relationships participate in the namespace declaration. The "Name" Property in the Relationship declaration defines the name of the target Item relative to the source Item. This relative name is unique for all the holding Relationships sourced from a given Item and cannot be null. The ordered list of this relative names starting from the root Item to a given Item forms the full name to the Item.

The holding Relationships form a directed acyclic graph (DAG). When a holding Relationship is created the system ensures that a cycle is not created and thus ensuring that the WinFS Item namespace forms a DAG. For more information of the WinFS namespace and Item paths refer to the "WinFS Namespace" specification.

Embedding Relationships: Embedding Relationships are modeling the concept of exclusive control of the lifetime of the target Item. They enable the concept of compound Items. The creation of an embedding Relationship instance and the Item that it is targeting is an atomic operation. An Item can be a source of zero or more embedding Relationship. However, an Item can be a target of a one and only one embedding Relationship. An Item that is a target of embedding Relationship can not be a target of a holding Relationship. The target Item must be in the same store as the Relationship instance.

The types of the endpoint Items specified in the Relationship declaration will be enforced when an instance of the Relationship is created. The types of the endpoint Items can not be changed after the Relationship is established. The embedding Relationships do not participate in the WinFS namespace. The value of the Name Property of an embedding Relationship must be null.

Reference Relationships: Reference Relationships do not control life time of the Item it references. Reference Relationships do not guarantee the existence of the target, nor do they guarantee the type of the target as specified in the Relationship declaration. This means that the reference Relationships can be dangling. Also, the reference Relationship can reference Items in other WinFS stores.

In WinFS reference Relationships will be used to model most non lifetime management Relationships between Items. Since the existence of the target is not enforced, the reference Relationship is convenient to model loosely-coupled Relationships. The reference Relationship can be used to target Items in other WinFS stores including stores on other machines. The embedding Relationships do not participate in the WinFS namespace. The value of the Name Property of an embedding Relationship must be null.

b) Relationship Rules and Contraints

The following additional rules and constraints apply to Relationships:

An Item must be a target of (exactly one embedding Relationship) or (one or more holding Relationships). The only exception is the root Item. An Item can be a target of zero or more reference Relationships.

An Item that is a target of embedding Relationship can not be source of holding Relationships. It can be a source of reference Relationships.

An Item can not be a source of holding Relationship if it is promoted from file. It can be a source of embedding Relationships and reference Relationships.

An Item can that is promoted from a file can not be a target of an embedding Relationship.

When a Relationship type A is derived from a base Relationship type B the following rules apply:

Relationship type A can further restrict the endpoint types. The endpoint types must be subtypes of the corresponding endpoint type in the base Relationship B. If the endpoint is further restricted a new name for the endpoint must be declared. If the endpoint is not restricted the specification of the endpoint is optional Relationship type A can further restrict the allowed instance modes declared in the base Relationship. The restricted set of instance modes must be a subset of the base type set of allowed instance types.

The names of the endpoints are treated as Property names: they can not be the same as a name of a Property or a name of an endpoint of the type or its base type.

The Source and Target elements are optional if the corresponding endpoint type is not further restricted by the derived Relationship Here is an example of a declaration of a Relationship type that derives from the DocumentAuthor Relationship defined herein above:

```
<RelationshipType Name="LegalDocumentAuthor"
BaseType="Core.DocumentAuthor"
AllowsHolding="false"
AllowsEmbedding="false"
AllowsReference="true" >
    <Source Name="LegalDocument" Type="Legal.Document "/>
    <Property Name="CaseNumber" Type="WinFS.String" />
</RelationshipType>
```

The LegalDocumentAuthor Relationship further restricts the source endpoint but not the target endpoint. The source endpoint type is Legal.Document which derives from Core.Document. The target endpoint is not restricted further in this case, hence the target element is omitted. The Relationship also further restricts the allowed instance modes. It disallows the Holding mode and only remaining allowed mode is Reference.

4. Extension Types

A WinFS Extension is an instance of a type whose ancestor is the type System.Storage.Extension. This type is a complex type that is the root of the Extension type family.

System.Storage.Extension defines two properties:

ItemId—the ItemId of the Item that the Extension is associated with

ExtensionId—a unique identifier for the Extension relative to the ItemId. The pair (ItemId, ExtensionId) uniquely identifies an Extension instance.

The following restrictions apply for Extension types:

Extension type instances can not exist independently from an Item. An Item type instance with the same ItemId as the Extension ItemId must exist in the store before the Extension type instance is created. The Extension can not be created if the Item with the given ItemId does not exist. When the Item is deleted all the Extensions with the same ItemID are deleted.

At most one instance of a given most-derived Extension type can be associated with an individual Item.

Extensions can not be sources and targets of Relationships.

There are no constraints on the types of Extensions that can be associated with a given Item type. Any Extension type is allowed to extend any Item type. When multiple instances of different Extension types are attached to an Item, they are independent from each other in both structure and behavior. The Extension instances are stored and accessed separately from the Item. All Extension type instances are accessible from a global Extension view. A query can be composed that will return all the instances of a given type of Extension regardless of what type of Item they are associated with. The ItemId of the Extension indicates which Item they belong to and can be used to retrieve the corresponding Item object from the global Item view. Also, given an Item all Extension instances associated with the Item can be enumerated using the ItemId Property of the Extension.

C. Enhanced Functionality

In several embodiments of the present invention, a hardware/software interface system utilizes Extensions and Inheritance in order to formalize relationships between various Items and thereby enhance the ability to query a plurality of Items.

1. Inheritance

FIG. 36 illustrates a series of interrelated Items and a subset of their Relationships. The Document Item 3602 and a Contact Item 3604 are directly related by a designated relationship 3606 which, in this case, is an "author relationship"—that is, the Contact 3604 is the "author" of the Document 3602. In this example, the Picture Item 3622, the Music Item 3624, and the Special Item 3626 all inherit from the Document Item 3604 because each Items' type is a subtype of the Document Item type. Similarly, the Person Item 3642 and the Organization Item 3644 inherit from the Contact Item 3604. In several embodiments of the present invention, these inheriting Items (Picture 3622, Music 3624, Special 3626, Person 3642, and Organization 3644) not only inherit the Properties of the respective parent Items (Document 3602 and Contact 3604), but they also inherit the designated Relationships between these two parent Items. For example, Picture 3622 inherits a relationship 3662 to Contact 3604, a relationship 3664 to Person 3642, and a relationship 3666 to Organization 3644. A similar set of Relationships are also inherited by each of the other Items shown.

However, it is important to note that relationship inheritance is not automatic and does not occur in every context. For example, attributes that describe when a type can be inherited (i.e., inheritance controls) are not themselves inheritable. Inheritance parameters are maintained and regulated by the hardware/software interface system.

2. Extensions

Figure 37A:
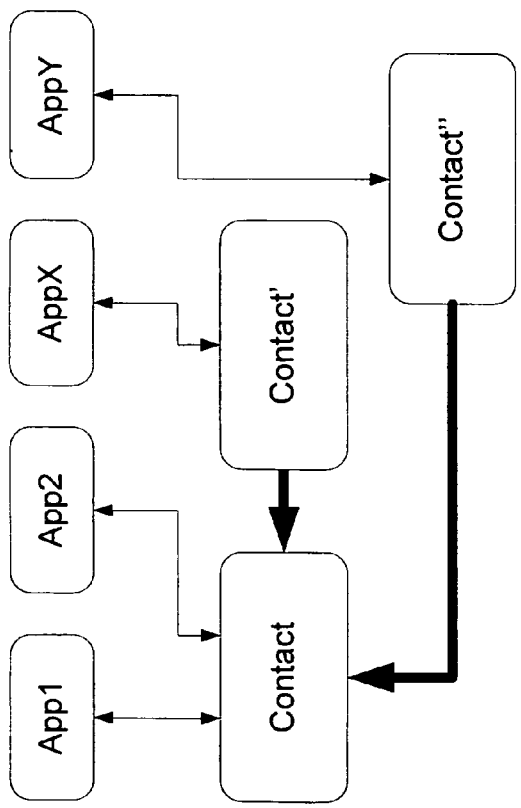
FIG. 37A illustrates the shortcoming of standard subtyping of an Item for application specific purposes.

FIG. 37A illustrates the shortcoming of standard subtyping of an Item for application specific purposes. In this figure, a Contact is accessable by four applications, APP1, APP2, APPX, and APPY. APP1 and APP2 access the standard Contact, but each of APPX and APPY need an extended contact object (add additional fields) and thus derive Contact' and Contact", each of which inherits from Contact. However, the problem is that there are now three different instances of the basic Contact Item—one in Contact, one in Contact', and one in Contact".

Figure 37B:
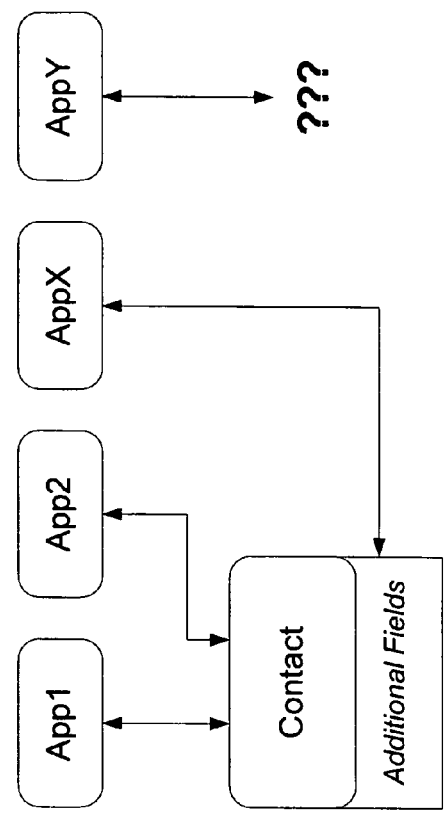
FIG. 37B illustrates a partial solution to the problems of standard subtyping.

A partial solution to this problem, illustrated in FIG. 37B, is to extend the properties of Contact to include the fields necessary for an application that requires such. In this case, Contact is extended to include the Additional Fields required by APPX. However, directly extending the fields of an Item such as Contact can only be done once, and thus APPY cannot employ this method.

Figure 37C:
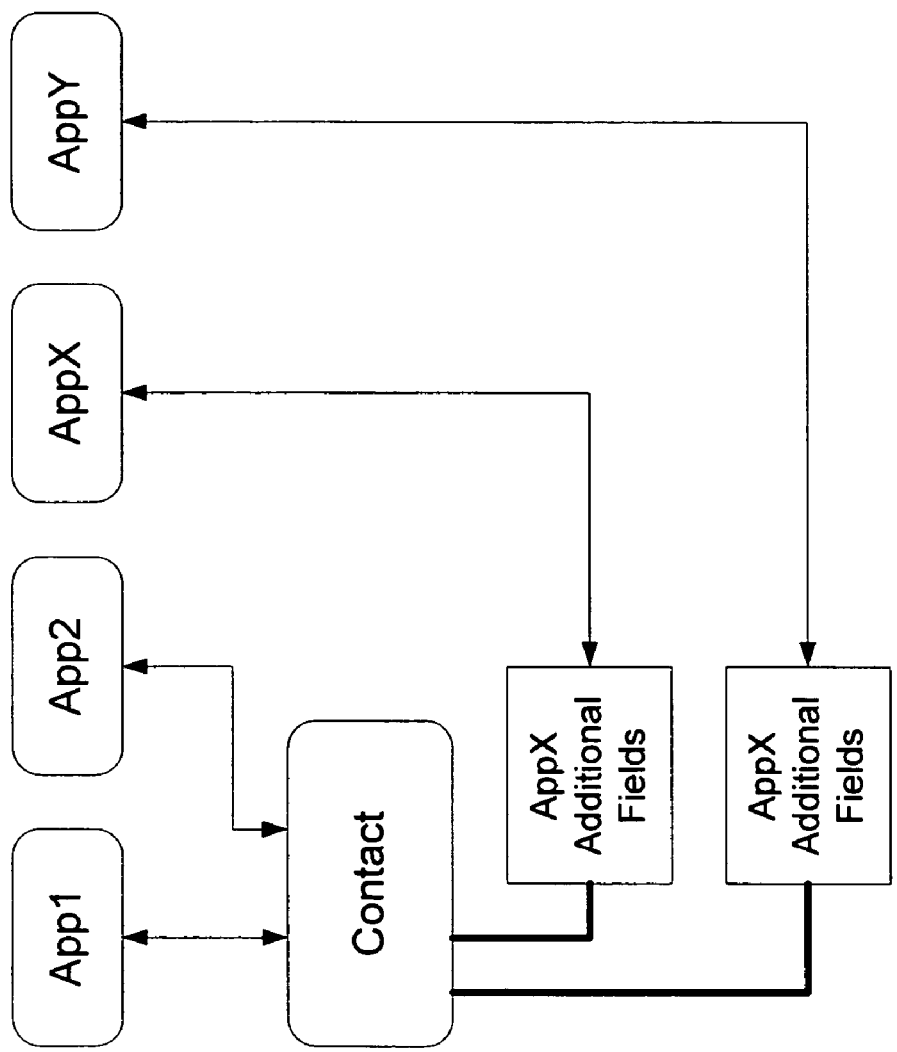
FIG. 37C illustrates one embodiment of the present invention to extend an Item with an Extension that is distinct and separate from Contact itself, and thus enables a multi-typing functionality.

In one embodiment of the present invention, a more comprehensive solution is to extend the Contact with an Extension that is distinct and separate from Contact itself as illustrated in FIG. 37C. In this way, APPX can extend Contact to include its APPX Additional Fields while APPY can also separately extend Contact to include its APPY Additional Fields. These Extensions are then themselves searchable and queryable, and thus these Extensions enable a form of multi-typing for the hardware/software interface system.

IV. Conclusion

As the foregoing illustrates, the present invention is directed to a storage platform for organizing, searching, and sharing data. The storage platform of the present invention extends and broadens the concept of data storage beyond existing file systems and database systems, and is designed to be the store for all types of data, including structured, non-structured, or semi-structured data, such as relational (tabular) data, XML, and a new form of data called Items. Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

As is apparent from the above, all or portions of the various systems, methods, and aspects of the present invention may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

What is claimed:

1. A method of customizing a discrete storable unit of information, the method comprising the following steps:
    defining a discrete storable unit of information having a type structure and a first identifier;
    defining an extension type representative of a desired additional data structure;
    defining an extension instance of the extension type, the extension instance being identified by the first identifier and an extension identifier and stored in a computer readable storage medium and accessible separately from the discrete storable unit of information; and
    creating a customized discrete storable unit of information that is stored in the computer readable storage medium and accessible separately from the discrete storable unit of information, wherein creating the customized discrete storable unit of information comprises attaching the extension instance of the extension type to the discrete storable unit of information.

2. The method of claim 1, wherein said extension cannot exist independently from said type structure of said customized discrete storable unit of information.

3. The method of claim 1, further comprising the following steps:
    defining a plurality of extensions, wherein each extension is representative of a desired additional data structure; and,
    attaching the extensions to the type structure of the discrete storable unit of information.

4. The method of claim 3, wherein said plurality of extensions are used to model overlapping type instances.

5. A hardware/software interface system for manipulating a plurality of discrete storable units of information, said system comprising:
    a processor configured to execute processor-executable instructions;
    a memory in communication with the processor, the memory storing the processor-executable instructions; and
    a subsystem residing in the memory and comprising processor-executable instructions for:
    defining discrete storable units of information having a type structure and respective first identifiers;
    defining at least one extension type representative of a desired additional data structure;
    defining at least one extension instance of the at least one extension type, the at least one extension instance being identified by a respective first identifier of a discrete storable unit of information to which the at least one extension instance is attached and a respective extension identifier, the at least one extension instance being stored and accessible separately from the discrete storable units of information; and,
    creating customized discrete storable units of information that are stored and accessible separately from the discrete storable units of information, wherein creating the customized discrete storable units of information comprises attaching the at least one extension instance of the at least one extension type to the discrete storable units of information.

6. The hardware/software interface system of claim 5, wherein the at least one extension cannot exist independently from said type structure of the customized discrete storable units of information to which the at least one extension is attached.

7. The hardware/software interface system of claim 5, said system further comprising a subsystem residing in the memory and comprising processor-executable instructions for:
    defining a plurality of extensions, wherein each extension is representative of a desired additional data structure; and,
    attaching the extensions to the type structure of the discrete storable units of information.

8. A computer-readable storage medium comprising computer-readable instructions configured to perform a method of customizing a discrete storage unit of information, the method comprising the steps:
    defining a discrete storable unit of information having a type structure and a first identifier;
    defining at least a first extension type and a second extension type, the first extension type representative of a first desired additional data structure required by a first application and the second extension type representative of a second desired additional data structure required by a second application;
    defining a first extension instance of the first extension type, the first extension instance being identified by the first identifier and a first extension identifier;
    defining a second extension instance of the second extension type, the second extension instance identified by the first identifier and a second extension identifier, the first extension instance and the second extension instance being stored and accessible separately from the discrete storable unit of information; and creating at least two customized discrete storable units of information that are stored and accessible separately from the discrete storable unit of information, wherein creating the at least two customized discrete storable units of information comprises attaching the first extension instance of the first extension type to the discrete storable unit of information to create a first customized discrete storable unit of information and, separately, attaching the second extension instance of the second extension type to the discrete storable unit of information to create the second customized discrete storable unit of information.

9. The method of claim 1, wherein the discrete storable unit of information is an Item.

10. The method of claim 1, wherein the discrete storable unit of information is a Nested Element.

11. The method of claim 1, wherein the extension represents a specified property.

12. The method of claim 1, wherein the extension represents a specified relationship.

13. The hardware/software interface system of claim 5, wherein the discrete storable units of information are Items.

14. The hardware/software interface system of claim 5, wherein the discrete storable units of information are Nested Elements.

15. The hardware/software interface system of claim 5, wherein the extensions represent a specified property.

16. The hardware/software interface system of claim 5, wherein the extensions represent a specified relationship.

* * * * *